United States Patent
Kim et al.

(10) Patent No.: US 12,302,438 B2
(45) Date of Patent: May 13, 2025

(54) TIMER FOR SMALL DATA TRANSMISSION

(71) Applicant: Ofinno, LLC, Reston, VA (US)

(72) Inventors: Taehun Kim, Fairfax, VA (US); Hyoungsuk Jeon, Centreville, VA (US); Esmael Hejazi Dinan, McLean, VA (US); Kyungmin Park, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/919,942

(22) Filed: Oct. 18, 2024

(65) Prior Publication Data
US 2025/0048474 A1 Feb. 6, 2025

Related U.S. Application Data

(63) Continuation of application No. PCT/US2023/019660, filed on Apr. 24, 2023.
(Continued)

(51) Int. Cl.
*H04W 76/20* (2018.01)
*H04W 76/19* (2018.01)
*H04W 76/30* (2018.01)

(52) U.S. Cl.
CPC .......... *H04W 76/20* (2018.02); *H04W 76/19* (2018.02); *H04W 76/30* (2018.02)

(58) Field of Classification Search
CPC ...... H04W 76/20; H04W 76/19; H04W 76/30
See application file for complete search history.

(56) References Cited

U.S. PATENT DOCUMENTS

2021/0410180 A1  12/2021  Tsai et al.
2023/0180338 A1* 6/2023  Fujishiro .......... H04W 74/0833
                                                 370/329
(Continued)

FOREIGN PATENT DOCUMENTS

WO   2021/257856 A1   12/2021

OTHER PUBLICATIONS

R4-2207128; 3GPP TSG-RAN WG4 Meeting #102-e; Electronic, Feb. 21-Mar. 3, 2022; Change Request; 38.133; CR 2269; rev-; Current version: 17.4.0.
(Continued)

*Primary Examiner* — Will W Lin
(74) *Attorney, Agent, or Firm* — Sachin Kandhari; Kavon Nasabzadeh; Jacob L. Mangan

(57) ABSTRACT

A wireless device receives, from a first base station, a RRC release message comprising a suspend configuration, wherein the suspend configuration comprises a configuration of a small data transmission (SDT) procedure indicating a radio bearer configured for the SDT procedure. The device suspends, based on the suspend configuration, one or more radio bearers comprising the radio bearer configured for the SDT procedure. Based on initiating the SDT procedure, the wireless device resumes the radio bearer configured for the SDT procedure; and transmits, to a second base station, a radio resource control (RRC) resume request message. The wireless device communicates with the second base station and during the SDT procedure, data associated with the SDT procedure, and transmits to the second base station and during the SDT procedure, a user equipment (UE) assistance information message comprising a non-SDT indication, wherein the non-SDT indication indicates availability of data mapped to a radio bearer which is not configured for the SDT procedure, and a resume cause associated with the data.

(Continued)

The wireless device receives, from the second base station and after transmitting the UE assistance information message, an RRC response message.

20 Claims, 41 Drawing Sheets

Related U.S. Application Data

(60) Provisional application No. 63/334,011, filed on Apr. 22, 2022.

(56) References Cited

U.S. PATENT DOCUMENTS

| | | | | |
|---|---|---|---|---|
| 2023/0380003 | A1* | 11/2023 | Agiwal | H04W 72/21 |
| 2024/0090045 | A1* | 3/2024 | Agiwal | H04W 76/27 |
| 2024/0306147 | A1* | 9/2024 | Wang | H04W 72/21 |

OTHER PUBLICATIONS

R1-2202979; 3GPP TSG-WG1 Meeting #108; e-meeting, Feb. 21-Mar. 3, 2022; Change Request; 38.211; CR 0094; rev-; Current version: 17.0.0.
R1-2202987; 3GPP TSG RAN WG1 #108-e; e-Meeting, Feb. 21-Mar. 3, 2022; Change Request; 38.213; CR 0303; rev-; Current version: 17.0.0.
R1-2202996; 3GPP TSG-RAN WG1 Meeting #108-e; Electronic Meeting, Feb. 21-Mar. 3, 2022; Change Request; 38.214; CR 0267; rev-; Current version: 17.0.0.
R2-2204234; 3GPP TSG-RAN WG2 Meeting #117 Electronic; Elbonia, Feb. 21-Mar. 3, 2022; Change Request; 38.300; CR 0357; rev 7; Current version: 16.8.0.
R2-2204216; 3GPP TSG-RAN2 Meeting #117e; Electronic, Feb. 21-Mar. 3, 2022; Change Request; 38.321; CR 1198; rev 1; Current version: 16.7.0.
R2-2203769; 3GPP TSG-RAN WG2 Meeting #117e; Electronic, Feb. 21-Mar. 3, 2022; Change Request; 38.321; CR 1214; rev 1; Current version: 16.7.0.
R2-2203768; 3GPP TSG-RAN WG2 Meeting #117-e; Electronic, Feb. 21-Mar. 3, 2022; Change Request; 38.331; CR 2937; rev 1; Current version: 16.7.0.
R2-2204241; 3GPP TSG-RAN WG2 Meeting #117-e; Electronic, Feb. 21-Mar. 3, 2022; Change Request; 38.331; CR 2951; rev 1; Current version: 16.7.0.
3GPP TS 38.401 V17.0.0 (Apr. 2022); Technical Specification; 3rd Generation Partnership Project; Technical Specification Group Radio Access Network; NG-RAN; Architecture description; (Release 17).
R3-222956; 3GPP TSG-RAN WG3 Meeting #115-e; Electronic Meeting, Feb. 21-Mar. 3, 2022; Change Request; 38.401; CR 0192; rev 3; Current version: 16.8.0.
R3-222961; 3GPP TSG-RAN WG3 Meeting #115-e; E-meeting, Feb. 21-Mar. 3, 2022; Change Request; 38.401; CR 0196; rev 1; Current version: 16.8.0.
R3-222957; 3GPP TSG-RAN WG3 Meeting #115-e; Feb. 21-Mar. 3, 2022; Change Request; 38.420; CR 0024; rev 2; Current version: 16.0.0.
3GPP TS 38.423 V17.0.0 (Apr. 2022); Technical Specification; 3rd Generation Partnership Project; Technical Specification Group Radio Access Network; NG-RAN; Xn application protocol (XnAP); (Release 17).
R3-222958; 3GPP TSG-RAN WG3 Meeting #115-e; Online, Feb. 21-Mar. 3, 2022; Change Request; 38.423; CR 0720; rev 3; Current version: 16.8.0.
3GPP TS 38.463 V17.0.0 (Apr. 2022); Technical Specification; 3rd Generation Partnership Project; Technical Specification Group Radio Access Network; NG-RAN; E1 Application Protocol (E1AP); (Release 17).
R3-222986; 3GPP TSG-RAN WG3 #115; Feb. 21-Mar. 3, 2022; Online; Change Request; 38.463; CR 0681; rev 2; Current version: 16.8.0.
R3-222962; 3GPP TSG-RAN WG3 #115e; Online, Feb. 21-Mar. 3, 2022; Change Request; 38.470; CR 0081; rev 2; Current version: 16.5.0.
3GPP TS 38.473 V17.0.0 (Apr. 2022); Technical Specification; 3rd Generation Partnership Project; Technical Specification Group Radio Access Network; NG-RAN; F1 application protocol (F1AP); (Release 17).
R3-222963; 3GPP TSG-RAN WG3 Meeting #115-e; Feb. 21-Mar. 3, 2022; Online; Change Request; 38.473; CR 0833; rev 3; Current version: 16.8.0.
R3-222960; 3GPP TSG-RAN WG3#115-e; E-meeting, Feb. 21-Mar. 3, 2022; Change Request; 38.473; CR 0834; rev 3; Current version: 16.8.0.
R3-221472; 3GPP TSG-RAN WG3 #114bis-e; Online, Jan. 17-26, 2022; Title: LS on handling of DL non-SDT during SDT procedure; Reply to:; Release: Release 17; Work Item: NR_SmallData_INACTIVE; Source: RAN3; To: RAN2.
R3-221667; 3GPP TSG-RAN3 Meeting #115-e; Electronic meeting, Feb. 21-Mar. 3, 2022; 3GPP TSG RAN WG2 Meeting #116bis-e; Electronic meeting, Jan. 17-25, 2022; Title: LS on RAN3 impacts for non-SDT handling; Release: Rel-17; Work Item: NR_SmallData_INACTIVE-Core.
R3-221775; 3GPP TSG-RAN WG3 #115-e; E-meeting, Feb. 22-Mar. 3, 2022; Agenda Item: 24.2; Source: NEC; Title: RACH based SDT discussion; Document for: decision.
R3-221776; 3GPP TSG-RAN WG3 #115-e; E-meeting, Feb. 22-Mar. 3, 2022; Agenda Item: 24.2; Source: NEC; Title: (TP for XNAP BL CR on RA-SDT) RACH based SDT; Document for: decision.
R3-221796; 3GPP TSG-RAN WG3 #115-e; Feb. 21-Mar. 3, 2022; Online; Source: ZTE Corporation; Title: Discussion on non-SDT handling during ongoing SDT procedure; Document for: Discussion; Agenda Item: 24.4.
R3-221816; 3GPP TSG-RAN WG3#115-e; E-Meeting, Feb. 21-Mar. 3, 2022; Agenda item: 24.2; Source: Nokia, Nokia Shanghai Bell; Title: (TP for TS 38.423) Conclusions on RACH-based SDT; Document for: Approval.
R3-221817; 3GPP TSG-RAN WG3#115-e; E-Meeting, Feb. 21-Mar. 3, 2022; Agenda item: 24.2; Source: Nokia, Nokia Shanghai Bell; Title: (TP for TS 38.473) Conclusions on RACH-based SDT; Document for: Approval.
R3-221853; 3GPP TSG-RAN WG3 Meeting #115-e; Online, Feb. 21-Mar. 3, 2022; Agenda Item: 24.2; Source: Ericsson, ZTE, Lenovo, Motorola Mobility; Title: (TP for RA-SDT BL CR to TS 38.423) Procedures for context fetch; Document for: Approval.
R3-221854; 3GPP TSG-RAN WG3 Meeting #115-e; Online, Feb. 21-Mar. 3, 2022; Agenda Item: 24.4; Source: Ericsson; Title: Handling of non-SDT arrival during SDT procedure; Document for: Approval.
R3-221855; 3GPP TSG-RAN WG3 Meeting #115-e; Online, Feb. 21-Mar. 3, 2022; Title: [DRAFT] Reply LS on RAN3 impacts for non-SDT handling; Response to: R3-221667 / R2-2201977; Release: Rel-17; Work Item: NR_SmallData_INACTIVE-Core.
R3-221896; 3GPP TSG-RAN WG3 Meeting #115-e; Online, Feb. 21-Mar. 3, 2022; Title: (TP for SDT BL CRs) On RA-based SDT; Source: CATT; Agenda item: 24.2; Document for: Discussion and Decision.
R3-221898; 3GPP TSG-RAN WG3 Meeting #115-e; Online, Feb. 21-Mar. 3, 2022; Title: (TP for SDT BL CR 38.463) On Continue ROHC and non-SDT; Source: CATT; Agenda item: 24.4; Document for: Discussion and Decision.
R3-221899; 3GPP TSG-RAN WG3 Meeting #115-e; Online, Feb. 21-Mar. 3, 2022; Title: [DRAFT] Reply LS on RAN3 impacts for non-SDT handling; Reply to: R3-221667/R2-2201977 LS on RAN3 impacts for non-SDT handling; Release: Release 17; Work Item: NR_SmallData_INACTIVE; Source: CATT (to be RAN3); To: RAN2.
R3-221937; 3GPP TSG-RAN WG3 #115-e; Feb. 21-Mar. 3, 2022; Online; Title: (TP for RA-SDT BLCR to TS 38.300) Left issues for RA-SDT without anchor relocation case; Source: ZTE, Ericsson; Agenda item: 24.2; Document for: Discussion and Decision.

(56) References Cited

OTHER PUBLICATIONS

R3-221938; 3GPP TSG-RAN WG3 #115-e; Feb. 21-Mar. 3, 2022; Online; Title: (TP for RA-SDT BLCR to TS 38.300) Left issues for RA-SDT with anchor relocation case; Source: ZTE; Agenda item: 24.2; Document for: Discussion and Decision.

R3-221995; 3GPP TSG-RAN WG3 Meeting #115e; E-meeting, Feb. 21-Mar. 3, 2022; Agenda item: 24.2; Source: Lenovo, Motorola Mobility; Title: Remaining Issues on RA-SDT; Document for: Discussion.

R3-221997; 3GPP TSG-RAN WG3 Meeting #115e; E-meeting, Feb. 21-Mar. 3, 2022; Agenda item: 24.4; Source: Lenovo, Motorola Mobility; Title: Discussion on RAN3 impacts for UL non-SDT handling; Document for: Discussion.

R3-221998; 3GPP TSG-RAN WG3 Meeting #115e; E-meeting, Feb. 21-Mar. 3, 2022; Agenda item: 24.4; Source: Lenovo, Motorola Mobility; Title: (TP to RA-SDT TS 38.463 BL CR) Non SDT Data Arrival; Document for: Discussion.

R3-222032; 3GPP TSG-RAN WG3 Meeting # 115-e; Online, Feb. 21-Mar. 3, 2022; Agenda item: 24.4. Others ; Source: Google; Title: (TP to RA-SDT BLCR for TS38.463) Changes to Bearer Context Setup procedure; Document for: Discussion & Decision.

R3-222041; 3GPP TSG-RAN WG3 Meeting #115-e; Feb. 21-Mar. 3, 2022; Agenda item: 24.4; Source: Qualcomm Incorporated; Title: Discussion on RAN2 Ls on non-SDT Handling; Document for: Discussion and Approval.

R3-222042; 3GPP TSG RAN WG2 Meeting #115-e; Feb. 21-Mar. 3, 2022; Title: [DRAFT] Reply LS on RAN3 impacts for non-SDT handling; Response to: LS on RAN3 impacts for non-SDT handling (R3-221667/R2-2201977); Release: Rel-17; Work Item: NR_SmallData_INACTIVE-Core.

R3-222124; 3GPP TSG-RAN WG3 Meeting #115-e; E-Meeting, Feb. 21-Mar. 3, 2022; Agenda Item: 24.2; Source: Samsung; Title: (TP to RA-SDT BL CR on TS38.473) Discussion on the remaining issues of RA-SDT; Document for: Discussion.

R3-222170; 3GPP TSG-RAN WG3 Meeting #115-e; Electronic meeting, Feb. 21-Mar. 3, 2022; Title: (TPs to RA-SDT BL CRs of TS 38.300, 38.420, 38.470) RACH based SDT without anchor relocation; Source: Huawei; Agenda item: 24.2; Document Type: other.

R3-222171; 3GPP TSG-RAN WG3 Meeting #115-e; Electronic meeting, Feb. 21-Mar. 3, 2022; Title: (TP to RA-SDT BL CR of TS 38.423) RACH based SDT without anchor relocation; Source: Huawei; Agenda item: 24.2; Document Type: other.

R3-222173; 3GPP TSG-RAN WG3 Meeting #115-e; Electronic meeting, Feb. 21-Mar. 3, 2022; Title: Considerations on CCCH solution for UL non-SDT arrival; Source: Huawei, InterDigital; Agenda item: 24.4; Document Type: Discussion.

R3-222238; 3GPP TSG-RAN WG3 #115-e; Electronic meeting, Feb. 21-Mar. 3, 2022; Agenda item: 24.2; Source: LG Electronics Inc.; Title: (TP for RA-SDT BL CR to TS 38.423) Support of RA-SDT; Document for: Agreement.

R3-222241; 3GPP TSG-RAN WG3 #115-e; Electronic meeting, Feb. 21-Mar. 3, 2022; Agenda item: 24.4; Source: LG Electronics Inc.; Title: Discussion on CCCH solution for non-SDT data; Document for: Agreement.

R3-222319; 3GPP TSG-RAN WG3 Meeting #115-e; Feb. 21-Mar. 3, 2022; Online; Agenda item: 24.4 (Others); Source: Samsung; Title: (TP to RA-SDT BL CR TS38.463) Discussion on remaining issues on SDT; Document for: Discussion & Decision.

R3-222351; 3GPP TSG-RAN WG3 Meeting #115-e; Electronic Meeting, Feb. 21-Mar. 3, 2022; Agenda item: 24.2 ; Source: Intel Corporation; Title: (TP for RA-SDT BL CR for TS 38.423/463) Toward the completion of RA-SDT; Document for: Discussion and Decision.

R3-222352; 3GPP TSG-RAN WG3 Meeting #115-e; Electronic Meeting, Feb. 21-Mar. 3, 2022; Agenda item: 24.2 ; Source: Intel Corporation; Title: (TP for RA-SDT BL CR for TS 38.423) Why relocation preference is necessary for RA-SDT as assistance info from the receiving gNB; Document for: Discussion and Decision.

R3-222353; 3GPP TSG-RAN WG3 Meeting #115-e; Electronic Meeting, Feb. 21-Mar. 3, 2022; Agenda item: 24.2; Source: Intel Corporation; Title: (TP for RA-SDT BL CR for TS 38.300/401); Document for: Other.

R3-222355; 3GPP TSG-RAN WG3 Meeting #115-e; Electronic Meeting, Feb. 21-Mar. 3, 2022; Agenda item: 24.4; Source: Intel Corporation; Title: Discussion on RAN3 impacts for non-SDT handling from RAN2; Document for: Discussion and Decision.

R3-222356; 3GPP TSG-RAN WG3 Meeting #115-e; Electronic Meeting, Feb. 21-Mar. 3, 2022; Title: [Draft] Reply LS on RAN3 impacts for non-SDT handling; Response to: R3-221667/R2-2201977 LS on RAN3 impacts for non-SDT handling; Release: Rel-17; Work Item: NR_SmallData_INACTIVE-Core.

International Search Report and Written Opinion of the International Searching Authority, mailed Jul. 21, 2023, in International Application No. PCT/US2023/019660.

R2-2010008; 3GPP TSG-RAN WG2 Meeting #112e; Online, Nov. 2-13, 2020; Agenda item: 8.6.3; Source: Qualcomm Incorporated; Title: Control plane aspects on NR small data transmission; WID/SID: NR SmallData INACTIVE-Core—Release 17—; Document for: Discussion and Decision.

R3-222856; 3GPP TSG-RAN WG3 Meeting #115-e; Online, Feb. 21-Mar. 3, 2022; Agenda Item: 24.2; Source: Ericsson (moderator); Title: Summary of Offline Discussion on RACH based SDT; Document for: Approval.

* cited by examiner

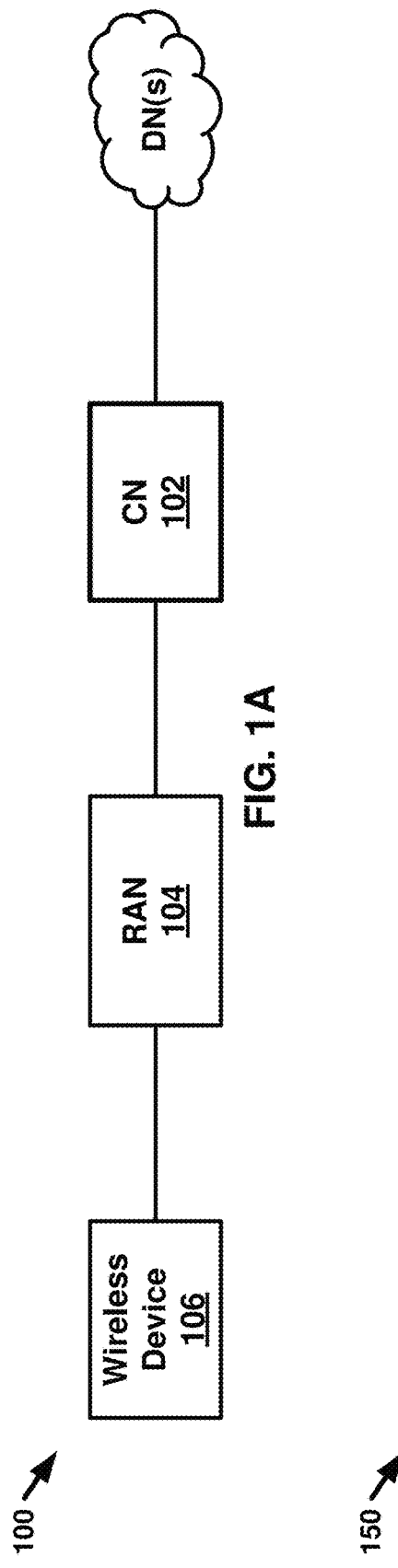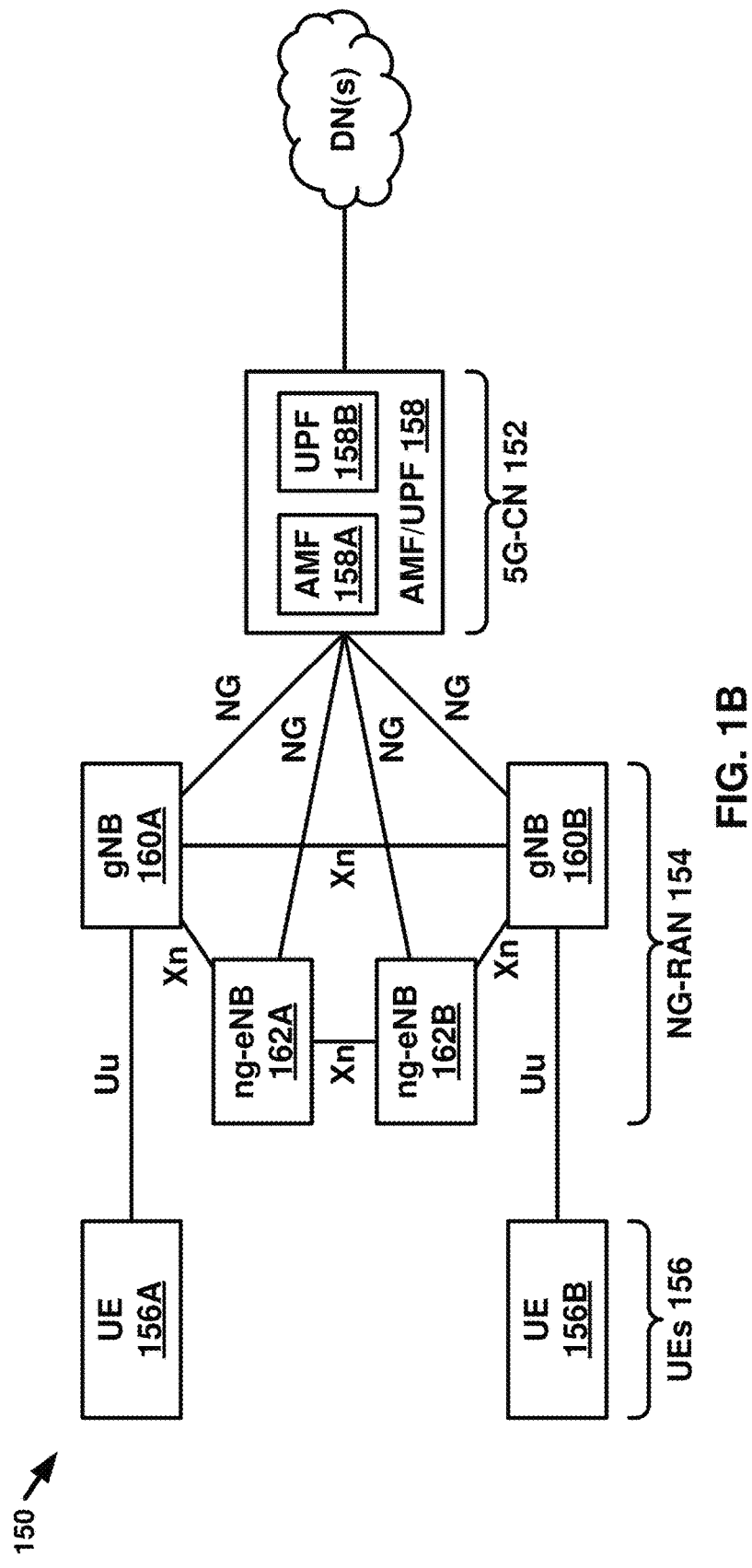

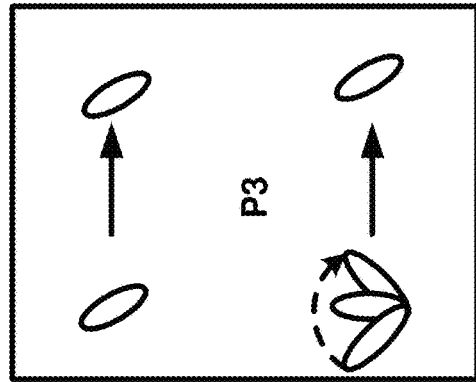
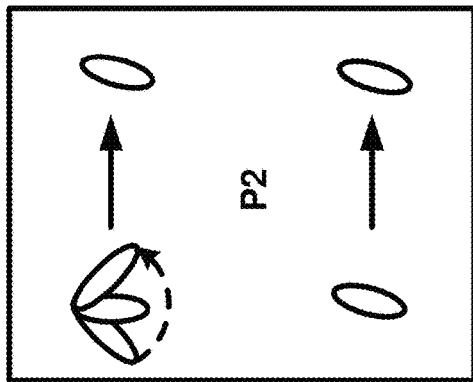
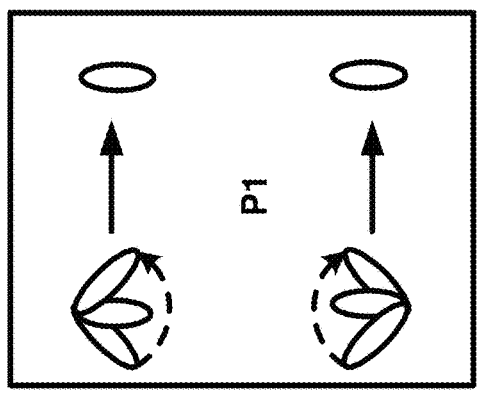
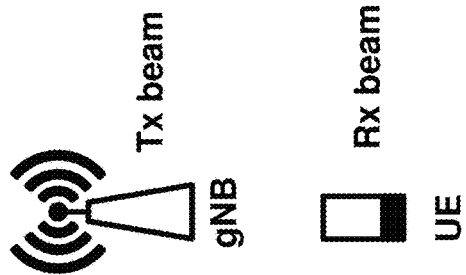
FIG. 12A
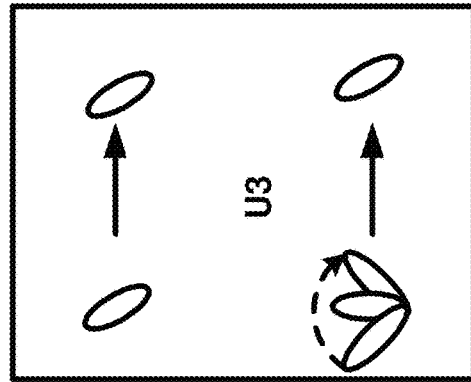
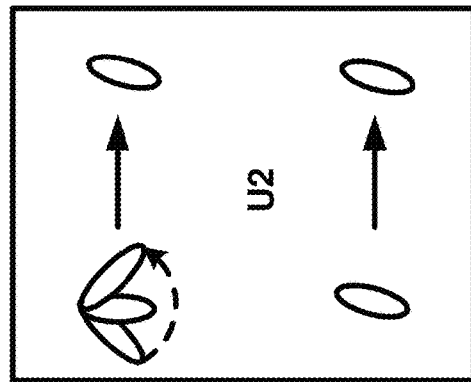
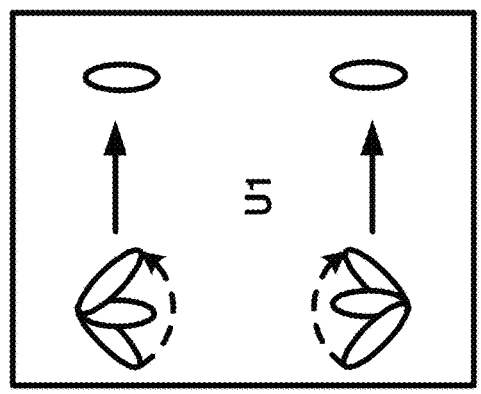
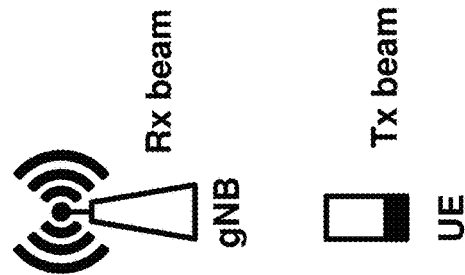
FIG. 12B

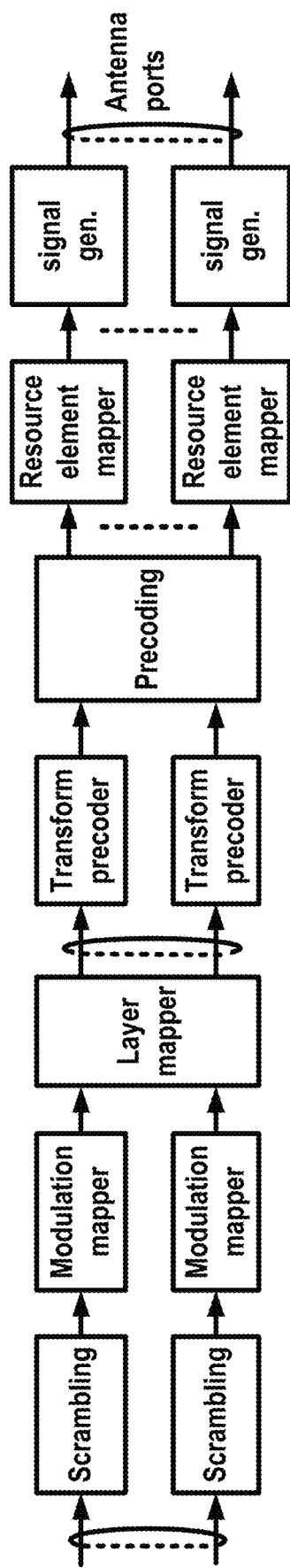
FIG. 16A
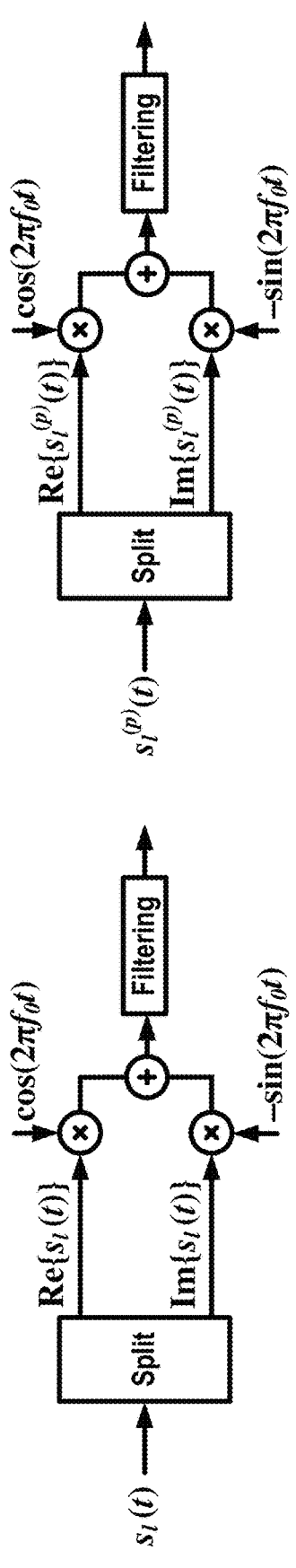
FIG. 16B
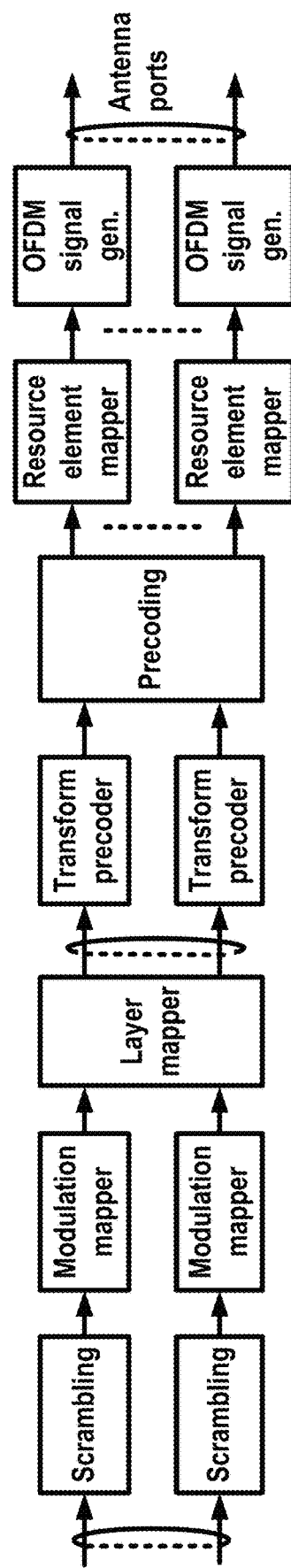
FIG. 16C
FIG. 16D

TIMER FOR SMALL DATA TRANSMISSION

CROSS-REFERENCE TO RELATED APPLICATIONS

This application is a continuation of International Application No. PCT/US2023/019660, filed Apr. 24, 2023, which claims the benefit of U.S. Provisional Application No. 63/334,011, filed Apr. 22, 2022, all of which are hereby incorporated by reference in their entireties.

BRIEF DESCRIPTION OF THE DRAWINGS

Examples of several of the various embodiments of the present disclosure are described herein with reference to the drawings.

FIG. 1A and FIG. 1B illustrate example mobile communication networks in which embodiments of the present disclosure may be implemented.

FIG. 12A and FIG. 12B respectively illustrate examples of three downlink and uplink beam management procedures.

FIG. 16A, FIG. 16B, FIG. 16C, and FIG. 16D illustrate example structures for uplink and downlink transmission.

DETAILED DESCRIPTION

Figure 2A:
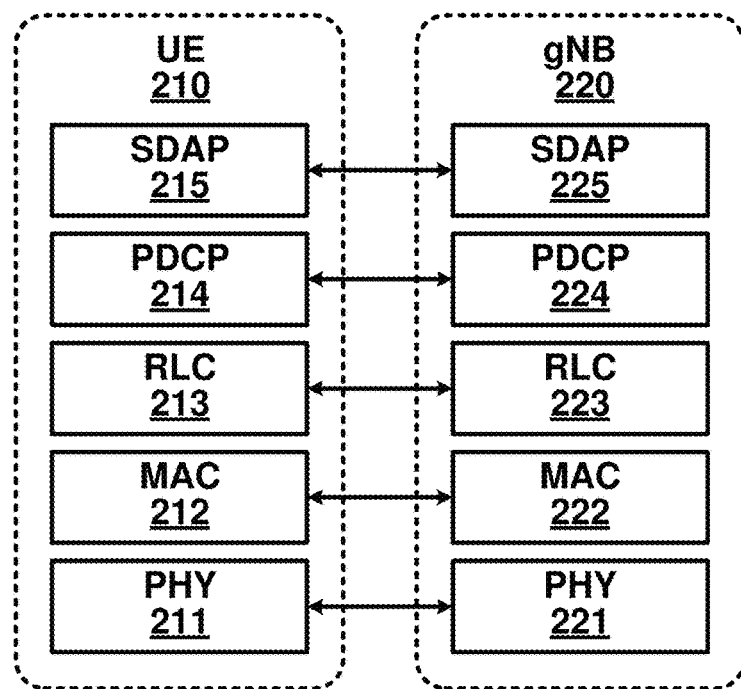
FIG. 2A and FIG. 2B respectively illustrate a New Radio (NR) user plane and control plane protocol stack.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied.

Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g., hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B.

The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2B:
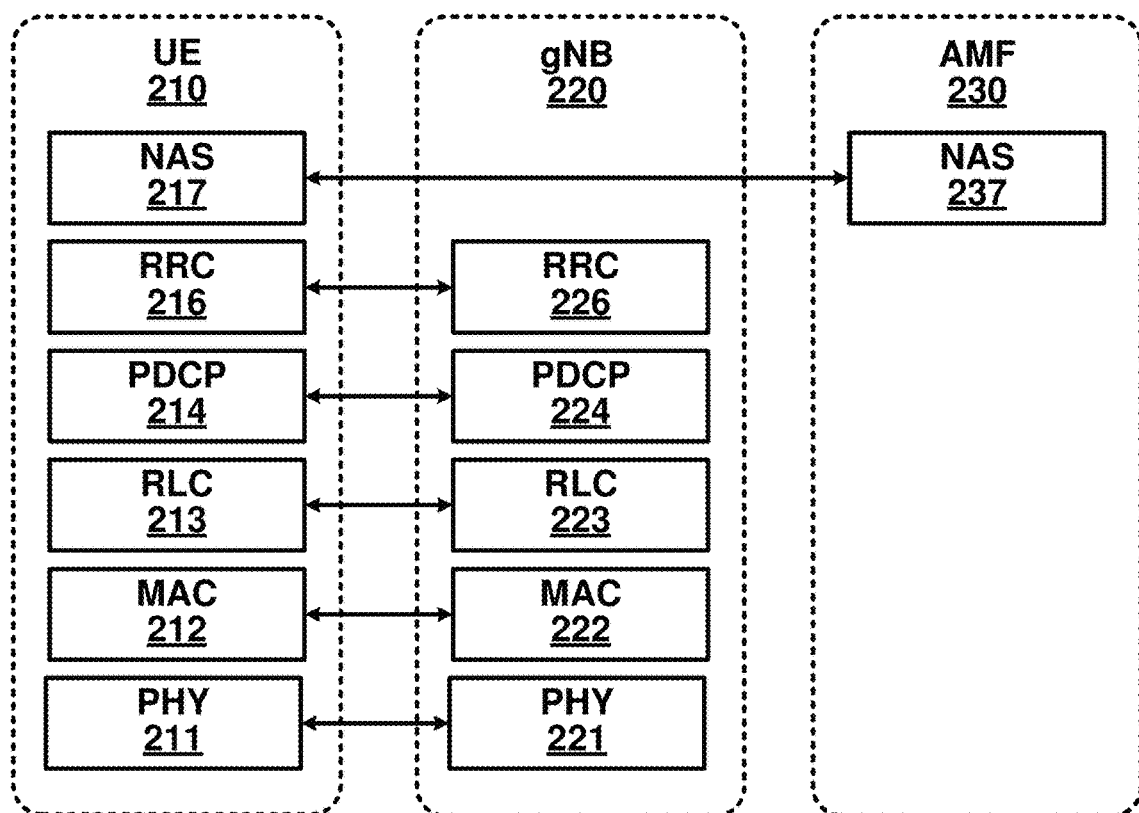

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
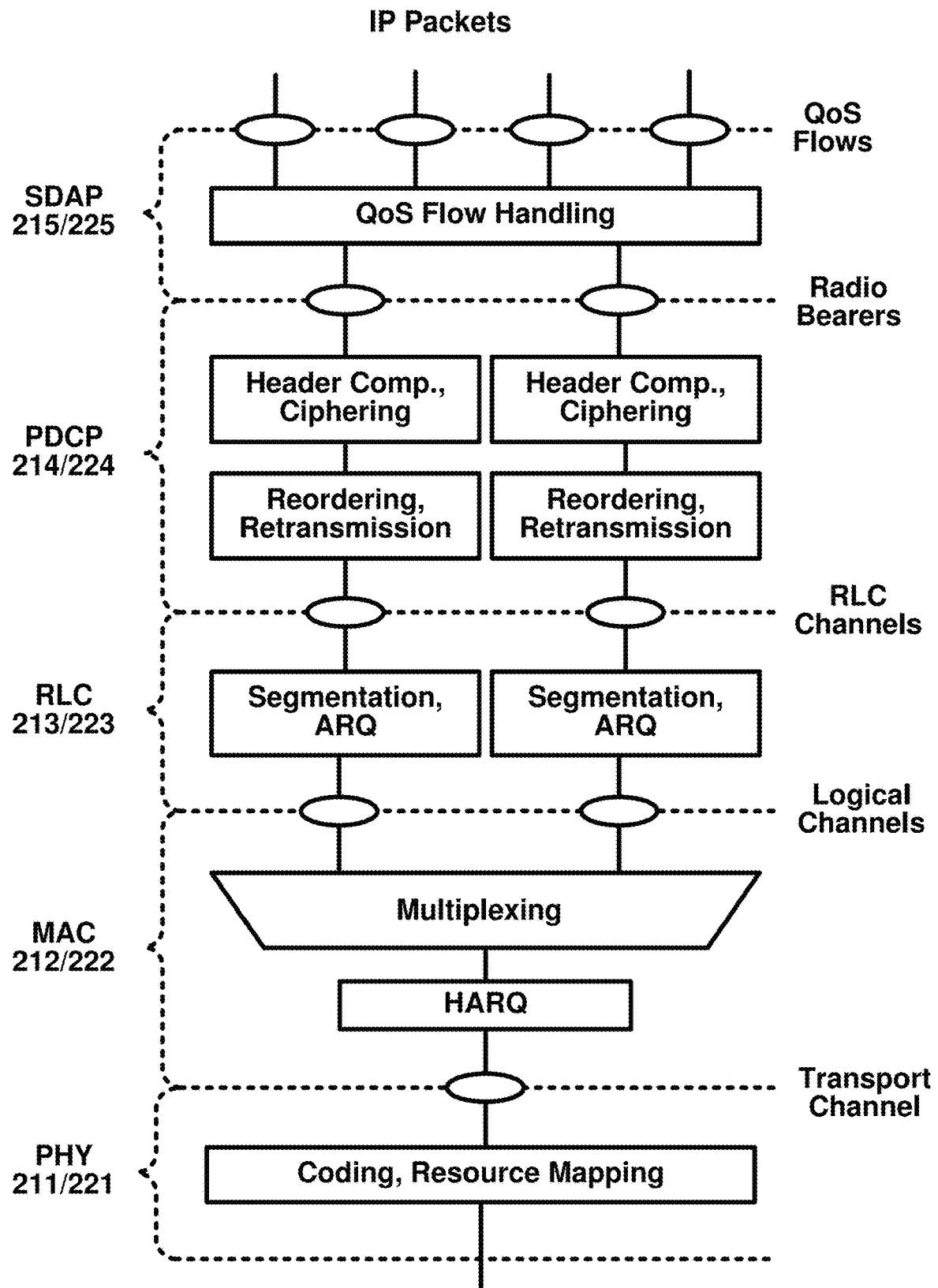
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN.

The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use.

As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG.

3, the PHYs 211 and 221 may provide one or more transport channels as a service to the MACs 212 and 222.

Figure 4A:
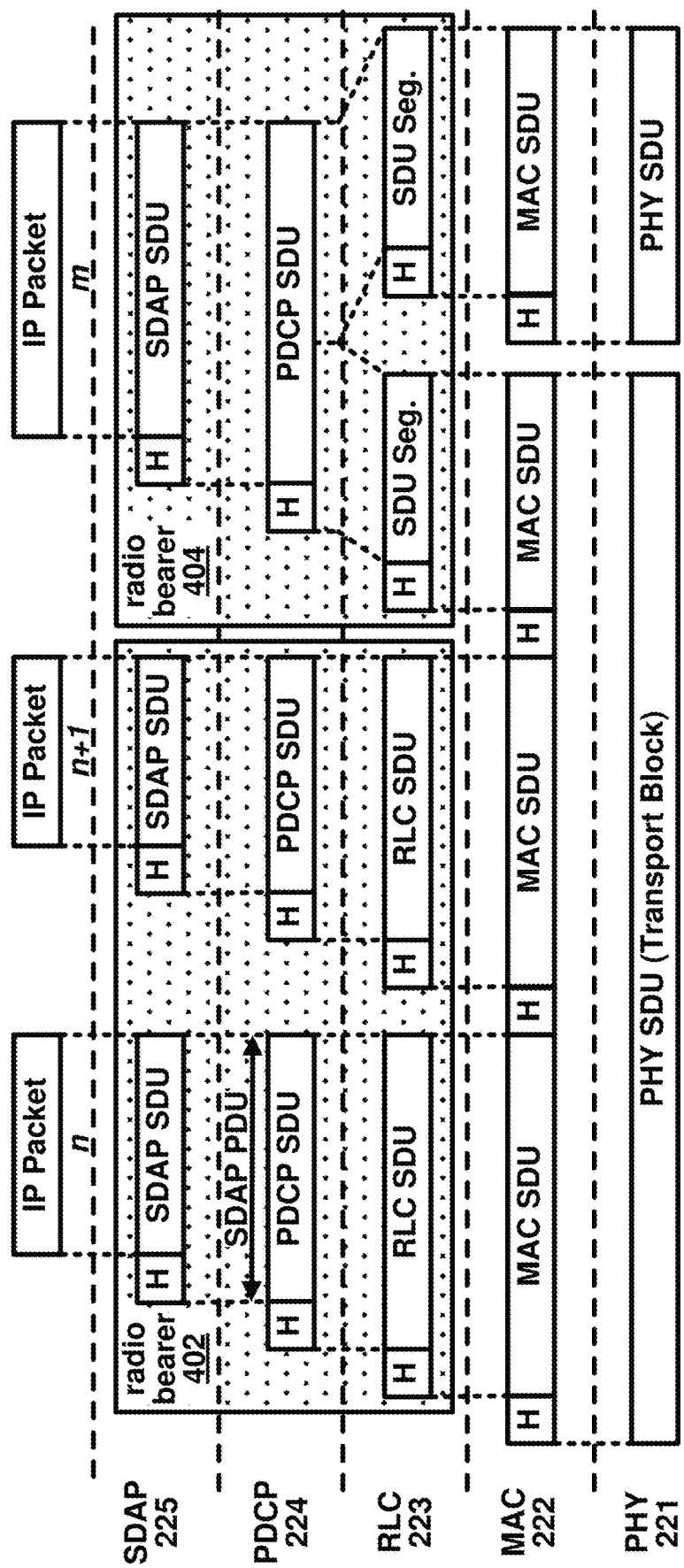
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
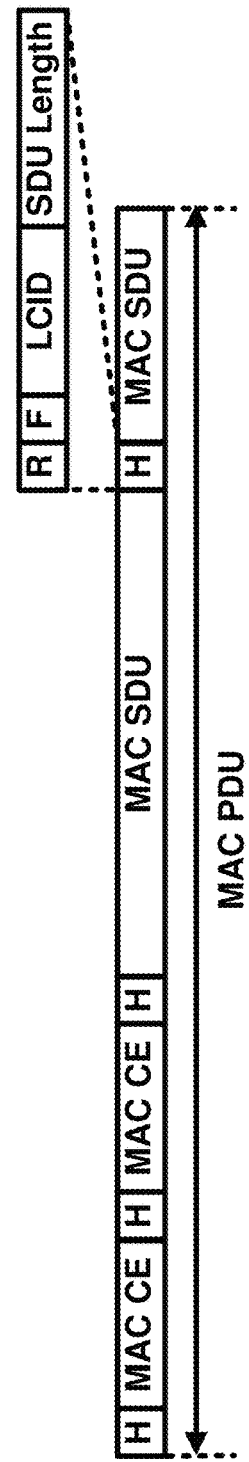
FIG. 4B illustrates an example format of a MAC subheader in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figure 5B:
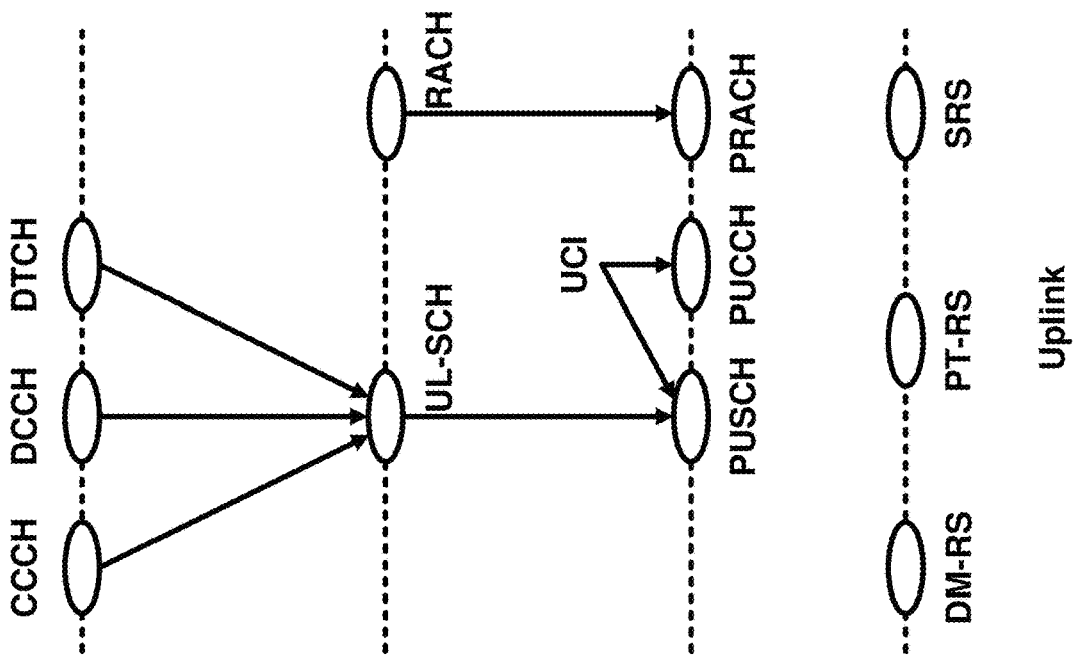
FIG. 5A and FIG. 5B respectively illustrate a mapping between logical channels, transport channels, and physical channels for the downlink and uplink.
Figure 5A:
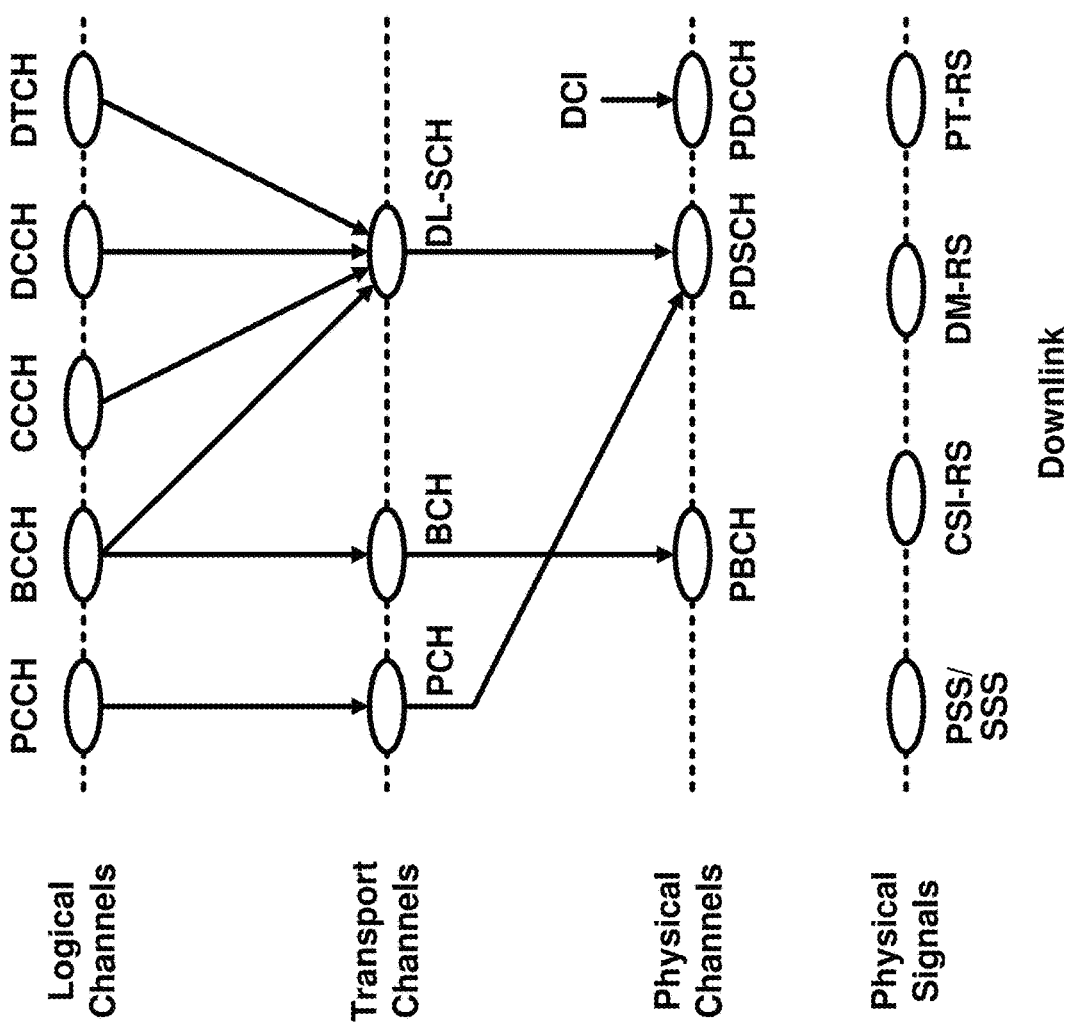

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;
  a broadcast control channel (BCCH) for carrying system information messages in the form of a master information block (MIB) and several system information blocks (SIBs), wherein the system information messages may be used by the UEs to obtain information about how a cell is configured and how to operate within the cell;
  a common control channel (CCCH) for carrying control messages together with random access;
  a dedicated control channel (DCCH) for carrying control messages to/from a specific the UE to configure the UE; and
  a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;
  a broadcast channel (BCH) for carrying the MIB from the BCCH;
  a downlink shared channel (DL-SCH) for carrying downlink data and signaling messages, including the SIBs from the BCCH;
  an uplink shared channel (UL-SCH) for carrying uplink data and signaling messages; and
  a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR);

and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
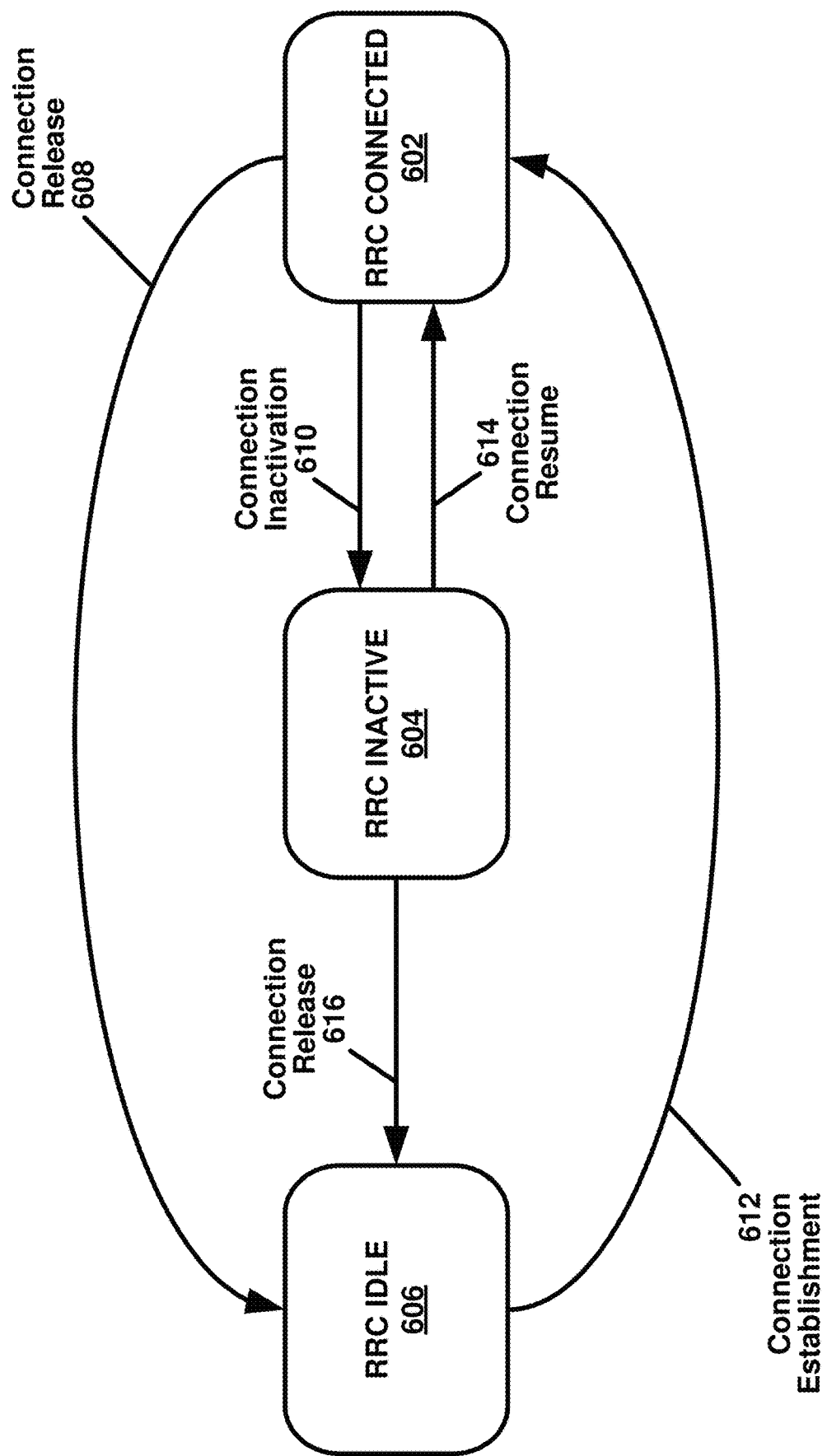
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection.

The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
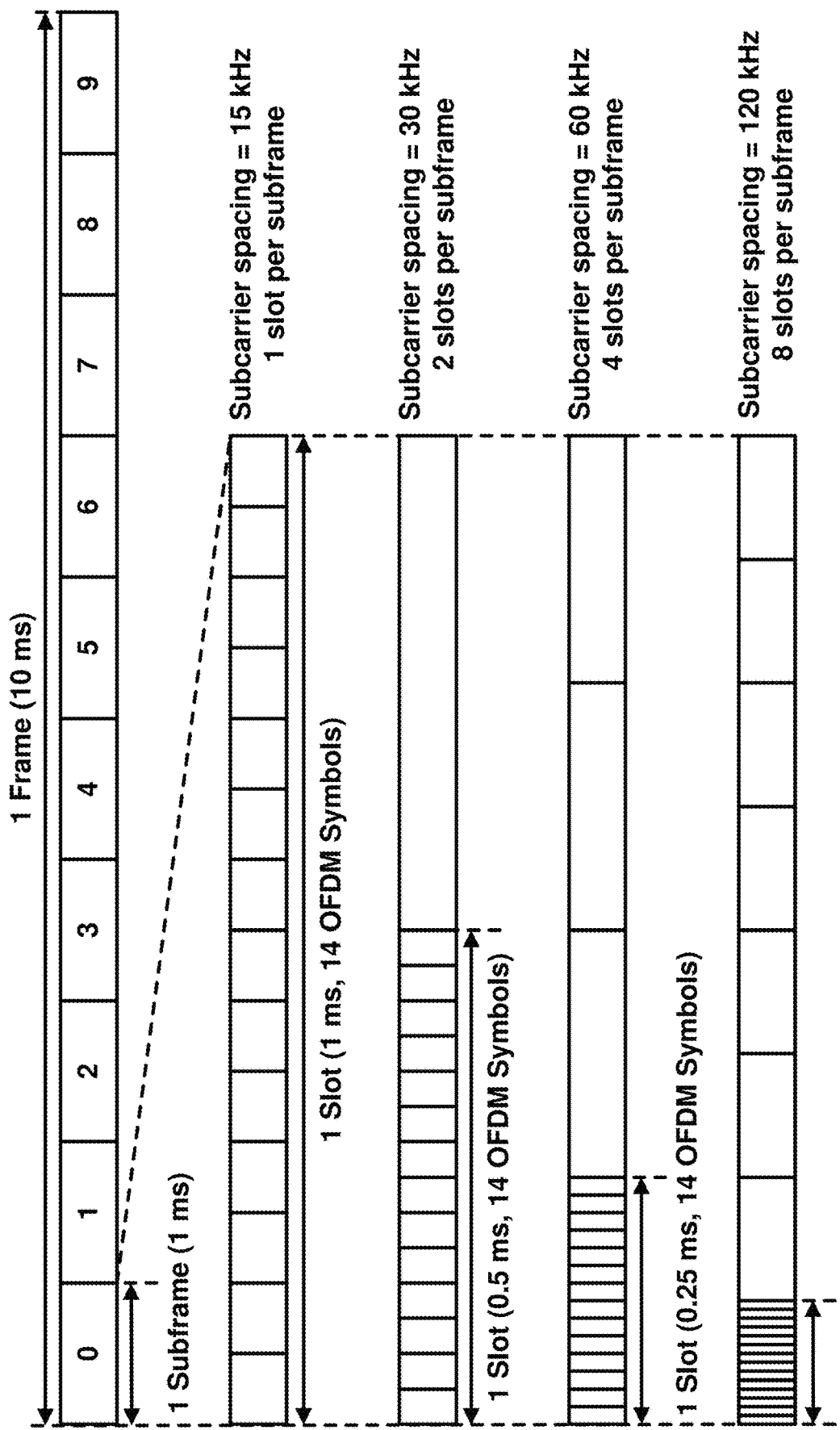
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/ cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
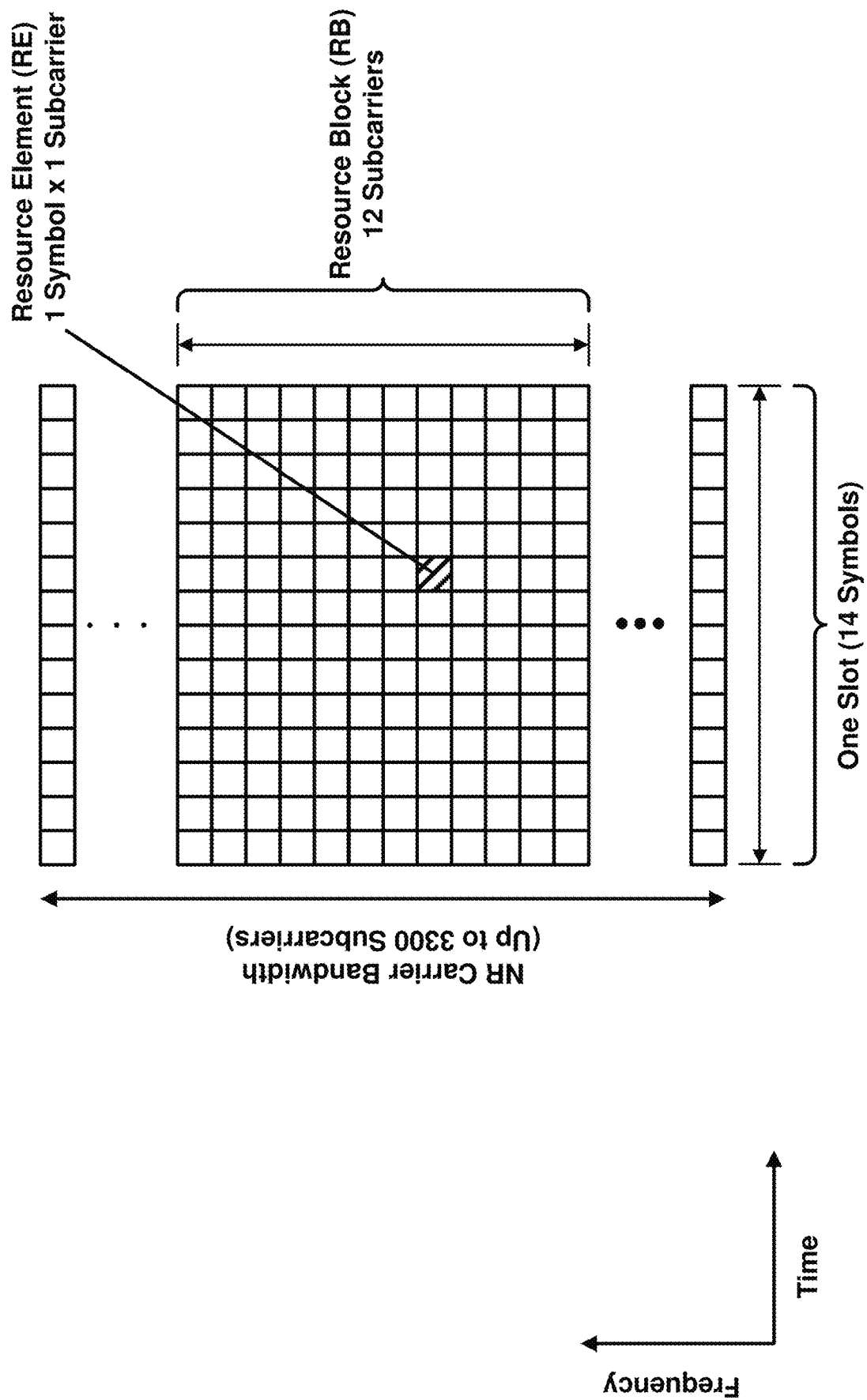
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via an RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
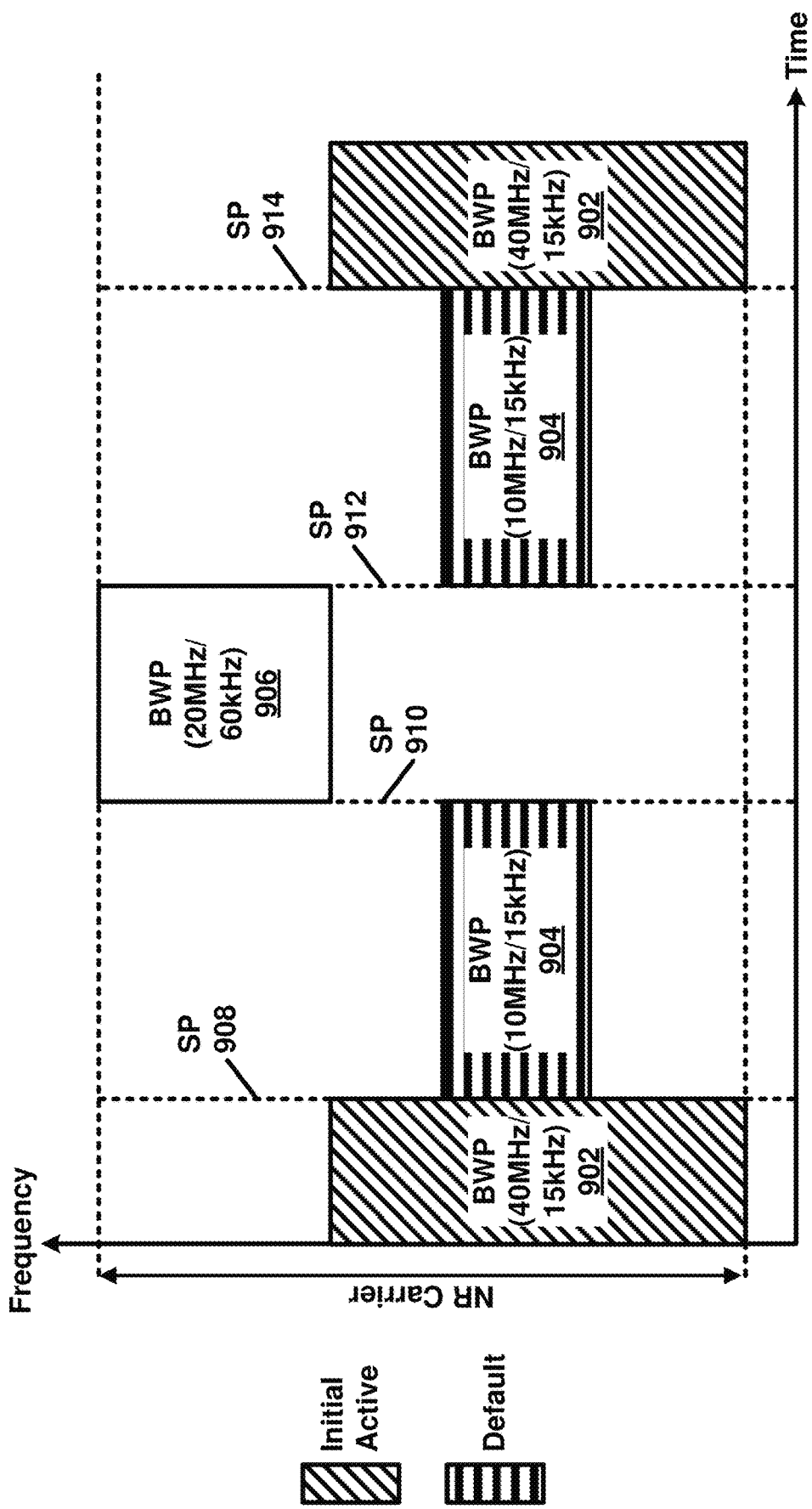
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
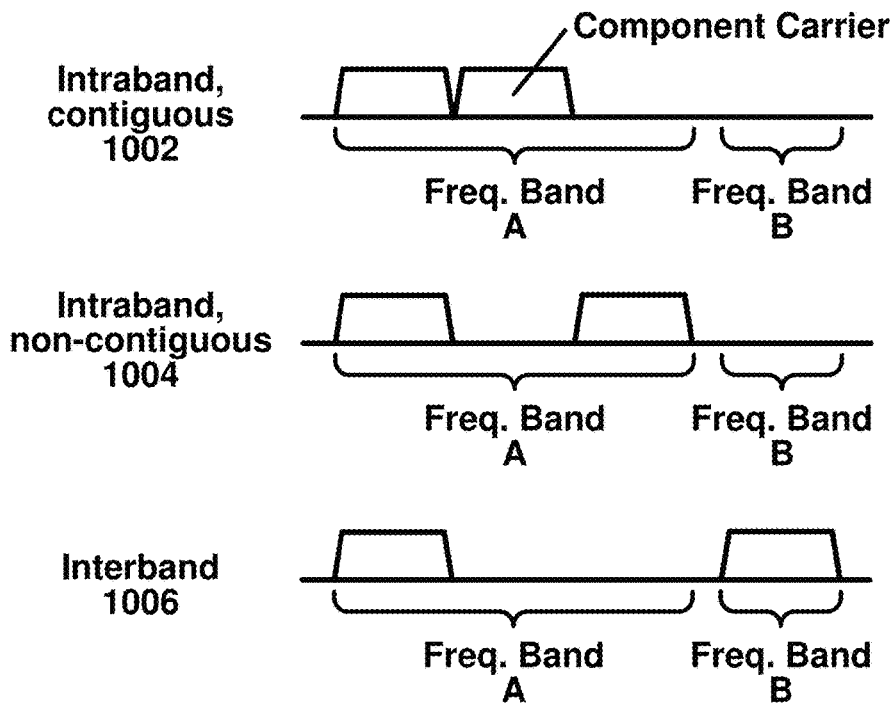
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
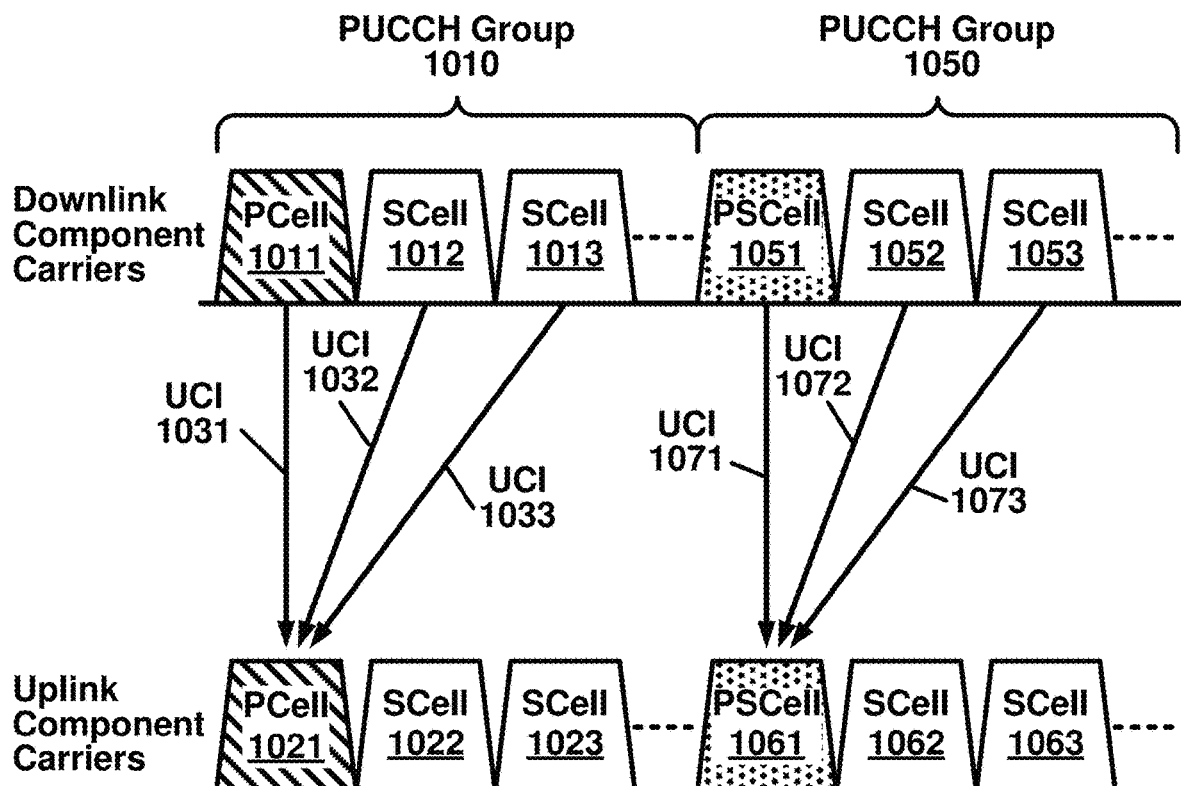
FIG. 10B illustrates an example of how aggregated cells may be configured into one or more PUCCH groups.

FIG. 10B illustrates an example of how aggregated cells may be configured into one or more PUCCH groups.

A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013.

The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary SCell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
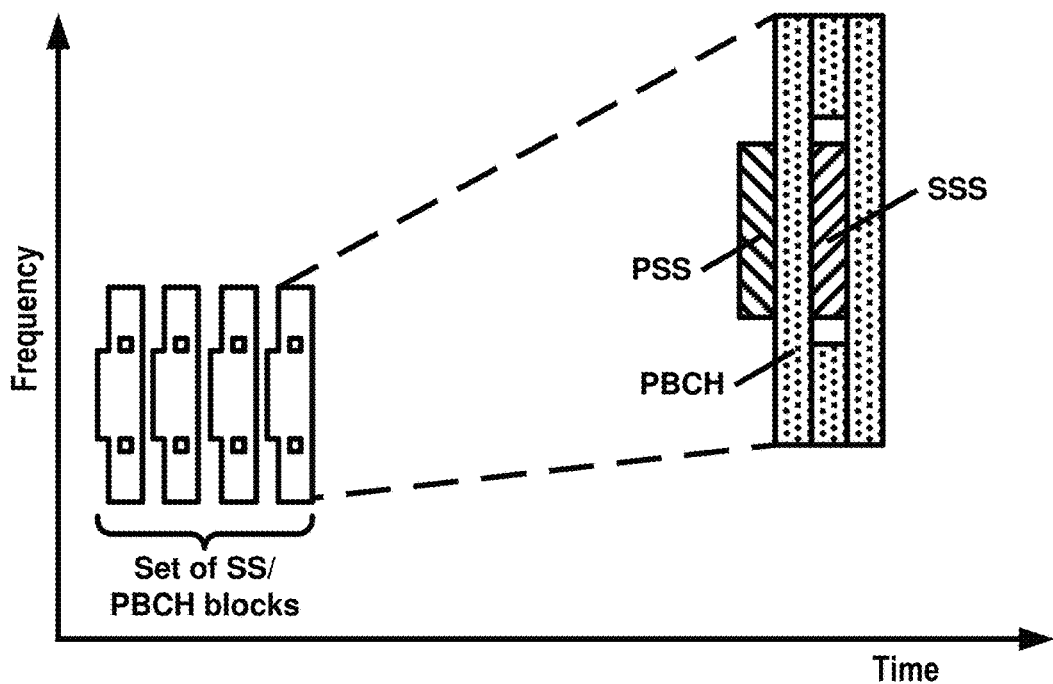
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH.

The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation.

At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g., a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g., maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
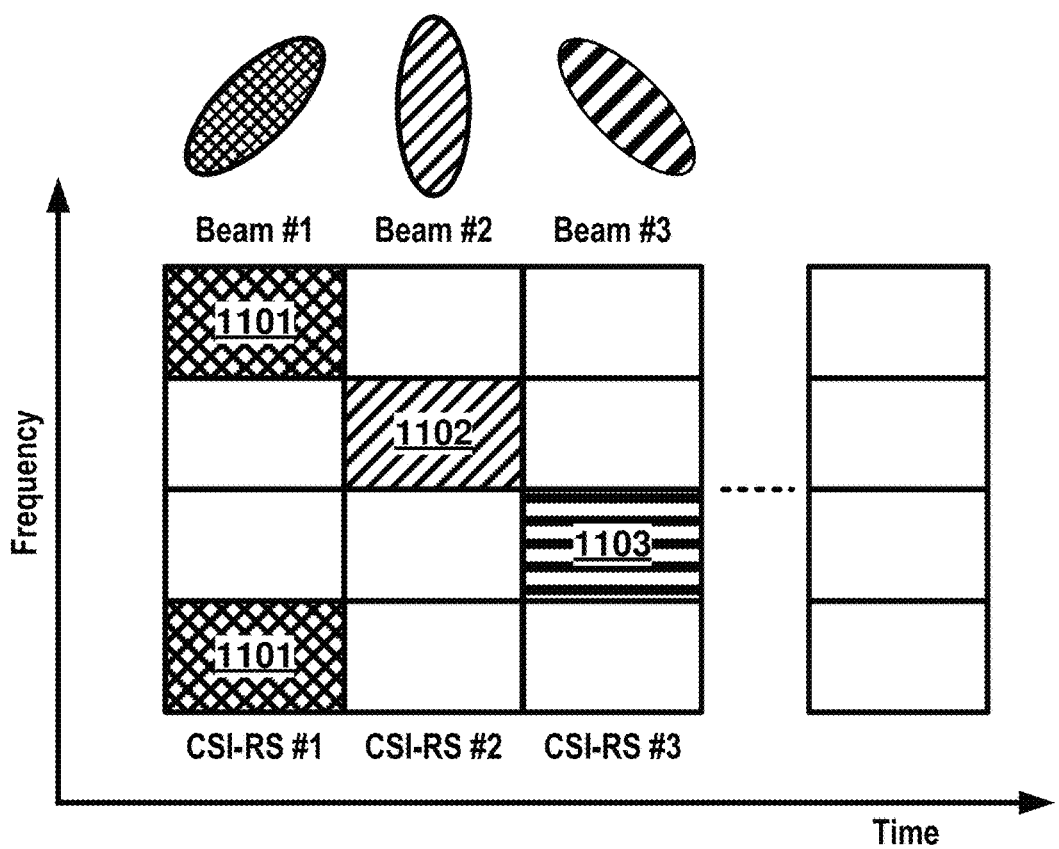
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via an RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
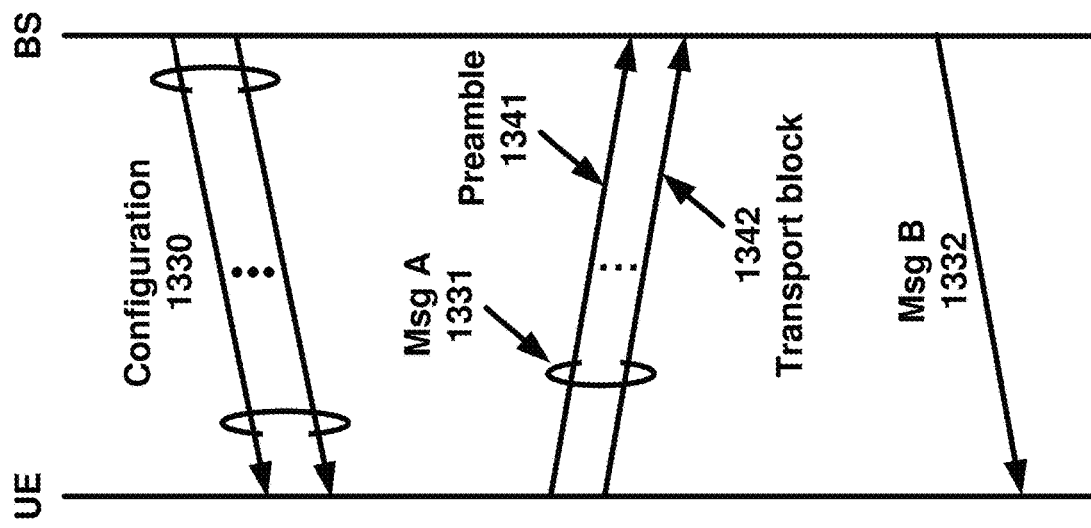
FIG. 13A, FIG. 13B, and FIG. 13C respectively illustrate a four-step contention-based random access procedure, a two-step contention-free random access procedure, and another two-step random access procedure.
Figure 13B:
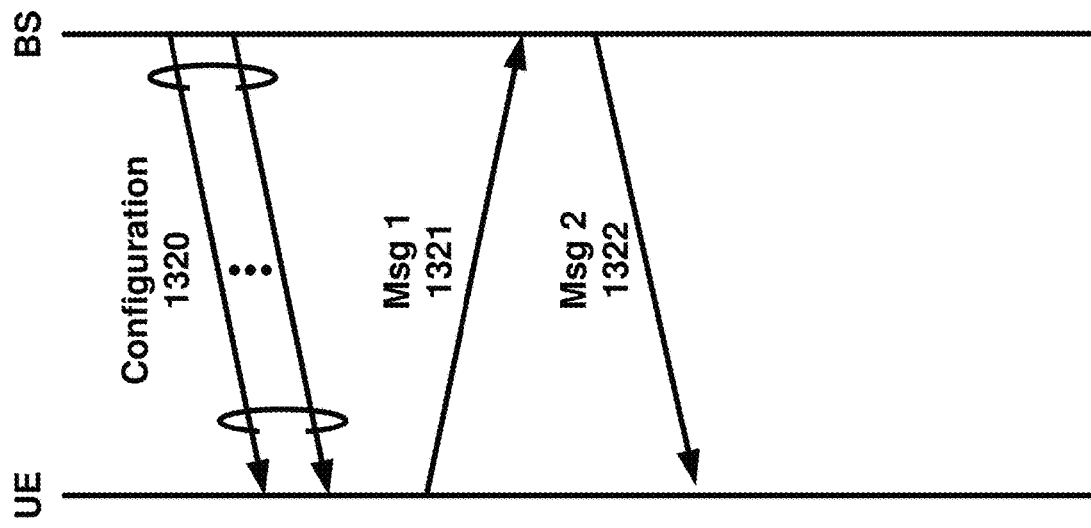
Figure 13A:
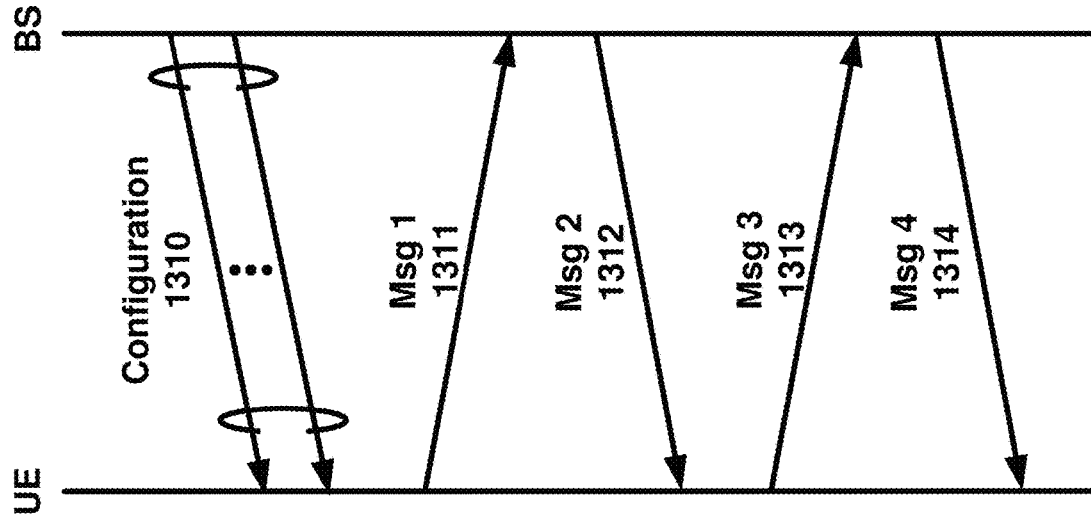

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_I-NACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI = 1 + s\_id + 14 \times f\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 31313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 21322. The Msg 1 1321 and the Msg 21322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 11321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 21322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 00 may be used for scheduling of PUSCH in a cell. DCI format 00 may be a fallback DCI format (e.g., with compact DCI payloads). DCI format 01 may be used for scheduling of PUSCH in a cell (e.g., with more DCI payloads than DCI format 0_0). DCI format 10 may be used for scheduling of PDSCH in a cell. DCI format 10 may be a fallback DCI format (e.g., with compact DCI payloads). DCI format 11 may be used for scheduling of PDSCH in a cell (e.g., with more DCI payloads than DCI format 1_0). DCI format 20 may be used for providing a slot format indication to a group of UEs. DCI format 21 may be used for notifying a group of UEs of a physical resource block and/or OFDM symbol where the UE may assume no transmission is intended to the UE. DCI format 22 may be used for transmission of a transmit power control (TPC) command for PUCCH or PUSCH. DCI format 23 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
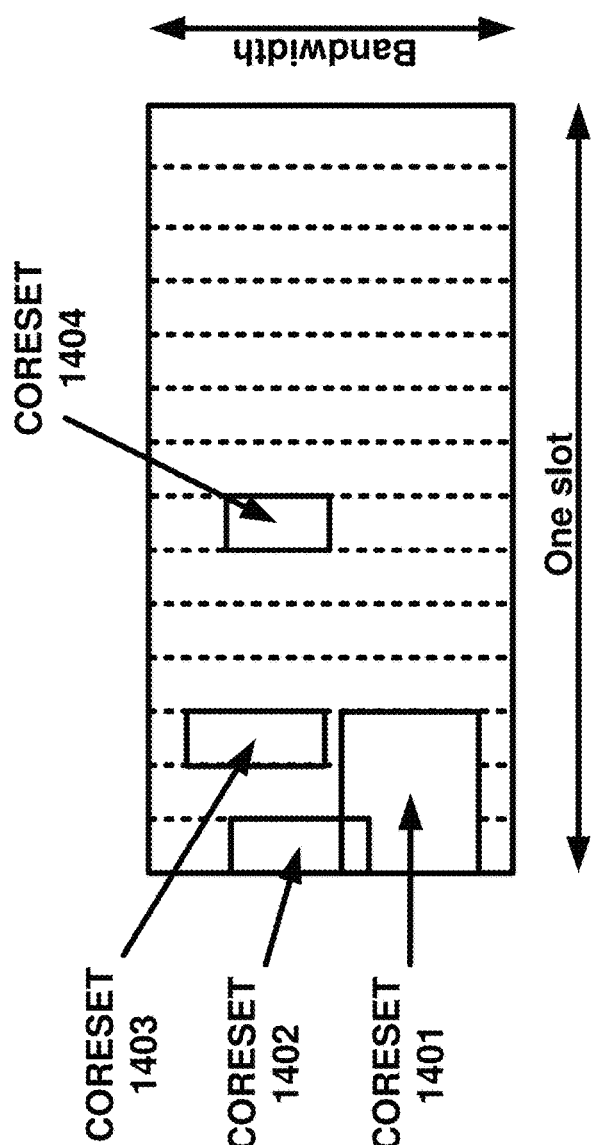
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
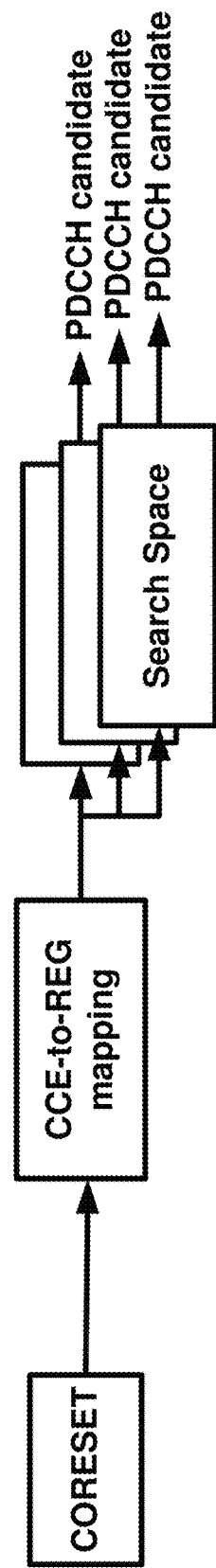
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats.

Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block.

Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g., a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 10 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
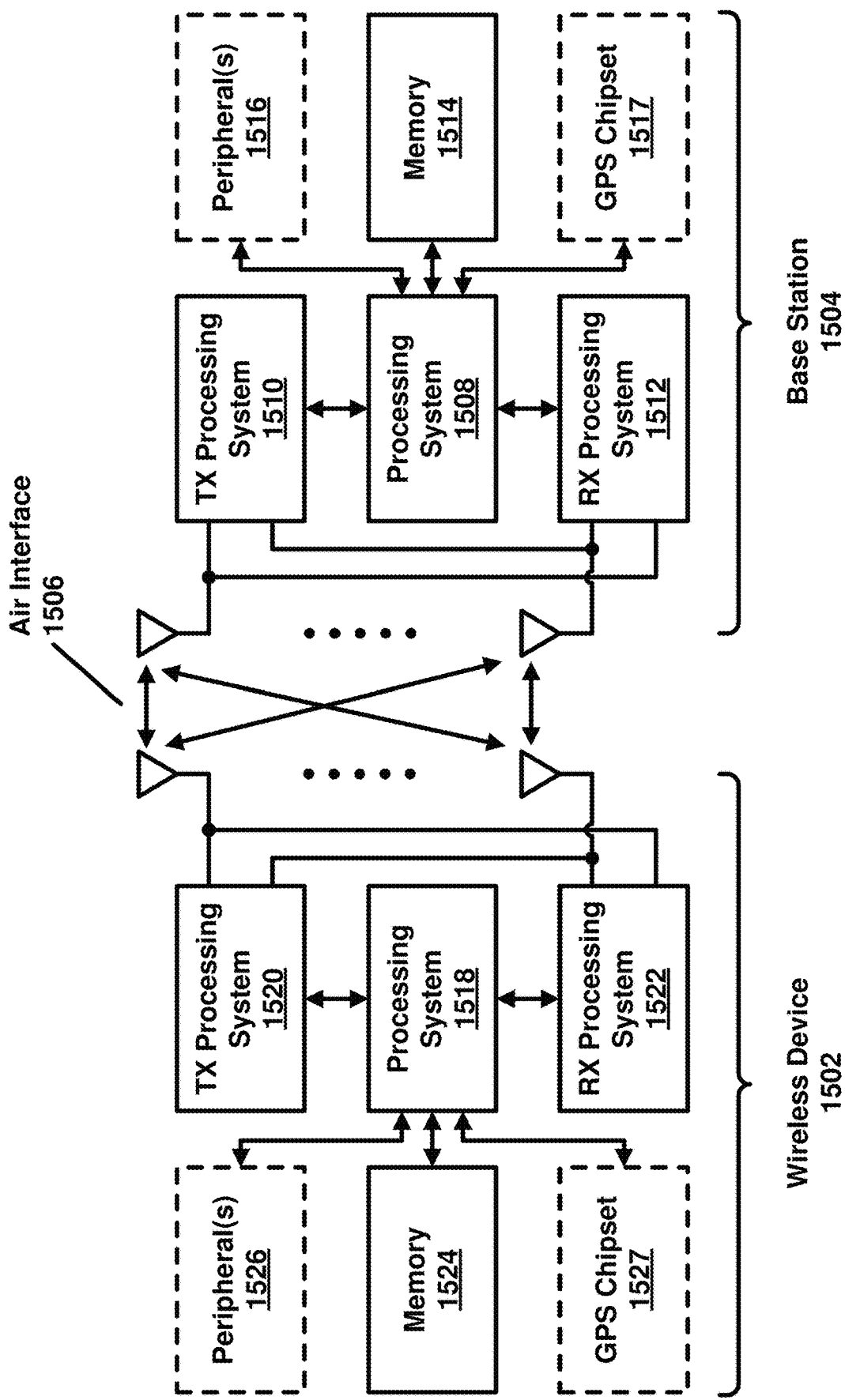
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM signal for an antenna port. Filtering may be employed prior to transmission.

A wireless device may receive from a base station one or more messages (e.g., RRC messages) comprising configuration parameters of a plurality of cells (e.g., primary cell, secondary cell). The wireless device may communicate with at least one base station (e.g., two or more base stations in dual-connectivity) via the plurality of cells. The one or more messages (e.g., as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g., the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A UE may be either in an RRC connected state or in an RRC inactive state when an RRC connection has been established. When no RRC connection is established, the UE is in an RRC idle state.

When a UE is in an RRC idle state, (an RRC layer of) the UE or a base station may support PLMN selection; broadcast of system information; cell re-selection mobility; paging for mobile terminated data is initiated by 5GC; DRX for core network (CN) paging configured by non-access stratum (NAS). When a UE is in an RRC idle state, a UE specific DRX may be configured by upper layers; and/or UE controlled mobility based on network configuration. When a UE is in an RRC idle state, (an RRC layer of) the UE may: monitor short messages transmitted with P-RNTI over DCI; monitor a paging channel for core network (CN) paging using serving temporary mobile subscriber identity (S-TMSI) (e.g., 5G-S-TMSI); perform neighbouring cell measurements and cell (re-)selection; acquire system information; send SI request; perform logging of available measurements together with location and time for logged measurement configured UEs.

When a UE is in an RRC inactive state, (an RRC layer of) the UE or a base station may support PLMN selection; broadcast of system information; cell re-selection mobility; paging is initiated by NG-RAN (RAN paging); RAN-based notification area (RNA) is managed by NG-RAN; DRX for RAN paging configured by NG-RAN; core network (e.g., 5G core, 5GC)—RAN (e.g., a base station) connection (both control and/or user planes) is established for UE; an UE AS context is stored in RAN and the UE; RAN knows the RNA which the UE belongs to. For example, when (the RRC layer) of a UE is in an RRC inactive state, a UE specific DRX may be configured by upper layers or by RRC layer; the UE may perform/support UE controlled mobility based on network configuration; the UE may store the UE inactive AS context; a RAN-based notification area (RNA) may be configured by the RRC layer. When a UE is in an RRC inactive state, (an RRC layer of) the UE may: monitor short messages transmitted with P-RNTI over DCI; monitor a paging channel for CN paging using S-TMSI and RAN paging using full inactive-RNTI (I-RNTI) (or full resume identity); perform neighbouring cell measurements and cell (re-)selection; perform RAN-based notification area (RNA) updates periodically and when moving outside the configured RAN-based notification area; acquire system information; send SI request; perform logging of available measurements together with location and time for logged measurement configured UEs.

When a UE is in an RRC connected state, (an RRC layer of) the UE or a base station may support that: 5GC-NG-RAN connection (both C/U-planes) is established for UE; an UE AS context is stored in RAN (e.g., a base station) and the UE; RAN knows the cell which the UE belongs to; transfer of unicast data to/from the UE; network controlled mobility including measurements. For example, when a UE is in an RRC connected state, (an RRC layer of) the UE may: store the AS context; transfer/receive unicast data; at lower layers, be configured with a UE specific DRX; for UEs supporting CA, use of one or more SCells, aggregated with the SpCell, for increased bandwidth; for UEs supporting DC, use of one SCG, aggregated with the MCG, for increased bandwidth; perform/support Network controlled mobility within NR and to/from E-UTRA; when a UE is in an RRC connected state, the UE may: monitor short messages transmitted with P-RNTI over DCI; monitor control channels associated with the shared data channel to determine if data is scheduled for it; provide channel quality and feedback information; perform neighbouring cell measurements and measurement reporting; acquire system information; perform immediate minimization of drive tests (MDT) measurement together with available location reporting.

Radio bearers may be categorized into two groups: data radio bearers (DRB) for user plane data and signalling radio bearers (SRB) for control plane data.

Signalling radio bearers" (SRBs) may be defined as radio bearers (RBs) that are used only for a transmission of RRC and NAS messages. Following SRBs may be defined: SRB0 may be for RRC messages using the common control channel (CCCH) logical channel; SRB1 may be for RRC messages (which may include a piggybacked NAS message) as well as for NAS messages prior to an establishment of SRB2, all using dedicated control channel (DCCH) logical channel; SRB2 may be for NAS messages and for RRC messages which may include logged measurement information, all using DCCH logical channel. SRB2 may have a lower priority than SRB1 and may be configured by the network after access stratum (AS) security activation; SRB3 may be for specific RRC messages when UE is in dual connectivity (e.g., (NG)EN-DC or NR-DC), all using DCCH logical channel. In downlink, piggybacking of NAS messages may be used for one dependent (e.g., with joint success/failure) procedure: bearer establishment/modification/release. In uplink piggybacking of NAS message may be used for transferring the initial NAS message during (RRC) connection setup and (RRC) connection resume. NAS messages transferred via SRB2 may be contained in RRC messages, which may not include any RRC protocol control information. Once AS security is activated, all RRC messages on SRB1, SRB2 and SRB3, including those containing NAS messages, may be integrity protected and ciphered by PDCP. NAS independently may apply integrity protection and ciphering to the NAS messages. Split SRB may is supported for dual connectivity (e.g., multi radio (MR)-DC options) in both SRB1 and SRB2. The split SRB may be not supported for SRB0 and SRB3. For operation with shared spectrum channel access, SRB0, SRB1 and SRB3 may be assigned with the highest priority channel access priority class (CAPC), (e.g., CAPC=1) while CAPC for SRB2 is configurable.

A MAC layer of an UE or a base station may offer different kinds of data transfer service. Each logical channel type may be defined by what type of information is transferred. Logical channels may be classified into two groups: control channels and traffic channels. control channels may be used for the transfer of control plane information: broadcast control channel (BCCH) which is a downlink channel for broadcasting system control information; paging control channel (PCCH) which is a downlink channel that carries paging messages; common control channel (CCCH) which is a channel for transmitting control information between UEs and network. This channel is used for UEs having no RRC connection with the network; and dedicated control channel (DCCH) which is a point-to-point bi-directional channel that transmits dedicated control information between a UE and the network. Used by UEs having an RRC connection. Traffic channels may be used for the transfer of user plane information: dedicated traffic channel (DTCH) which is point-to-point channel, dedicated to one UE, for the transfer of user information. A DTCH may exist in both uplink and downlink.

A UE may transition to an RRC connected state when an RRC connection is established or resumed. The UE may transition to an RRC idle state when RRC connection is released or suspended. The UE may transition to an RRC inactive state when RRC connection is suspended. When the UE is in an RRC idle state, the UE may have a suspended RRC connection. Based on the suspended RRC connection in the RRC idle state, the UE is in an RRC idle state with a suspended RRC connection.

An RRC connection establishment may comprise the establishment of SRB1. A base station may complete the RRC connection establishment prior to completing the establishment of a connection (e.g., N2/N3 connection) with a core network, (e.g., prior to receiving the UE context information from core network entity (e.g., AMF)). Access stratum (AS) security may be not activated during the initial phase of the RRC connection. During the initial phase of the RRC connection, the base station may configure the UE to perform measurement reporting. The UE may send the corresponding measurement reports after successful AS security activation. The UE may receive or accept a handover message (e.g., a handover command) when AS security has been activated.

Upon receiving the UE context from the core network (e.g., AMF), an RAN (a base station) may activate AS security (both ciphering and integrity protection) using the initial AS security activation procedure. RRC messages to activate AS security (command and successful response) may be integrity protected while ciphering is started after completion of the procedure. The response to the RRC messages used to activate AS security may be not ciphered, while the subsequent messages (e.g., used to establish SRB2 and DRBs) may be both integrity protected and ciphered. After having initiated the initial AS security activation procedure, the network (e.g., the base station) may initiate the establishment of SRB2 and DRBs, e.g., the network may do this prior to receiving the confirmation of the initial AS security activation from the UE. The network may apply both ciphering and integrity protection for RRC reconfiguration messages used to establish SRB2 and DRBs. The network should release the RRC connection if the initial AS security activation and/or the radio bearer establishment fails. A configuration with SRB2 without DRB or with DRB without SRB2 may be not supported (i.e., SRB2 and at least one DRB must be configured in the same RRC Reconfiguration message, and it may be not allowed to release all the DRBs without releasing the RRC Connection).

For integrated access and backhaul mobile termination (IAB-MT), a configuration with SRB2 without DRB may be supported.

The release of the RRC connection may be initiated by the network. The procedure of the release may be used to re-direct the UE to an NR frequency or an E-UTRA carrier frequency.

The suspension of the RRC connection may be initiated by the network. When the RRC connection is suspended, the UE may store the UE Inactive AS context and any configuration received from the network, and transit to RRC inactive state. The RRC message to suspend the RRC connection may be integrity protected and ciphered.

The resumption of a suspended RRC connection may be initiated by upper layers when the UE needs to transit from RRC inactive state to RRC connected state or by RRC layer to perform a RNA update or by RAN paging from RAN (e.g., a base station). When the RRC connection is resumed, network may configure the UE according to the RRC connection resume procedure based on the stored UE Inactive AS context and any RRC configuration received from the network. The RRC connection resume procedure re-activates AS security and re-establishes SRB(s) and DRB(s).

In response to a request to resume the RRC connection, the network may resume the suspended RRC connection and send/transition UE to RRC connected state, or reject the request to resume and send UE to RRC inactive state (with a wait timer), or directly re-suspend the RRC connection and send UE to RRC_INACTIVE, or directly release the RRC connection and send/transition UE to RRC idle state, or instruct the UE to initiate NAS level recovery (in this case the network sends an RRC setup message). For user data (DRBs), ciphering may provide user data confidentiality and integrity protection provides user data integrity. For RRC signalling (SRBs), ciphering may provide signalling data confidentiality and integrity protection signalling data integrity. Ciphering and integrity protections may be optionally configured except for RRC signalling for which integrity protection may be always configured. Ciphering and integrity protection may be configured per DRB.

For key management and data handling, network entities or an UE processing cleartext may be protected from physical attacks and located in a secure environment. Base station (e.g., gNB or eNB) (AS) keys may be cryptographically separated from the (NAS) keys. Separate AS and NAS level security mode command (SMC) procedures may be used. A sequence number (COUNT) may be used as input to the ciphering and integrity protection and a given sequence number may be used once for a given key (except for identical re-transmission) on the same radio bearer in the same direction.

Keys for security may are organized and derived as follows. A key for a core network entity (e.g., AMF or a key for mobility management entity (MME)) may comprise KAMF (or KMME). The key for a core network entity may be a key derived by mobile equipment (ME) of a UE and a security anchor function (SEAF) from a key for the SEAF (KSEAF). Keys for NAS signalling may comprise: KNASint is a key derived by mobile equipment (ME) of a UE and the core network from a key for the core network entity, which may be used for the protection of NAS signalling with a particular integrity algorithm; and KNASenc is a key derived by ME and the core network entity from a key for the core network entity (e.g., KAMF/KMME), which may be used for the protection of NAS signalling with a particular encryption algorithm. A key for a base station (e.g., gNB or eNB) may comprise KgNB (or KeNB) is a key derived by ME and a core network entity (e.g., AMF/MME) from a key for the core network entity (e.g., KAMF/KMME). A key for a base station may be further derived by ME and source base station when performing horizontal or vertical key derivation. Keys for UP traffic may comprise: KUPenc is a key derived by ME and a base station from key for a base station, which may be used for the protection of UP traffic between ME and a base station with a particular encryption algorithm; KUPint may be a key derived by ME and a base station from a key for a base station, which may be used for the protection of UP traffic between ME and a base station with a particular integrity algorithm. Keys for RRC signalling may comprise: KRRCint is a key derived by ME and a base station from a key for a base station, which may be used for the protection of RRC signalling with a particular integrity algorithm; KRRCenc is a key derived by ME and a base station from a key for a base station, which may be used for the protection of RRC signalling with a particular encryption algorithm. Intermediate keys may comprise: next hop parameters (NH) is a key derived by ME and a core network entity (e.g., AMF/MME) to provide forward security; KgNB* (or KeNB*) is a key derived by ME and a base station when performing a horizontal or vertical key derivation.

A primary authentication may enable mutual authentication between the UE and the network and provide an anchor key called KSEAF. From KSEAF, a key for a core network entity (e.g., KAMF/KMME) may be created during e.g., primary authentication or NAS key re-keying and key refresh events. Based on the key for the core network entity, KNASint and KNASenc may be then derived when running a successful NAS SMC procedure.

Whenever an initial AS security context needs to be established between UE and a base station, a core network entity (e.g., AMF/MME) and the UE may derive a key for a base station (e.g., KgNB/KeNB) and a next hop parameter (NH). The key for a base station and the NH may be derived from the key for a core network entity. A next hop chaining counter (NCC) may be associated with each key for a base station and NH parameter. A key for a base station may be associated with the NCC corresponding to the NH value from which it was derived. At initial setup, the key for a base station may be derived directly from a key for a core network entity, and be then considered to be associated with a virtual NH parameter with NCC value equal to zero. At initial setup, the derived NH value may be associated with the NCC value one. On handovers, the basis for the key for a base station that will be used between the UE and the target base station, called KgNB*(or KeNB*), may be derived from either the currently active key for a base station or from the NH parameter. If KgNB*(or KeNB*) may be derived from the currently active key for a base station, this is referred to as a horizontal key derivation and is indicated to UE with an NCC that does not increase. If the KgNB*(or KeNB*) is derived from the NH parameter, the derivation is referred to as a vertical key derivation and is indicated to UE with an NCC increase. KRRCint, KRRCenc, KUPint and KUPenc may be derived based on a key for a base station after a new key for a base station is derived.

Based on key derivation, a base station with knowledge of a key for a base station (e.g., a KgNB/KeNB), shared with a UE, may be unable to compute any previous KgNB that has been used between the same UE and a previous base station, therefore providing backward security. A base station with knowledge of a key for a base station shared with a UE, may be unable to predict any future key for a base station that will be used between the same UE and another base station after n or more handovers (since NH parameters are only computable by the UE and the core network entity (e.g., AMF/MME)).

An AS SMC procedure may be for RRC and UP security algorithms negotiation and RRC security activation. When AS security context is to be established in a base station, the AMF (or MME) may send security capabilities of a UE to the base station. The base station may choose a ciphering algorithm. The chosen ciphering algorithm may have the highest priority from its configured list and be also present in the security capabilities. The base station may choose a integrity algorithm. The chosen integrity algorithm may have the highest priority from its configured list and be also present in the security capabilities. The chosen algorithms may be indicated to the UE in the AS SMC and this message may be integrity protected. RRC downlink ciphering (encryption) at the base station may start after sending the AS SMC message. RRC uplink deciphering (decryption) at the base station may start after receiving and successful verification of the integrity protected AS security mode complete message from the UE. The UE may verify the validity of the AS SMC message from the base station by verifying the integrity of the received message. RRC uplink ciphering (encryption) at the UE may start after sending the AS security mode complete message. RRC downlink deciphering (decryption) at the UE may start after receiving and successful verification of the AS SMC message. The RRC connection reconfiguration procedure used to add DRBs may be performed only after RRC security has been activated as part of the AS SMC procedure.

A UE may support integrity protected DRBs. In case of failed integrity check (e.g., faulty or missing message authentication code for integrity (MAC-I)), the concerned packet data unit (PDU) may be discarded by a receiving PDCP entity. Key refresh may be possible for a key for a base station ($K_{gNB}/K_{eNB}$), $K_{RRC-enc}$, $K_{RRC-int}$, $K_{UP-enc}$, and $K_{UP-int}$ and may be initiated by the base station when a PDCP COUNTs are about to be re-used with the same Radio Bearer identity and with the same $K_{gNB}$. Key re-keying may be possible for the key for a base station ($K_{gNB}/K_{eNB}$), $K_{RRC-enc}$, $K_{RRC-int}$, $K_{UP-enc}$, and $K_{UP-int}$ and may be initiated by a core network entity (e.g., AMF/MME) when a AS security context different from the currently active one may be activated.

When a UE transition from an RRC idle state to an RRC connected state, RRC protection keys and UP protection keys may be generated while keys for NAS protection as well as higher layer keys are assumed to be already available. These higher layer keys may have been established as a result of an authentication and key agreement (AKA) run, or as a result of a transfer from another AMF during handover or idle mode mobility. When a UE transitions from an RRC connected state to an RRC idle state, base station may delete the keys it stores for that UE such that state information for idle mode UEs only has to be maintained in a core network entity (e.g., AMF/MME). A base station may do no longer store state information about the corresponding UE and delete the current keys from its memory (e.g., when transitioning an RRC connected state to an RRC idle state): the base station and UE may delete NH, key for a base station, KgNB, KRRCint, KRRCenc, KUPint and KUPenc and related NCC; the core network entity (e.g., AMF/MME) and UE may keep key for a core network entity (e.g., KAMF/KMME), KNASint and KNASenc stored.

On mobility with vertical key derivation the NH may be further bound to the target physical cell identifier (PCI) and its frequency absolute radio frequency channel number-downlink link (ARFCN-DL) before it is taken into use as the key for a base station in the target base station. On mobility with horizontal key derivation the currently active key for a base station may be further bound to the target PCI (PCI of the target cell) and its frequency ARFCN-DL before it is taken into use as the key for a base station in the target gNB. In both cases, ARFCN-DL may be the absolute frequency of SSB of the target primary cell (PCell). It may be not required to change the AS security algorithms during intra-gNB-central unit (CU) handover. If the UE does not receive an indication of new AS security algorithms during an intra-gNB-CU handover, the UE may continue to use the same algorithms as before the handover.

AS security may comprise of the integrity protection and ciphering of RRC signalling (SRBs) and user data (DRBs). The AS may apply four different security keys: one for the integrity protection of RRC signalling (KRRCint), one for the ciphering of RRC signalling (KRRCenc), one for integrity protection of user data (KUPint) and one for the ciphering of user data (KUPenc). The four AS keys may be derived from a key for a base station (e.g., KgNB/KgNB). The key for a base station may be based on a key for a core network entity (KAMF/KMME), which may be handled by upper layers (e.g., NAS layer). The integrity protection and ciphering algorithms may be changed with reconfiguration with sync (e.g., handover command). The AS keys (KgNB, KRRCint, KRRCenc, KUPint and KUPenc) may change upon reconfiguration with sync and upon connection re-establishment and connection resume. For each radio bearer an independent counter (count) may be maintained for each direction. For each radio bearer, the count may be used as input for ciphering and integrity protection.

Paging may allow a base station to reach UEs in an RRC idle state and in an RRC inactive state through paging messages, and to notify UEs in an RRC idle state, in an RRC inactive state and an RRC connected state of system information change, and earthquake and tsunami warning system (ETVWS) or commercial mobile alert service (CMAS) indications through short messages. Both paging messages and short messages may be addressed with P-RNTI on PDCCH. The paging messages may be sent on PCCH, the short message may be sent over PDCCH directly.

While a UE is in an RRC idle state, the UE may monitor a paging channels for core network (CN)-initiated paging. While a UE is in an RRC inactive state, the UE may monitor paging channels for RAN-initiated paging. A UE may need not monitor paging channels continuously though. Paging DRX is defined where the UE in an RRC idle state or an RRC inactive state may be only required to monitor paging channels during one paging occasion (PO) per DRX cycle. The Paging DRX cycles may be configured by the network (e.g., a base station or a core network entity (e.g., AMF/MME)): for CN-initiated paging, a default cycle may be broadcast in system information; For CN-initiated paging, a UE specific cycle may be configured via an NAS signalling; For RAN-initiated paging, a UE-specific cycle may be configured via an RRC signalling; The UE may use the shortest of the DRX cycles applicable. For example, a UE in an RRC idle state may use the shortest of the first two cycles above. A UE in RRC_INACTIVE may use the shortest of the three cycles above.

The POs of a UE for CN-initiated and RAN-initiated paging may be based on the same UE identity (ID), resulting in overlapping POs for both. The number of different POs in a DRX cycle may be configurable via system information and a network may distribute UEs to those POs based on their IDs.

When in RRC_CONNECTED, the UE may monitor the paging channels in any PO signalled in system information for SI change indication and PWS notification. A UE in RRC connected state only may monitor paging channels on the active BWP with common search space configured. For operation with shared spectrum channel access, a UE may be configured for an additional number of PDCCH monitoring occasions in its PO to monitor for paging. When the UE detects a PDCCH transmission within the UE's PO addressed with P-RNTI, the UE may be not required to monitor the subsequent PDCCH monitoring occasions within this PO.

A network (e.g., a base station) may initiate a paging procedure by transmitting the paging message at the UE's paging occasion. The network may address multiple UEs within a paging message by including one paging record for each UE. The paging message may comprise a paging record list. The paging record list may comprise one or more paging records. Each paging record may comprise at least one of: a UE identity (ID) and access type. The UE identity may comprise S-TMSI or I-RNTI (resume identity). The access type may indicate whether the paging message originated due to a PDU sessions from non-3GPP access.

Cell selection may be required on transition from registration management (RM)-DEREGISTERED to RM-REGISTERED, from CM-IDLE to CM-CONNECTED and from CM-CONNECTED to CM-IDLE. the RM-DEREGISTERED state, the UE may be not registered with the network. The UE context in a core network entity (e.g., AMF/MME) may hold no valid location or routing information for the UE. The UE may be not reachable by the AMF. In the RM-REGISTERED state, the UE is registered with the network. In the RM-REGISTERED state, the UE can receive services that require registration with the network. A UE in CM-IDLE state may have no NAS signalling connection established with the core network entity (e.g., AMF/MME) (e.g., over N1/S1 interface). The UE may perform cell selection/cell reselection and PLMN selection. A UE in CM-CONNECTED state may have a NAS signalling connection with the core network entity (e.g., over N1/S1 interface). A NAS signalling connection may use an RRC connection between the UE and a base station (e.g., RAN) and an next generation application protocol (NGAP)/ S1AP UE association between access network (AN) (e.g., AN of the base station) and the core network entity (e.g., AMF/MME).

Cell selection may be based on following principles. The UE NAS layer may identify a selected PLMN and equivalent PLMNs. Cell selection may be based on cell defining SSB (CD-SSBs) located on synchronization raster: A UE may search the frequency (NR) bands and for each carrier frequency may identify the strongest cell as per the CD-SSB. The UE may then read cell system information broadcast to identify its PLMN(s): The UE may search each carrier in turn ("initial cell selection") or make use of stored information to shorten the search ("stored information cell selection"). The UE may seek to identify a suitable cell; if the UE is not able to identify a suitable cell it seeks to identify an acceptable cell. When a suitable cell is found or if only an acceptable cell is found, the UE may camp on that cell and commence the cell reselection procedure: A suitable cell is one for which the measured cell attributes satisfy the cell selection criteria; the cell PLMN is the selected PLMN, registered or an equivalent PLMN; the cell is not barred or reserved and the cell is not part of a tracking area which is in the list of "forbidden tracking areas for roaming"; An acceptable cell is one for which the measured cell attributes satisfy the cell selection criteria and the cell is not barred.

On transition from an RRC connected state or RRC inactive state to an RRC idle state, a UE may camp on a cell as result of cell selection according to the frequency be assigned by RRC in the state transition message. The UE may attempt to find a suitable cell in the manner described for stored information or initial cell selection above. If no suitable cell is found on any frequency or RAT, the UE may attempt to find an acceptable cell. In multi-beam operations, the cell quality may be derived amongst the beams corresponding to the same cell.

A UE in an RRC idle may perform cell reselection. The principles of the procedure are the following. Cell reselection may be based on CD-SSBs located on the synchronization raster. The UE may make measurements of attributes of the serving and neighbor cells to enable the reselection process: For the search and measurement of inter-frequency neighbouring cells, the carrier frequencies need to be indicated. Cell reselection may identify the cell that the UE should camp on. The cell reselection may be based on cell reselection criteria which involves measurements of the serving and neighbor cells: intra-frequency reselection is based on ranking of cells; inter-frequency reselection is based on absolute priorities where a UE tries to camp on the highest priority frequency available; an neighbor cell list (NCL) may be provided by a serving cell to handle specific cases for intra- and inter-frequency neighbouring cells; Black lists may be provided to prevent the UE from reselecting to specific intra- and inter-frequency neighbouring cells; White lists may be provided to request the UE to reselect to only specific intra- and inter-frequency neighbouring cells; Cell reselection may be speed dependent; Service specific prioritization. In multi-beam operations, the cell quality may be derived amongst the beams corresponding to the same cell.

A UE may perform one of two procedures such as initial cell selection and cell selection by leveraging stored information. The UE may perform the initial cell selection when the UE does not have stored cell information for the selected PLMN. Otherwise, the UE may perform the cell selection by leveraging stored information. For initial cell selection, a UE may scan all RF channels in the (NR) frequency bands according to its capabilities to find a suitable cell. Based on results of the scan, the UE may search for the strongest cell on each frequency. The UE may select a cell which is a suitable cell. For the cell selection by leveraging stored information, the UE may requires stored information of frequencies and optionally also information on cell parameters from previously received measurement control information elements or from previously detected cells. Based on the stored information, the UE may search a suitable cell and select the suitable cell if the UE found the suitable cell. If the UE does not found the suitable cell, the UE may perform the initial cell selection.

A base station may configure cell selection criteria for cell selection. A UE may seek to identify a suitable cell for the cell selection. The suitable cell is one for which satisfies following conditions: (1) the measured cell attributes satisfy the cell selection criteria, (2) the cell PLMN is the selected PLMN, registered or an equivalent PLMN, (3) the cell is not barred or reserved, and (4) the cell is not part of tracking area which is in the list of "forbidden tracking areas for roaming". An RRC layer in a UE may inform a NAS layer in the UE of cell selection and reselection result based on changes in received system information relevant for NAS. For example, the cell selection and reselection result may be a cell identity, tracking area code and a PLMN identity.

A UE-RRC layer may initiate an RRC connection establishment procedure, an RRC connection resume procedure, or an RRC connection re-establishment procedure. Based on initiating the RRC connection establishment procedure or the RRC connection resume procedure, the UE may perform one or more procedures where the one or more procedures comprise at least one of: performing a unified access control procedure (e.g., access barring check) for access attempt of the RRC establishment/resume procedure on a serving cell; applying default configurations parameters and configurations/parameters provided by SIB1, (e.g., based on the access attempt being allowed, applying default configurations and configurations/parameters provided by SIB1); performing sending a random access preamble to the serving cell, for example, based on the access attempt being allowed; sending an RRC request message to the serving cell (e.g., based on determining a reception of a random access response being successful, sending an RRC request message to the serving cell0; starting a timer based on sending the RRC request message; receiving an RRC response message or an RRC reject message from the serving cell (e.g., in response to the RRC request message); or sending an RRC complete message (e.g., in response to receiving the RRC response message, sending an RRC complete message). For the RRC connection re-establishment procedure, the UE may not perform the unified access procedure (e.g., access barring check) for access attempt of the RRC reestablishment procedure.

A base station (e.g., NG-RAN) may support overload and access control functionality such as RACH back off, RRC Connection Reject, RRC Connection Release and UE based access barring mechanisms. Unified access control framework applies to all UE states (e.g., an RRC idle, inactive and connected state). The base station may broadcast barring control information associated with access categories and access identities (in case of network sharing, the barring control information may be set individually for each PLMN). The UE may determine whether an access attempt is authorized based on the barring information broadcast for the selected PLMN, the selected access category and access identities for the access attempt. For NAS triggered requests, the UE-NAS layer may determine the access category and access identities. For AS triggered requests, the UE-RRC layer determines the access category while NAS determines the access identities. The base station may handle access attempts with establishment causes "emergency", "mps-priority access" and "mcs priority access" (i.e., Emergency calls, MPS, MCS subscribers) with high priority and respond with RRC Reject to these access attempts only in extreme network load conditions that may threaten the base station stability.

Based on initiating the RRC connection establishment procedure or the RRC connection resume procedure, the UE in an RRC inactive or idle state may perform or initiate access barring check (or a unified access control procedure) for access attempt of the RRC connection establishment procedure or the RRC connection resume procedure. Based on the performing or initiating the access barring check, the UE may determine the access category and access identities for access attempt. The UE may determine the access attempt being barred based on at least one of: timer T309 is running for the access category for the access attempt; and timer T302 is running, and the Access Category is neither '2' nor '0'. The UE may determine the access attempt being allowed based on at least one of: the access Category is '0'; and system information block (system information block type 25) comprising unified access control (UAC) barring parameters is not broadcasted by a serving cell. The UE may determine the access attempt being barred based on at least one of: an establishment cause (e.g., for the access attempt) being other than emergency; access barring per RSRP parameter of the system information block comprising (or being set to) threshold 0 and the wireless device being in enhanced coverage; access barring per RSRP parameter of the system information block comprising (or being set to) threshold 1 and measured RSRP being less than a first entry in RSRP thresholds PRACH info list; the access barring per RSRP parameter of the system information block comprising (or being set to) threshold 2 and measured RSRP being less than a second entry in the RSRP thresholds PRACH info list; and the access barring per RSRP parameter of the system information block comprising (or being set to) threshold 3 and measured RSRP being less than a third entry in the RSRP thresholds PRACH info list.

The UE may determine the access attempt being allowed based on that system information block not comprising the UAC barring parameters for the access attempt. For example, the UE may determine the access attempt being allowed based on that system information block not comprising the UAC barring parameters for PLMN the UE selected and UAC barring parameters for common. The UE may determine the access attempt being allowed based on the UAC barring parameters for common not comprising the access category of the access attempt. The UAC barring parameters may comprise at least one of: UAC barring parameters per PLMN; and UAC barring parameters for common. The UE may perform access barring check for the access category of the access attempt based on the UAC barring parameters in the system information block. The UE may determine the access attempt being allowed based on corresponding bit of at least one of the access identities in the UAC barring parameters being zero. The UE may draw a first random number uniformly distributed in a range where the range is greater than equal to 0 and lower than 1.

The UE may determine the access attempt being allowed based on the first random number being lower than UAC barring factor in the UAC barring parameters. The UE may determine the access attempt being barred based on the first random number being greater than the UAC barring factor in the UAC barring parameters. In response to the determining the access attempt being barred, the UE may draw a second random number uniformly distributed in a range where the range is greater than equal to 0 and lower than 1. The UE may start barring timer T309 for the access category based on the second random number. When the barring timer T309 is running, the access attempt associated to the access category is barred (e.g., not allowed to transmit). Based on the barring timer T309 expiry, the UE may consider barring for the access category being alleviated. Based on the barring for the access category being alleviated, the UE may perform access barring check for the access category if the UE have access attempt for the access category.

Based on initiating the RRC connection reestablishment procedure, the UE may stop one or more barring timer T309 for all access categories if the one or more barring timer T309 is running. Based on stopping the one or more barring timer T309, the UE may determine barring for all access categories being alleviated. The UE may perform the RRC connection reestablishment procedure based on the barring for all access categories being alleviated. For example, the UE may send an RRC establishment request without barring based on the barring for all access categories being alleviated.

For initiating RRC connection establishment/resume/re-establishment procedure, the UE-RRC layer may use parameters in a received SIB1. The UE-RRC layer may use L1 parameter values and a time alignment timer in the SIB1. The UE-RRC layer may use UAC barring information in the SIB1 to perform the unified access control procedure. Based on the unified access control procedure, the UE-RRC layer may determine whether the access attempt of those RRC procedures is barred or allowed. Based on the determining the access attempt is allowed, the UE-RRC layer may determine send an RRC request message to a base station where the RRC request message may be an RRC setup request message, an RRC resume request message, or an RRC re-establishment message. The UE-NAS layer may or may not provide S-TMSI as an UE identity. The UE-RRC layer may set an UE identity in the RRC request message.

For the RRC setup request message, the UE in an RRC idle state may initiate an RRC connection establishment procedure. Based on initiating the RRC connection establishment procedure, the UE-RRC layer in an RRC idle state may set the UE identity to S-TMSI if the UE-NAS layer provides the S-TMSI. Otherwise, the UE-RRC layer in an RRC idle state may draw a 39-bit random value and set the UE identity to the random value. For the RRC resume request message, the UE-RRC layer in an RRC inactive or idle state may set the UE identity to resume identity stored. For the RRC reestablishment request message, the UE-RRC layer in an RRC connected state may set the UE identity to C-RNTI used in the source PCell. The UE-NAS layer may provide an establishment cause (e.g., UE-NAS layer). The UE-RRC layer may set the establishment cause for the RRC request message.

For the RRC resume request message, the UE in an RRC inactive may initiate an RRC connection resume procedure. the UE in an RRC idle state with a suspended RRC connection may initiate the RRC connection resume procedure. The UE may in an RRC inactive state or an RRC idle state may initiate the RRC connection procedure based on at least one of: resuming a (suspend) RRC connection; and performing/initiating UP small data transmission. Based on initiating the RRC connection resume procedure, the UE-RRC layer may restore stored configuration parameters and stored security keys from the stored UE inactive AS context. Based on the security keys, the UE-RRC layer in an RRC inactive or idle state may set a resume MAC-I value to the 16 least significant bits of the MAC-I calculated based on variable resume MAC input, security key of integrity protection for RRC layer in a UE inactive AS context, the previous configured integrity protection algorithm, and other security parameters (e.g., count, bearer, and direction). The variable resume MAC input may comprise at least one of: physical cell identity of a source cell; C-RNTI of the source cell; and cell identity of a target cell (e.g., a selected cell) where the cell identity is a cell identity in system information block (e.g., SIB1) of the target cell (e.g., the selected cell). Based on the security keys and next hop chaining count (NCC) value, the UE-RRC layer in an RRC inactive or idle state derive new security keys for integrity protection and ciphering, and configure lower layers (e.g., UE-PDCP layer) to apply them. The UE may have a stored NCC value and resume identity. The UE may receive an RRC release message with suspend indication (or suspend configuration parameters) where the RRC release message comprises at least one of: the resume identity; and the NCC value. The UE-RRC layer in an RRC inactive or idle state may re-establish PDCP entities for one or more bearers. The UE-RRC layer may resume one or more bearer. For example, based on resuming the RRC connection, the UE-RRC layer may resume SRB1. Based on performing the UP small data transmission, the UE-RRC layer may resume one or more SRB(s) and DRB(s). The UE-RRC layer in the RRC inactive or idle state may send an RRC resume request message to the base station where the RRC resume request message may comprise at least one of: the resume identity; the resume MAC-I; and resume cause.

For the RRC reestablishment request message, the UE in an RRC connected state may initiate an RRC connection reestablishment procedure. Based on initiating the RRC connection reestablishment procedure, the UE-RRC layer in an RRC connected state may contain the physical cell identity of the source PCell and a short MAC-I in the RRC reestablishment message. The UE-RRC layer in an RRC connected state may set the short MAC-I to the 16 east significant bits of the MAC-I calculated based on variable short MAC input, security key of integrity protection for RRC layer and the integrity protection algorithm, which was used in a source PCell or the PCell in which the trigger for the reestablishment occurred, and other security parameters (e.g., count, bearer and direction). The variable short MAC input may comprise at least one of: physical cell identity of the source cell; C-RNTI of a source cell; and cell identity of a target cell (e.g., a selected cell) where the cell identity is a cell identity in system information block (e.g., SIB1) of the target cell (e.g., the selected cell). The UE-RRC layer in an RRC connected state may re-establish PDCP entities and RLC entities for SRB1 and apply default SRB1 configuration parameters for SRB1. The UE-RRC layer in an RRC connected state may configure lower layers (e.g., PDCP layer) to suspend integrity protection and ciphering for SRB1 and resume SRB1.

A UE-RRC layer may send an RRC request message to lower layers (e.g., PDCP layer, RLC layer, MAC layer and/or PHY layer) for transmission where the RRC request message may be an RRC setup request message, an RRC resume request message, or an RRC re-establishment message.

A UE-RRC layer may receive an RRC setup message in response to an RRC resume request message or an RRC reestablishment request message. Based on the RRC setup message, the UE-RRC layer may discard any stored AS context, suspend configuration parameters and current AS security context. The UE-RRC layer may release radio resources for all established RBs except SRB0, including release of the RLC entities, of the associated PDCP entities and of SDAP. The UE-RRC layer may release the RRC configuration except for default L1 parameter values, default MAC cell group configuration and CCCH configuration. The UE-RRC layer may indicate to upper layers (e.g., NAS layer) fallback of the RRC connection. The UE-RRC layer may stop timer T380 if running where the timer T380 is periodic RAN-based Notification Area (RNA) update timer.

A UE-RRC layer may receive an RRC setup message in response to an RRC setup request message, an RRC resume request message or an RRC reestablishment request message. The RRC setup message may comprise a cell group configurations parameters and a radio bearer configuration parameters. The radio bearer configuration parameters may comprise at least one of signaling bearer configuration parameters, data radio bearer configuration parameters and/or security configuration parameters. The security configuration parameters may comprise security algorithm configuration parameters and key to use indication indicating whether the radio bearer configuration parameters are using master key or secondary key. The signaling radio bearer configuration parameters may comprise one or more signaling radio bearer configuration parameters. Each signaling radio configuration parameters may comprise at least one of SRB identity, PDCP configuration parameters, reestablish PDCP indication and/or discard PDCP indication. The data radio bearer configuration parameters may comprise one or more data radio bearer configuration parameters. Each data radio configuration parameters may comprise at least one of DRB identity, PDCP configuration parameters, SDAP configuration parameters, reestablish PDCP indication and/or recover PDCP indication. The radio bearer configuration in the RRC setup message may comprise signaling radio configuration parameters for SIB1. Based on the RRC setup message, the UE-RRC layer may establish SRB1. Based on the RRC setup message, the UE-RRC layer may perform a cell group configuration or radio bearer configuration. The UE-RRC layer may stop a barring timer and wait timer for the cell sending the RRC setup message. Based on receiving the RRC setup message, the UE-RRC layer may perform one or more of the following: transitioning to RRC connected state; stopping a cell re-selection procedure; considering the current cell sending the RRC setup message to be the PCell; or/and sending an RRC setup complete message by setting the content of the RRC setup complete message.

A UE-RRC layer may receive an RRC resume message in response to an RRC resume request message. Based on the RRC resume message, the UE-RRC layer may discard a UE inactive AS context and release a suspend configuration parameters except RNA notification area information. The RRC resume message may comprise at least one of: radio bearer configuration parameters; cell group configuration parameters; measurement configuration parameters; sk counter for AS security; an first indication to request idle/inactive measurement results; an second indication to restore secondary cells (SCells) of master cell group (MCG); a third indication to restore secondary cell group (SCG); and SCG configuration parameters; Based on the RRC resume message, the UE-RRC layer may perform a procedure to configure or restore configuration parameters (e.g., a cell group configuration, a radio bearer configuration and/or SCG configuration); security key update procedure; and/or measurement (configuration) procedure. Based on receiving the RRC resume message, the UE-RRC layer may perform one or more of the following: indicating upper layers (e.g., NAS layer) that the suspended RRC connection has been resumed; resuming SRB2, all DRBs and measurements; entering RRC connected state; stopping a cell re-selection procedure; considering the current cell sending the RRC resume message to be the PCell; or/and sending an RRC resume complete message by setting the content of the RRC resume complete message.

Cell group configuration parameters may be used to configure a master cell group (MCG) or secondary cell group (SCG). If the cell group configuration parameters are used to configure the MCG, the cell group configuration parameters are master cell group configuration parameters. If the cell group configuration parameters are used to configure the SCG, the cell group configuration parameters are secondary cell group configuration parameters. A cell group comprises of one MAC entity, a set of logical channels with associated RLC entities and of a primary cell (SpCell) and one or more secondary cells (SCells). The cell group configuration parameters (e.g., master cell group configuration parameters or secondary cell group configuration parameters) may comprise at least one of RLC bearer configuration parameters for the cell group, MAC cell group configuration parameters for the cell group, physical cell group configuration parameters for the cell group, SpCell configuration parameters for the cell group or SCell configuration parameters for the cell group. The MAC cell group configuration parameters may comprise MAC parameters for a cell group where the MAC parameters may comprise at least DRX parameters. The physical cell group configuration parameters may comprise cell group specific L1 (layer 1) parameters.

The special cell (SpCell) may comprise a primary cell (PCell) of an MCG or a primary SCG cell (PSCell) of a SCG. The SpCell configuration parameters may comprise serving cell specific MAC and PHY parameters for a SpCell. The MR-DC configuration parameters may comprise at least one of SRB3 configuration parameters, measurement configuration parameter for SCG, SCG configuration parameters.

Cell group configuration parameters may comprise at least one of RLC bearer configuration parameters, MAC cell group configuration parameters, physical cell group configuration parameters, SpCell configuration parameters for the first cell group or SCell configuration parameters for other cells of the second base station. The SpCell configuration parameter may comprise at least one of radio link failure timer and constraints, radio link monitoring in sync out of sync threshold, and/or serving cell configuration parameters of the first cell. The serving cell configuration parameters may comprise at least one of: downlink BWP configuration parameters; uplink configuration parameters; uplink configuration parameters for supplement uplink carrier (SUL); PDCCH parameters applicable across for all BWPs of a serving cell; PDSCH parameters applicable across for all BWPs of a serving cell; CSI measurement configuration parameters; SCell deactivation timer; cross carrier scheduling configuration parameters for a serving cell; timing advance group (TAG) identity (ID) of a serving cell; path loss reference linking indicating whether the UE shall apply as pathloss reference either the downlink of SpCell or SCell for this uplink; serving cell measurement configuration parameters; channel access configuration parameters for access procedures of operation with shared spectrum channel access;

The CSI measurement configuration parameters may be to configure CSI-RS (reference signals) belonging to the serving cell, channel state information report to configure CSI-RS (reference signals) belonging to the serving cell and channel state information reports on PUSCH triggered by DCI received on the serving cell.

In an example, the downlink BWP configuration parameters may be used to configure dedicated (UE specific) parameters of one or more downlink BWPs. The one or more downlink BWPs may comprise at least one of an initial downlink BWP, a default downlink BWP and a first active downlink BWP. The downlink BWP configuration parameters may comprise at least one of: configuration parameters for the one or more downlink BWPs; one or more downlink BWP IDs for the one or more downlink BWPs; and BWP inactivity timer. The configuration parameters for a downlink BWP may comprise at least one of: PDCCH configuration parameters for the downlink BWP; PDSCH configuration parameters for the downlink BWP; semi-persistent scheduling (SPS) configuration parameters for the downlink BWP; beam failure recovery SCell configuration parameters of candidate RS; and/or radio link monitoring configuration parameters for detecting cell- and beam radio link failure occasions for the downlink BWP. The one or more downlink BWP IDs may comprise at least one of an initial downlink BWP ID, a default downlink BWP identity (ID) and a first active downlink BWP ID.

In an example, the uplink configuration parameters may be uplink configuration parameters for normal uplink carrier (not supplementary uplink carrier). The uplink configuration parameters (or the uplink configuration parameters for SUL) may be used to configure dedicated (UE specific) parameters of one or more uplink BWPs. The one or more uplink BWPs may comprise at least one of an initial uplink BWP and a first active uplink BWP. The uplink BWP configuration parameters may comprise at least one of: configuration parameters for the one or more uplink BWPs; one or more uplink BWP IDs for the one or more uplink BWPs; PUSCH parameters common across the UE's BWPs of a serving cell; SRS carrier switching information; and power control configuration parameters. The configuration parameters for a uplink BWP may comprise at least one of: one or more PUCCH configuration parameters for the uplink BWP; PUSCH configuration parameters for the uplink BWP; one or more configured uplink grant configuration parameters for the uplink BWP; SRS configuration parameters for the uplink BWP; beam failure recovery configuration parameters for the uplink BWP; and/or cyclic prefix (CP) extension parameters for the uplink BWP.

The one or more uplink BWP IDs may comprise at least one of an initial uplink BWP ID (e.g., the initial uplink BWP ID=0) and/or an first active uplink BWP ID. The SRS carrier switching information may be is used to configure for SRS carrier switching when PUSCH is not configured and independent SRS power control from that of PUSCH. The power control configuration parameters may comprise at least one of power control configuration parameters for PUSCH, power configuration control parameters for PUCCH and power control parameters for SRS.

A UE-RRC layer in an RRC inactive or idle state may receive an RRC reject message in response to an RRC setup request message or an RRC resume request message. The RRC reject message may contain wait timer. Based on the wait timer, the UE-RRC layer may start timer T302, with the timer value set to the wait timer. Based on the RRC reject message, the UE-RRC layer may inform upper layers (e.g., UE-NAS layer) about the failure to setup an RRC connection or resume an RRC connection. The UE-RRC layer may reset MAC and release the default MAC cell group configuration. Based on the RRC Reject received in response to a request from upper layers, the UE-RRC layer may inform the upper layer (e.g., NAS layer) that access barring is applicable for all access categories except categories '0' and '2'.

A UE-RRC layer in an RRC inactive or idle state may receive an RRC reject message in response to an RRC resume request message. Based on the RRC reject message, The UE-RRC layer may discard current security keys. The UE-RRC layer may re-suspend the RRC connection. The UE-RRC layer may set pending ma update value to true if resume is triggered due to an RNA update.

A UE-RRC layer in an RRC inactive or idle state may perform a cell (re)selection procedure while performing an RRC procedure to establish an RRC connection. Based on cell selection or cell reselection, the UE-RRC layer may change a cell on the UE camped and stop the RRC procedure. The UE-RRC layer may inform upper layers (e.g., NAS layer) about the failure of the RRC procedure.

A UE in an RRC connected state may detect a failure of a connection with a base station. The UE in the RRC connected state may activate AS security with the base station before the detecting the failure. The failure comprises at least one of: a radio link failure (RLF); a reconfiguration with sync failure; a mobility failure from new radio (NR); an integrity check failure indication from lower layers (e.g., PDCP layer) concerning signaling radio bearer 1 (SRB1) or signaling radio bearer 2 (SRB2); or an RRC connection reconfiguration failure.

The radio link failure may be a radio link failure of a primary cell of the base station. The base station may send a reconfiguration with sync in an RRC message to the UE in RRC connected state. The reconfiguration with sync may comprise a reconfiguration timer (e.g., T304). Based on receiving the reconfiguration sync, the UE may start the reconfiguration timer and perform the reconfiguration with sync (e.g., handover). Based on expiry of the reconfiguration timer, the UE determine the reconfiguration sync failure. A base station may send mobility from NR command message to the UE in RRC connected state. Based on receiving the mobility from NR command message, the UE may perform to handover from NR to a cell using other RAT (e.g., E-UTRA). The UE may determine the mobility failure from NR based on at least one of conditions being met: if the UE does not succeed in establishing the connection to the target radio access technology; or if the UE is unable to comply with any part of the configuration included in the mobility from NR command message; or if there is a protocol error in the inter RAT information included in the mobility from NR message.

Based on detecting the failure, the UE in the RRC connected state may initiate an RRC connection reestablishment procedure. Based on initiating the RRC connection reestablishment procedure, the UE may start a timer T311, suspend all radio bearers except for SRB0, reset MAC (layer). Based on initiating the RRC connection reestablishment procedure, the UE in the RRC connected state may release MCG SCells, release special cell (SpCell) configuration parameters and multi-radio dual connectivity (MR-DC) related configuration parameters. For example, based on initiating the RRC connection reestablishment procedure, the UE may release master cell group configuration parameters.

Based on initiating the RRC connection reestablishment procedure, the UE in the RRC connected state may perform a cell selection procedure. Based on the cell selection procedure, the UE may select a cell based on a signal quality of the cell exceeding a threshold. The UE in the RRC connected state may select a cell based on a signal quality of the cell exceeding a threshold. The UE may determine, based on a cell selection procedure, the selected cell exceeding the threshold. The signal quality comprises at least one of: a reference signal received power; a received signal strength indicator; a reference signal received quality; or a signal to interference plus noise ratio.

Based on selecting a suitable cell, the UE in the RRC connected state may stop the timer 311 and start a timer T301. Based on selecting the suitable cell, the UE in the RRC connected state may stop a barring timer T390 for all access categories. Based on stopping the barring timer T390, the UE in the RRC connected state may consider a barring for all access category to be alleviated for the cell. Based on selecting the cell, the UE in the RRC connected state may apply the default L1 parameter values except for the parameters provided in SIB1, apply the default MAC cell group configuration, apply the CCCH configuration, apply a timer alignment timer in SIB1 and initiate transmission of the RRC reestablishment request message.

The UE in the RRC connected state may stop the timer T301 based on reception of an RRC response message in response of the RRC reestablishment request message. The RRC response message may comprise at least one of RRC reestablishment message or RRC setup message or RRC reestablishment reject message. The UE in the RRC connected state may stop the timer T301 when the selected cell becomes unsuitable.

Based on the cell selection procedure triggered by initiating the RRC connection reestablishment procedure, the UE in the RRC connected state may select an inter-RAT cell. Based on selecting an inter-RAT cell, the UE (UE-AS layer) in the RRC connected state may transition to RRC IDLE state and may provide a release cause 'RRC connection failure' to upper layers (UE-NAS layer) of the UE.

Based on initiating the transmission of the RRC reestablishment request message, the UE in the RRC connected state may send the RRC reestablishment request message. The RRC reestablishment request message may comprise at least one of C-RNTI used in the source PCell, a physical cell identity (PCI) of the source PCell, short MAC-I or a reestablishment cause. The reestablishment cause may comprise at least one of reconfiguration failure, handover failure or other failure.

Based on initiating the transmission of the RRC reestablishment request message, the UE (RRC layer) in the RRC connected state may re-establish PDCP for SRB1, re-establish RLC for SRB1, apply default SRB configurations for SRB1, configure lower layers (PDCP layer) to suspend integrity protection and ciphering for SRB1, resume SRB1 and submit the RRC reestablishment request message to lower layers (PDCP layer) for transmission. Based on submitting the RRC reestablishment request message to lower layers, the UE in the RRC connected state may send the RRC reestablishment request message to a target base station via the cell selected based on the cell selection procedure wherein the target base station may or may not be the source base station.

Based on expiry of the timer T311 or T301, the UE (UE-AS layer) may transition to an RRC idle state and may provide a release cause 'RRC connection failure' to upper layers (UE-NAS layer) of the UE.

Based on receiving the release cause 'RRC connection failure', the UE (UE-NAS layer) in the RRC idle state may perform a NAS signaling connection recovery procedure when the UE does not have signaling pending and user data pending. Based on performing the NAS signaling connection recovery procedure, the UE in the RRC idle state may initiate the registration procedure by sending a Registration request message to the AMF.

Based on receiving the release cause 'RRC connection failure', the UE (UE-NAS layer) in the RRC idle state may perform a service request procedure by sending a service request message to the AMF when the UE has signaling pending or user data pending.

Based on receiving the RRC reestablishment request message, the target base station may check whether the UE context of the UE is locally available. Based on the UE context being not locally available, the target base station may perform a retrieve UE context procedure by sending a retrieve UE context request message to the source base station (the last serving base station) of the UE.

For RRC connection reestablishment procedure, the retrieve UE context request message may comprise at least one of: a UE context ID; integrity protection parameters; or a new cell identifier. The UE context ID may comprise at least one of: C-RNTI contained the RRC reestablishment request message; and a PCI of the source PCell (the last serving PCell). The integrity protection parameters for the RRC reestablishment procedure may be the short MAC-I. The new cell identifier may be an identifier of the target cell where the target cell is a cell where the RRC connection has been requested to be re-established. The new cell identifier is a cell identity in system information block (e.g., SIB1) of the target cell (e.g., the selected cell).

For the RRC connection reestablishment procedure, based on receiving the retrieve UE context request message, the source base station may check the retrieve UE context request message. If the source base station is able to identify the UE context by means of the UE context ID, and to successfully verify the UE by means of the integrity protection contained in the retrieve UE context request message, and decides to provide the UE context to the target base station, the source base station may respond to the target base station with a retrieve UE context response message. If the source base station is not able to identify the UE context by means of the UE context ID, or if the integrity protection contained in the retrieve UE context request message is not valid, the source base station may respond to the target base station with a retrieve UE context failure message.

For the RRC connection reestablishment procedure, the retrieve UE context response message may comprise at least one of Xn application protocol (XnAP) ID of the target base station, XnAP ID of the source base station, globally unique AMF identifier (GUAMI) or UE context information (e.g., UE context information retrieve UE context response). The UE context information may comprise at least one of a NG-C UE associated signaling reference, UE security capabilities, AS security information, UE aggregate maximum bit rate, PDU session to be setup list, RRC context, mobility restriction list or index to RAT/frequency selection priority. The NG-C UE associated signaling reference may be a NG application protocol ID allocated at the AMF of the UE on the NG-C connection with the source base station. The AS security information may comprise a security key of a base station (KgNB) and next hop chaining count (NCC) value. The PDU session to be setup list may comprise PDU session resource related information used at UE context in the source base station. The PDU session resource related information may comprise a PDU session ID, a PDU session resource aggregate maximum bitrate, a security indication, a PDU session type or QoS flows to be setup list. The security indication may comprise a user plane integrity protection indication and confidentiality protection indication which indicates the requirements on user plane (UP) integrity protection and ciphering for the corresponding PDU session, respectively. The security indication may also comprise at least one of an indication whether UP integrity protection is applied for the PDU session, an indication whether UP ciphering is applied for the PDU session, and the maximum integrity protected data rate values (uplink and downlink) per UE for integrity protected DRBs. The PDU session type may indicate at least one of internet protocol version 4 (IPv4), IPv6, IPv4v6, ethernet or unstructured. The QoS flow to be setup list may comprise at least one of QoS flow identifier, QoS flow level QoS parameters (the QoS Parameters to be applied to a QoS flow) or bearer identity.

For the RRC connection reestablishment procedure, the retrieve UE context failure message may comprise at least XnAP ID of the target base station and a cause value.

For the RRC connection reestablishment procedure, based on receiving the retrieve UE context response message, the target base station may send an RRC reestablishment message to the UE. The RRC reestablishment message may comprise at least a network hop chaining count (NCC) value.

Based on receiving the RRC reestablishment message, the UE may derive a new security key of a base station (KgNB) based on at least one of current KgNB or next hop (NH) parameters associated to the NCC value. Based on the new security key of the base station and a previously configured integrity protection algorithm, the UE may derive a security key for integrity protection of an RRC signaling ($K_{RRCint}$) and a security key for integrity protection of user plane (UP) data ($K_{UPint}$). Based on the new security key of the base station and a previously configured ciphering algorithm, the UE may derive a security key for ciphering of an RRC signaling ($K_{RRCenc}$) and a security key for ciphering of user plane (UP) data ($K_{UPenc}$). Based on the $K_{RRCint}$ and the previously configured integrity protection algorithm, the UE may verify the integrity protection of the RRC reestablishment message. Based on the verifying being failed, the UE (UE-AS layer) may go to RRC IDLE state and may provide a release cause 'RRC connection failure' to upper layers (UE-NAS layer) of the UE. Based on the verifying being successful, the UE may configure to resume integrity protection for SRB1 based on the previously configured integrity protection algorithm and the $K_{RRCint}$ and configure to resume ciphering for SRB1 based on the previously configured ciphering algorithm and $K_{RRCenc}$. The UE may send an RRC reestablishment complete message to the target base station.

Based on receiving the retrieve UE context failure message, the target base station may send an RRC release message to the UE. For example, based on the retrieve UE context failure message comprising the RRC release message, the target base station may send the RRC release message to the UE. Based on receiving the retrieve UE context failure message, the target base station may send an RRC setup message or an RRC reject message. Based on receiving the retrieve UE context failure message, the target base station may not send any response message to the UE.

Figure 17:
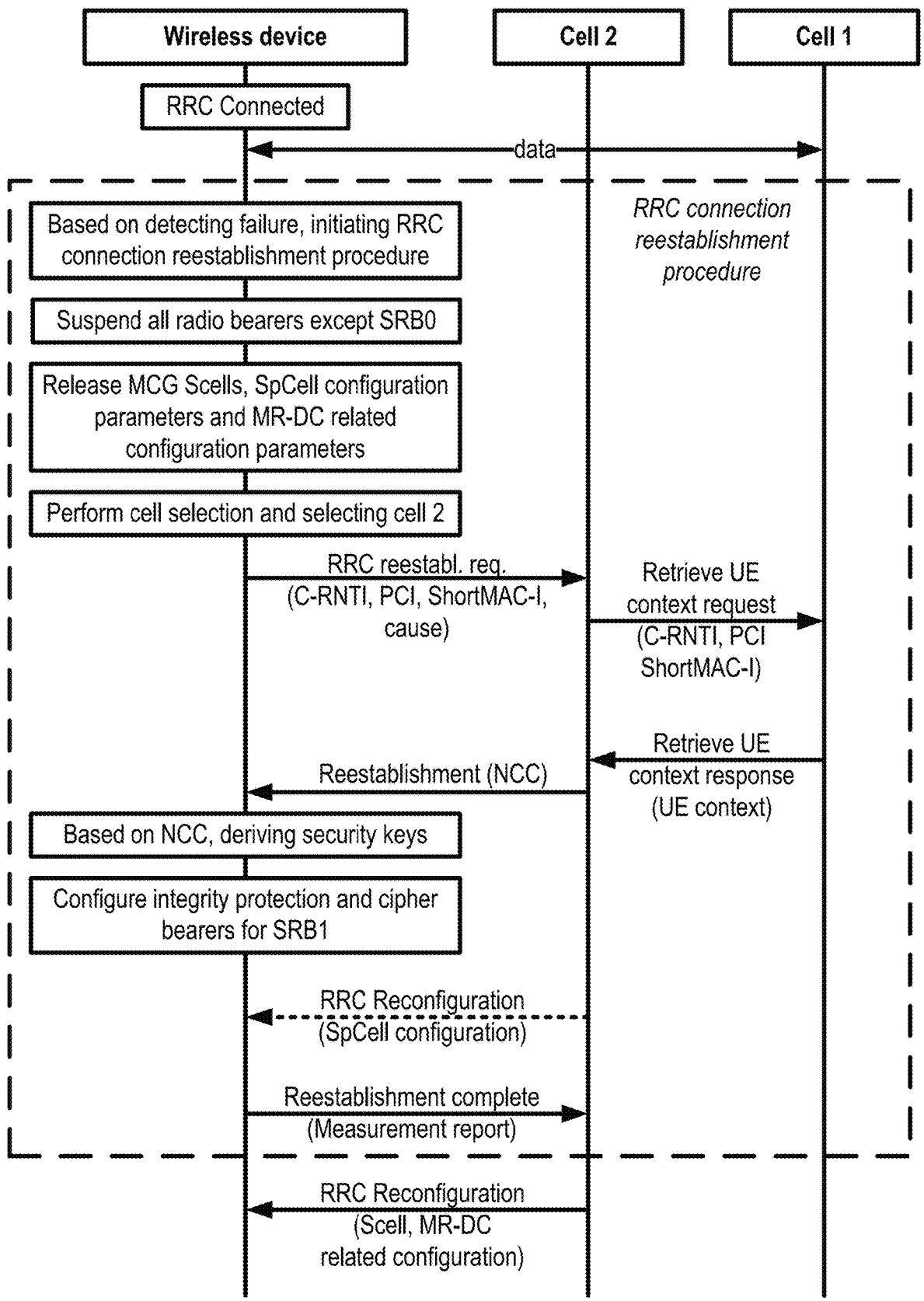
FIG. 17 illustrates an example of an RRC connection reestablishment procedure.

FIG. 17 illustrates an example of an RRC connection reestablishment procedure. The UE in an RRC connected state may send and receive data to/from a first base station (for example, a source base station) via cells where the cells comprise a primary cell (PCell) of the first base station. The UE may detect a failure of a connection with the first base station. Based on the failure, the UE may initiate the RRC reestablishment procedure.

In an example of the FIG. 17, based on initiating the RRC connection reestablishment procedure, the UE may start a timer T311, suspend all radio bearers except for SRB0, and/or reset a MAC (layer). Based on initiating the RRC connection reestablishment procedure, the UE may release MCG SCells, release the special cell (SpCell) configuration parameters and the multi-radio dual connectivity (MR-DC) related configuration parameters. Based on initiating the RRC connection reestablishment procedure, the UE may perform a cell selection procedure. Based on the cell selection procedure, the UE may select a cell 2 of a second base station (for example, a target base station) where the cell 2 is a suitable cell. Based on selecting a suitable cell, the UE may stop the timer T311 and start a timer T301. Based on selecting the suitable cell, the UE may stop one or more barring timer T309(s) for all access categories if the one or more barring timer T309(s) is running. Based on stopping the one or more barring timer T309(s), the UE m ay consider barring for all access category to be alleviated for the cell. Based on selecting the cell, the UE may apply the default L1 parameter values except for the parameters provided in SIB1, apply the default MAC cell group configuration, apply the CCCH configuration, apply a timer alignment timer in SIB1 and initiate transmission of the RRC reestablishment request message.

In an example of the FIG. 17, the RRC reestablishment message may comprise at least one of C-RNTI used in the source PCell (e.g., the cell 1), a physical cell identity (PCI) of the source PCell, short MAC-I or a reestablishment cause. Based on initiating the transmission of the RRC reestablishment request message, the UE (RRC layer) may re-establish PDCP for SRB1, re-establish RLC for SRB1, apply default SRB configurations for SRB1, configure lower layers (PDCP layer) to suspend integrity protection and ciphering for SRB1, resume SRB1 and submit the RRC reestablishment request message to lower layers (PDCP layer) for transmission. Based on initiating the transmission of the RRC reestablishment request message, the UE may send the RRC reestablishment request message to the second base station via the cell 2.

In an example of the FIG. 17, based on receiving the RRC reestablishment request message, the second base station may check whether the UE context of the UE is locally available. Based on the UE context being not locally available, the second base station may perform the retrieve UE context procedure by sending a retrieve UE context request message to the source base station of the UE. the retrieve UE context request message may comprise at least one of: a UE context ID; integrity protection parameters; or a new cell identifier. The UE context ID may comprise at least one of: C-RNTI contained the RRC reestablishment request message; and a PCI of the source PCell (the last serving PCell). The integrity protection parameters for the RRC reestablishment procedure may be the short MAC-I. The new cell identifier may be an identifier of the target cell where the target cell is a cell where the RRC connection has been requested to be re-established. The new cell identifier is a cell identity in system information block (e.g., SIB1) of the target cell (e.g., the selected cell).

In an example of the FIG. 17, based on receiving the retrieve UE context request message, the source base station may check the retrieve UE context request message. If the source base station successfully identifies the UE context by means of the C-RNTI, and to successfully verify the UE by means of the short MAC-I, and decides to provide the UE context to the second base station, the source base station may respond to the second base station with a retrieve UE context response message. The retrieve UE context response message may comprise at least of GUAMI or the UE context information. Based on receiving the retrieve UE context response message, the second base station may send an RRC reestablishment message to the UE. The RRC reestablishment message may comprise a network hop chaining count (NCC) value.

In an example of the FIG. 17, based on receiving the RRC reestablishment message, the UE may derive a new security key of a base station (KgNB) based on at least one of current KgNB or next hop (NH) parameters associated to the NCC value. Based on the new security key of a base station (KgNB) and the previously configured security algorithms, the UE may derive security keys for integrity protection and ciphering of RRC signaling (e.g., $K_{RRCint}$ and KRRCenc respectively) and user plane (UP) data (e.g., KUPint and KUPenc respectively). Based on the security key for integrity protection of the RRC signaling ($K_{RRCint}$), the UE may verify the integrity protection of the RRC reestablishment message. Based on the verifying being successful, the UE may configure to resume integrity protection for one or more bearers (e.g., signalling radio bearer or an RRC message) based on the previously configured integrity protection algorithm and the $K_{RRCint}$ and configure to resume ciphering for one or more bearers based on the previously configured ciphering algorithm and the $K_{RRCenc}$.

In an example of the FIG. 17, the second base station may send a first RRC reconfiguration message. The RRC first reconfiguration message may comprise the SpCell configuration parameters. Based on receiving the SpCell configuration parameters, the UE may initiate transmission and reception of data to/from the second base station. The UE may send an RRC reestablishment complete message to the second base station. The RRC reestablishment complete message may comprise measurement report. Based on receiving the measurement report, the second base station may determine to configure SCells and/or secondary cell groups (e.g., SCG or PSCells). Based on the determining, the second base station may send a second RRC reconfiguration message comprising SCells configuration parameters and/or MR-DC related configuration parameters. Based receiving the second RRC reconfiguration message, the UE may transmit and receive data via the SCells and/or SCGs.

In an example of the FIG. 17, the RRC reconfiguration message may comprise at least one of cell group configuration parameters of MCG and/or SCG, radio bearer configuration parameters or AS security key parameters.

A base station may initiate an RRC connection release procedure to transit an RRC state of a UE from RRC connected state to RRC idle state, from an RRC connected state to RRC inactive state, from RRC inactive state back to RRC inactive state when the UE tries to resume, or from RRC inactive state to RRC idle state when the UE tries to resume. The RRC connection procedure may also be used to release an RRC connection of the UE and redirect a UE to another frequency. The base station may send to a UE the RRC release message comprising suspend configuration parameters. Based on the RRC release message, the UE may suspend an RRC connection. The UE may transition an RRC state of the UE to and RRC inactive state or an RRC idle state. The suspend configuration parameters may comprise at least one of a resume identity, RNA configuration, RAN paging cycle, or network hop chaining count (NCC) value where the RNA configuration may comprise RNA notification area information, or periodic RNA update timer value (e.g., T380 value). The base station may use the resume identity (e.g., inactive-RNTI (I-RNTI)) to identify the UE context when the UE is in RRC inactive state.

If the base station has a fresh and unused pair of {NCC, next hop (NH)}, the base station may include the NCC in the suspend configuration parameters. Otherwise, the base station may include the same NCC associated with the current KgNB in the suspend configuration parameters. The NCC is used for AS security. The base station may delete the current AS keys (e.g., $K_{RRCenc}$, $K_{UPenc}$, and $K_{UPint}$ after sending the RRC release message comprising the suspend configuration parameters to the UE but may keep the current AS key $K_{RRCint}$. If the sent NCC value is fresh and belongs to an unused pair of {NCC, NH}, the base station may save the pair of {NCC, NH} in the current UE AS security context and may delete the current AS key KgNB. If the sent NCC value is equal to the NCC value associated with the current KgNB, the base station may keep the current AS key KgNB and NCC. The base station may store the sent resume identity together with the current UE context including the remainder of the AS security context.

Upon receiving the RRC release message comprising the suspend configuration parameters from the base station, the UE may verify that the integrity of the received RRC release message comprising the suspend configuration parameters is correct by checking PDCP MAC-I. If this verification is successful, then the UE may take the received NCC value and save it as stored NCC with the current UE context. The UE may delete the current AS keys $K_{RRCenc}$, $K_{UPenc}$, and $K_{UPint}$, but keep the current AS key $K_{RRCint}$ key. If the stored NCC value is different from the NCC value associated with the current KgNB, the UE may delete the current AS key KgNB. If the stored NCC is equal to the NCC value associated with the current KgNB, the UE shall keep the current AS key KgNB. The UE may store the received resume identity together with the current UE context including the remainder of the AS security context, for the next state transition.

Based on receiving the RRC release message comprising the suspend configuration parameters, the UE may reset MAC, release the default MAC cell group configuration, re-establish RLC entities for one or more bearers. Based on receiving the RRC release message comprising suspend configuration parameters, the UE may store in the UE inactive AS context current configuration parameters and current security keys. For example, the UE may store some of the current configuration parameters. The stored current configuration parameters may comprise a robust header compression (ROHC) state, quality of service (QoS) flow to DRB mapping rules, the C-RNTI used in the source PCell, the global cell identity and the physical cell identity of the source PCell, and all other parameters configured except for the ones within reconfiguration with sync and serving cell configuration common parameters in SIB. The stored security keys may comprise at least one of KgNB and $K_{RRCint}$. The serving cell configuration common parameters in SIB may be used to configure cell specific parameters of a UE's serving cell in SIB1. Based on receiving the RRC release message comprising the suspend configuration parameters, the UE may suspend all SRB(s) and DRB(s) except for SRB0. Based on receiving the RRC release message comprising suspend configuration parameters, the UE may start a timer T380, enter RRC inactive state, perform cell selection procedure.

The UE in RRC inactive state may initiate an RRC connection resume procedure. For example, based on having data or signaling to transmit, or receiving RAN paging message, the UE in RRC inactive state may initiate the RRC connection resume procedure. Based on initiating the RRC connection resume procedure, the UE may select access category based on triggering condition of the RRC connection resume procedure and perform unified access control procedure based on the access category. Based on the unified access control procedure, the UE may consider access attempt for the RRC connection resume procedure as allowed. Based on considering the access attempt as allowed, the UE may apply the default L1 parameter values as specified in corresponding physical layer specifications, except for the parameters for which values are provided in SIB1, apply the default SRB1 configuration, apply the CCCH configuration, apply the time alignment timer common included in SIB1, apply the default MAC cell group configuration, start a timer T319 and initiate transmission of an RRC resume request message.

Based on initiating the transmission of the RRC resume request message, the UE may set the contents of the RRC resume request message. The RRC resume request message may comprise at least one of resume identity, resume MAC-I or resume cause. The resume cause may comprise at least one of emergency, high priority access, mt access, mo signalling, mo data, mo voice call, mo sms, ran update, mps priority access, mcs priority access.

Based on initiating the transmission of the RRC resume request message, the UE may restore the stored configuration parameters and the stored security keys from the (stored) UE inactive AS context except for the master cell group configuration parameters, MR-DC related configuration parameters (e.g., secondary cell group configuration parameters) and PDCP configuration parameters. The configuration parameter may comprise at least one of the C-RNTI used in the source PCell, the global cell identity and the physical cell identity of the source PCell, and all other parameters configured except for the ones within reconfiguration with sync and serving cell configuration common parameters in SIB. Based on current (restored) $K_{gNB}$ or next hop (NH) parameters associated to the stored NCC value, the UE may derive a new key of a base station ($K_{gNB}$). Based on the new key of the base station, the UE may derive security keys for integrity protection and ciphering of RRC signalling (e.g., $K_{RRCenc}$ and $K_{RRCint}$ respectively) and security keys for integrity protection and ciphering of user plane data (e.g., $K_{UPint}$ and the $K_{UPenc}$ respectively). Based on configured algorithm and the $K_{RRCint}$ and $K_{UPint}$, the UE may configure lower layers (e.g., PDCP layer) to apply integrity protection for all radio bearers except SRB0. Based on configured algorithm and the $K_{RRCenc}$ and the $K_{UPenc}$, the UE may configure lower layers (e.g., PDCP layer) to apply ciphering for all radio bearers except SRB0.

Based on initiating the transmission of the RRC resume request message, the UE may re-establish PDCP entities for one or more bearers, resume the one or more bearers and submit the RRC resume request message to lower layers where the lower layers may comprise at least one of PDCP layer, RLC layer, MAC layer or physical (PHY) layer.

A target base station may receive the RRC resume request message. Based on receiving the RRC resume request message, the target base station may check whether the UE context of the UE is locally available. Based on the UE context being not locally available, the target base station may perform the retrieve UE context procedure by sending the retrieve UE context request message to the source base station (the last serving base station) of the UE. The retrieve UE context request message may comprise at least one of a UE context ID, integrity protection parameters, a new cell identifier or the resume cause where the resume cause is in the RRC resume request message.

For the RRC connection resume procedure, based on receiving the retrieve UE context request message, the source base station may check the retrieve UE context request message. If the source base station is able to identify the UE context by means of the UE context ID, and to successfully verify the UE by means of the integrity protection contained in the retrieve UE context request message, and decides to provide the UE context to the target base station, the source base station may respond to the target base station with the retrieve UE context response message. If the source base station is not able to identify the UE context by means of the UE context ID, or if the integrity protection contained in the retrieve UE context request message is not valid, or, if the source base station decides not to provide the UE context to the target base station, the source base station may respond to the target base station with a retrieve UE context failure message.

For the RRC connection resume procedure, the retrieve UE context failure message may comprise at least XnAP ID of the target base station, an RRC release message or a cause value.

For the RRC connection resume procedure, based on receiving the retrieve UE context response message, the target base station may send an RRC resume message to the UE. The RRC resume message may comprise at least one of radio bearer configuration parameters, cell group configuration parameters for MCG and/or SCG, measurement configuration parameters or sk counter where the sk counter is used to derive a security key of secondary base station based on $K_{gNB}$.

Based on receiving the retrieve UE context failure message, the target base station may send an RRC release message to the UE. For example, based on the retrieve UE context failure message comprising the RRC release message, the target base station may send the RRC release message to the UE. Based on receiving the retrieve UE context failure message, the target base station may send an RRC setup message or an RRC reject message. Based on receiving the retrieve UE context failure message, the target base station may not send any response message to the UE.

Based on receiving the RRC resume message, the UE may stop the timer T319 and T380. Based on receiving the RRC resume message, the UE may restore mater cell group configuration parameters, secondary cell group configuration parameters and PDCP configuration parameters in the UE inactive AS context. Based on restoring the master cell group configuration parameter and/or the secondary cell group configuration parameters, the UE may configure SCells of MCG and/or SCG by configuring lower layers to consider the restored MCG and/or SCG SCells to be in deactivated state, discard the UE inactive AS context and release the suspend configuration parameters.

Based on receiving the cell group configuration parameters in the RRC resume message, the UE may perform cell group configuration of MCG and/or SCG. Based on receiving the radio bearer configuration parameters in the RRC resume message, the UE may perform radio bearer configuration. Based on the sk counter in the RRC resume message, the UE may perform to update the security key of secondary base station.

A UE may remain in CM-CONNECTED and move within an area configured by the base station without notifying the base station when the UE is in RRC inactive state where the area is an RNA. In RRC inactive state, a last serving base station may keep the UE context and the UE-associated NG connection with the serving AMF and UPF. Based on received downlink data from the UPF or downlink UE-associated signaling from the AMF while the UE is in RRC inactive state, the last serving base station may page in the cells corresponding to the RNA and may send RAN Paging via an Xn interface to neighbor base station(s) if the RNA includes cells of neighbor base station(s).

Figure 18:
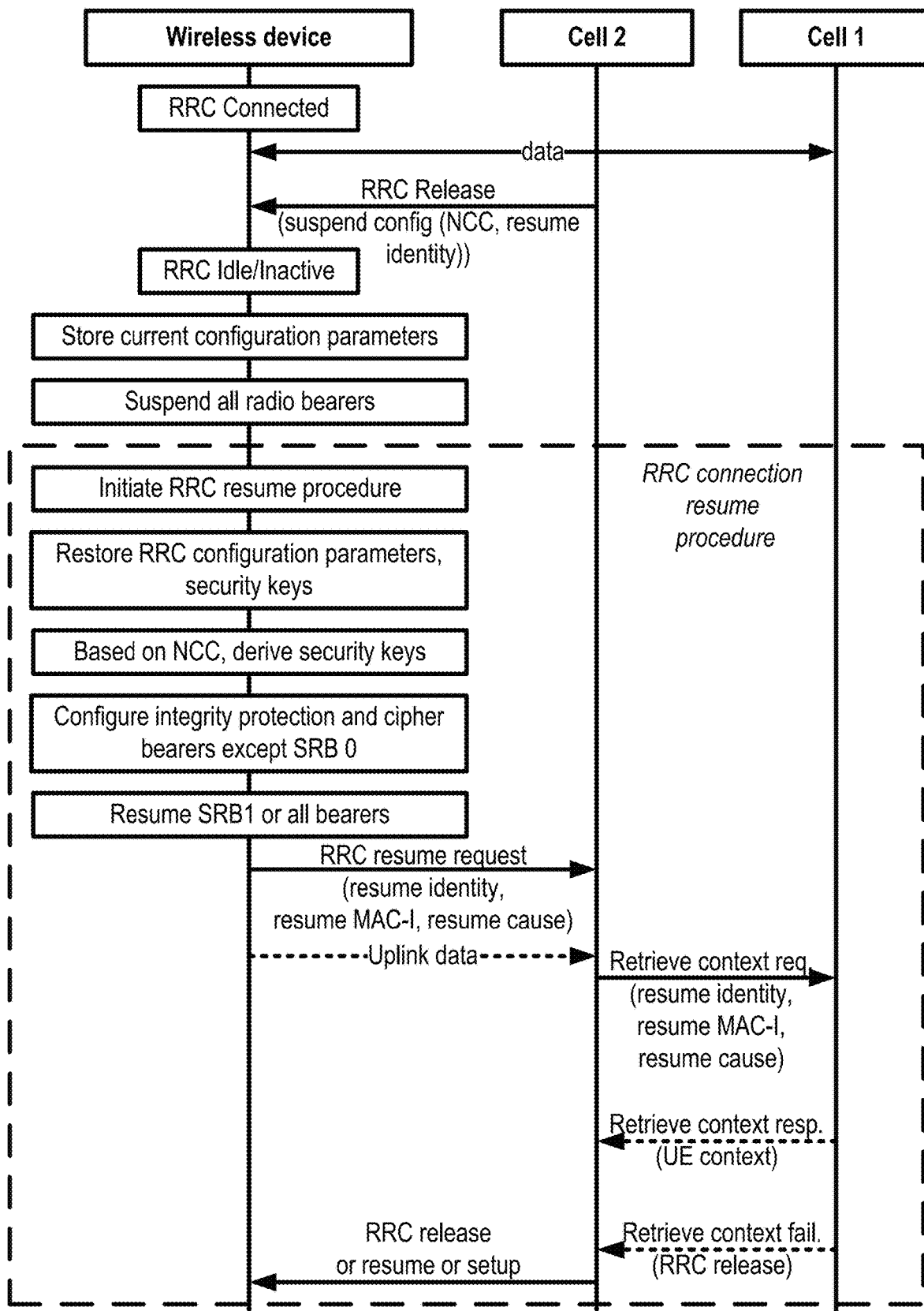
FIG. 18 illustrates an example of an RRC connection resume procedure.

An AMF may provide to the base station a core network assistance information to assist the base station's decision whether a UE can be sent to RRC inactive state. The core network assistance information may include the registration area configured for the UE, the periodic registration update timer, a UE identity index value, the UE specific DRX, an indication if the UE is configured with mobile initiated connection only (MICO) mode by the AMF, or the expected UE behavior. The base station may use the UE specific DRX and the UE identity index value to determine a paging occasion for RAN paging. The base station may use periodic registration update timer to configure periodic RNA update timer (e.g., a timer T380). The base station may use an expected UE behavior to assist the UE RRC state transition decision FIG. 18 illustrates an example of an RRC connection resume procedure. A UE in RRC connected state may transmit and receive data to/from a second base station (a source base station) via a cell 1. The second base station may determine to transit a UE in RRC connected state to RRC inactive state. Based on the determining, the second base station may send an RRC release message comprising the suspend configuration parameters.

In an example of the FIG. 18, based on receiving the RRC release message comprising suspend configuration parameters, the UE may store in the UE inactive AS Context the current security keys (e.g., $K_{gNB}$ and $K_{RRCint}$ keys) and current configuration parameters. For example, the UE may store some of the current configuration parameters. The stored (current) configuration parameters may be at least one of: robust header compression (ROHC) state; QoS flow to DRB mapping rules; C-RNTI used in source PCell; global cell identity and physical cell identity of the source PCell; and all other parameters configured except for ones within reconfiguration with sync and serving cell configuration common parameters in SIB. The robust header compression (ROHC) state may comprise ROHC states for all PDCP entity (or all bearers) where each PDCP entity per bearer (or each bearer) may have one ROHC state. The QoS flow to DRB mapping rules may be QoS flow to DRB mapping rules for all data radio bearer (DRB) where each DRB may have one QoS follow to DRB mapping rule.

In an example of the FIG. 18, based on receiving the RRC release message comprising suspend configuration parameters, the UE may suspend all SRB(s) and DRB(s) except for SRB0. Based on receiving the RRC release message comprising suspend configuration parameters, the UE may start a timer T380, enter RRC inactive state, perform cell selection procedure. Based on the cell selection procedure, the UE may select a cell 2 of a first base station (a target base station). The UE in RRC inactive state may initiate an RRC connection resume procedure. The UE may perform the unified access control procedure. Based on the unified access control procedure, the UE may consider access attempt for the RRC connection resume procedure as allowed. The UE may apply the default L1 parameter values as specified in corresponding physical layer specifications, except for the parameters for which values are provided in SIB1, apply the default SRB1 configuration, apply the CCCH configuration, apply the time alignment timer common included in SIB1, apply the default MAC cell group configuration, start a timer T319 and initiate transmission of an RRC resume request message.

In an example of the FIG. 18, based on initiating the transmission of the RRC resume request message, the UE may restore the stored configuration parameters and the stored security keys from the (stored) UE inactive AS context. For example, the UE may restore the stored configuration parameters and the stored security keys (e.g., $K_{gNB}$ and $K_{RRCnt}$) from the stored UE Inactive AS context except for the master cell group configuration parameters, MR-DC related configuration parameters (e.g., secondary cell group configuration parameters) and PDCP configuration parameters. Based on current (restored) $K_{gNB}$ or next hop (NH) parameters associated to the stored NCC value, the UE may derive a new key of a base station ($K_{gNB}$). Based on the new key of the base station, the UE may derive security keys for integrity protection and ciphering of RRC signalling (e.g., $K_{RRCenc}$ and $K_{RRCint}$ respectively) and security keys for integrity protection and ciphering of user plane data (e.g., $K_{UPint}$ and the $K_{UPenc}$ respectively). Based on configured algorithm and the $K_{RRCnt}$ and $K_{UPint}$, the UE (RRC layer) may configure lower layers (e.g., PDCP layer) to apply integrity protection for all radio bearers except SRB0. Based on configured algorithm and the $K_{RRCenc}$ and the $K_{UPenc}$, the UE may configure lower layers (e.g., PDCP layer) to apply ciphering for all radio bearers except SRB0. For communication between the UE and the base station, the integrity protection and/or the ciphering may be required. Based on the integrity protection and/or the ciphering, the UE may be able to transmit and receive data to/from the first base station. The UE may use the restored configuration parameters to transmit and receive the data to/from the first base station.

In an example of the FIG. 18, based on initiating the transmission of the RRC resume request message, the UE may re-establish PDCP entities for one or more bearers, resume one or more bearers and submit the RRC resume request message to lower layers. Based on receiving the RRC resume request message, the first base station may check whether the UE context of the UE is locally available. Based on the UE context being not locally available, the first base station may perform the retrieve UE context procedure by sending the retrieve UE context request message to the second base station (the last serving base station) of the UE. The retrieve UE context request message may comprise at least one of: resume identity; resume MAC-I; or the resume cause.

In an example of the FIG. 18, based on receiving the retrieve UE context request message, the second base station may check the retrieve UE context request message. If the second base station is able to identify the UE context by means of the UE context ID, and to successfully verify the UE by means of the resume MAC-I and decides to provide the UE context to the first base station, the first base station may respond to the second base station with the retrieve UE context response message. Based on receiving the retrieve UE context response message, the first base station may send an RRC resume message to the UE. Based on receiving the RRC resume message, the UE may restore mater cell group configuration parameters, secondary cell group configuration parameters and PDCP configuration parameters in the UE inactive AS context. Based on restoring the master cell group configuration parameter and/or the secondary cell group configuration parameters, the UE may configure SCells of MCG and/or SCG by configuring lower layers to consider the restored MCG and/or SCG SCells to be in deactivated state, discard the UE inactive AS context and release the suspend configuration parameters. The UE may transmit and receive data via the SCells and/or SCGs.

A base station may send an RRC release message to a UE to release an RRC connection of the UE. Based on the RRC release message, the UE may release established radio bearers as well as all radio resources.

A base station may send an RRC release message to a UE to suspend the RRC connection. Based on the RRC release message, the UE may suspend all radio bearers except for signaling radio bearer 0 (SRB0). The RRC release message may comprise suspend configuration parameters. The suspend configuration parameters may comprise next hop chaining count (NCC) and resume identity (e.g., ID or identifier).

The base station may send an RRC release message to transit a UE in an RRC connected state to an RRC idle state; or to transit a UE in an RRC connected state to an RRC inactive state; or to transit a UE in an RRC inactive state back to an RRC inactive state when the UE tries to resume; or to transit a UE in an RRC inactive state to an RRC idle state when the UE tries to resume.

The base station may send an RRC release message to redirect a UE to another frequency.

A UE may receive an RRC release message from the base station of serving cell (or PCell). Based on the RRC release message, the UE may performs UE actions for the RRC release message from the base station. The UE may delay the UE actions for the RRC release message a period of time (e.g., 60 ms) from the moment the RRC release message was received or when the receipt of the RRC release message was successfully acknowledged. The UE may send HARQ acknowledgments to the base station for acknowledgments of the RRC release message. Based on a RLC protocol data unit (PDU) comprising the RRC release message and the RLC PDU comprising poll bit, the UE may send a RLC message (e.g., a status report) to the base station for acknowledgments of the RRC release message.

The UE actions for the RRC release message from the base station may comprise at least one of: suspending an RRC connection; releasing an RRC connection; cell (re) selection procedure; and/or idle/inactive measurements.

The RRC release message from the base station may comprise the suspend configuration parameters. Based on the suspend configuration parameters, the UE may perform the suspending an RRC connection. The suspending an RRC connection may comprise at least one of: medium access control (MAC) reset (or resetting MAC); releasing default MAC cell group configuration; re-establishing RLC entities for one or more radio bearers; storing current configuration parameters and current security keys; suspending one or more bearers where the bearers comprises signaling radio bearer and data radio bearer; and/or transitioning an RRC idle state or an RRC inactive state.

For example, the suspend configuration parameters may further comprise RNA configuration parameters. Based on the RNA configuration parameters, the UE may transition to an RRC inactive state. For example, based on the suspend configuration parameters not comprising the RNA configuration parameters, the UE may transition to an RRC idle state. For example, the RRC release message comprising the suspend configuration parameters may comprise a indication transitioning to an RRC inactive state. Based on the indication, the UE may transition to an RRC inactive state. For example, based on the RRC release message not comprising the indication, the UE may transition to an RRC idle state.

Based on the MAC reset, the UE may perform to at least one of: stop all timers running in the UE-MAC layer; consider all time alignment timers as expired; set new data indicators (NDIs) for all uplink HARQ processes to the value 0; stop, ongoing RACH procedure; discard explicitly signaled contention-free Random Access Resources, if any; flush Msg 3 buffer; cancel, triggered scheduling request procedure; cancel, triggered buffer status reporting procedure; cancel, triggered power headroom reporting procedure; flush the soft buffers for all DL HARQ processes; for each DL HARQ process, consider the next received transmission for a TB as the very first transmission; and/or release, temporary C-RNTI.

Based on the considering the time alignment timers as expired, the UE may perform at least one of: flush all HARQ buffers for all serving cells; notify RRC to release PUCCH for all Serving cells, if configured; notify RRC to release SRS for all Serving Cells, if configured; clear any configured downlink assignments and configured uplink grants; clear any PUSCH resource for semi-persistent CSI reporting; and/or consider all running time alignment timers as expired.

The default MAC cell group configuration parameters may comprise buffer status report (BSR) configuration parameters (e.g., BSR timers) for a cell group of the base station and power headroom reporting (PHR) configuration parameters (e.g., PHR timers or PHR transmission power factor change parameter) for the cell group of the base station.

The re-establishing RLC entities may comprise at least one of: discarding all RLC SDUs, RLC SDU segments, and RLC PDUs, if any; stopping and resetting all timers of the RLC entities; and resetting all state variables of the RLC entities to their initial values.

The RRC release message from the base station may not comprise the suspend configuration parameters. Based on the RRC message not comprising the suspend configuration parameters, the UE may perform the releasing an RRC connection. The releasing an RRC connection may comprise at least one of: MAC reset (or resetting MAC); discarding the stored configuration parameters and stored security keys (or discarding the stored UE inactive AS context); releasing the suspend configuration parameters; releasing all radio resources, including release of RLC entity, MAC configuration and associated PDCP entity and SDAP for all established radio bearers; and/or transitioning to an RRC idle state.

The RRC release message may comprises an RRC early data complete message.

A small data transmission (SDT) is a procedure allowing data transmission/reception while a wireless device remains in an RRC inactive state or an RRC idle state (e.g., without transitioning to an RRC connected state).

In an example, a small data transmission (SDT) procedure may comprise exchange of user data between a wireless device and a base station while the wireless device is in a non-connected state (e.g., a radio resource control (RRC) non-connected state) (e.g., an idle state, inactive state, etc.). The amount of data exchanged in an SDT transmission of the SDT procedure may be smaller than a threshold amount of data. The SDT procedure may comprise one SDT transmission of a small amount of data and/or a sequence of SDT transmissions. For example, using an SDT procedure, the wireless device and/or base station may transmit and/or receive data via the user plane (UP) or the control plane (CP) while the wireless device remains in the non-connected state (e.g., idle, inactive, etc.). For example, using an SDT procedure, the wireless device may transmit and/or receive data without completing a connection setup or resume procedure (and without control plane signaling associated with setup and/or resumption). The data may comprise user data and a signal.

In an example, a wireless device may require a grant to transmit data (e.g., uplink data) associated with an SDT procedure. The wireless device may receive the grant from/via a base station. The grant may be an uplink grant for one or more uplink resources, and the wireless device may use the one or more uplink resources to transmit data (e.g., uplink data). The grant may be a dynamic uplink grant or a configured uplink grant of the one or more uplink resources.

The dynamic uplink grant may indicate one or more specific uplink resources to be used for uplink transmission at a specific time. The configured uplink grant may indicate resources which are repeating, intermittent, and/or periodic. For example, a configured uplink grant configuration may indicate a periodicity of the configured uplink grant and one or more uplink resources of the configured uplink grant configuration may be used and re-used at periodic intervals. For example, a configured uplink grant may be configured/activated, and resources associated with a configured uplink grant configuration of the configured uplink grant may be used until the configured uplink grant is released/deactivated. As an illustration, a dynamic uplink grant may indicate resources at time k, whereas a configured uplink grant may grant resources at times k+nT, where T is a period of the configured uplink grant and n is an integer [0, 1, 2, . . . ].

In an example, the wireless device may obtain the uplink grant via a physical or MAC signal (e.g., DCI or an random access (RA) response) indicating the uplink grant. For example, in a random access (RA)-based procedure (e.g., an early data transmission (EDT) procedure), the wireless device may send an RA preamble requesting one or more uplink resources. Based on the RA preamble, the wireless device may receive an uplink grant indicating one or more uplink resources for transmitting the small data.

In an example, the wireless device may obtain the uplink grant based on a configured uplink grant (CG). The configured uplink grant may be associated with a configured uplink grant configuration (e.g., preconfigured uplink resource (PUR) configuration). The wireless device may receive the configured uplink grant configuration via an RRC message (e.g., an RRC release message). The configured uplink grant configuration may indicate a grant of one or more uplink resources, and the wireless device may use and/or re-use the one or more uplink resources (e.g., preconfigured uplink resources) for transmitting the small data.

SDT may be configured to either take place on RACH or configured uplink grant (CG) resources (e.g., type 1 CG resources). SDT configured to take place on RACH may be referred to as RACH based SDT (or EDT). SDT configured to take place on CG resources may be referred to as CG based SDT (or uplink transmission using PUR).

For example, a wireless device may transmit a first uplink message for a SDT procedure based on uplink grant from RACH based SDT or CG based SDT. For example, a wireless device may transmit a first uplink message for a SDT procedure based on RA response indicating uplink grant for SDT procedure or configured uplink grant for a SDT procedure. For example, for subsequent transmissions, a wireless device may transmit data/signal using dynamic uplink grant or configured uplink grant. A base station may transmit the dynamic uplink grant or the configured uplink grant to the wireless device.

The configured uplink grant for SDT (e.g., SDT resources) may be configured either on initial BWP or on a dedicated BWP. The configured uplink grant for SDT may be configured at normal uplink (NUL) carrier and/or supplementary uplink (SUL) carrier. The configured uplink grant for SDT may be provided to a wireless device in an RRC connected state via/within an RRC release message. For RACH, a base station may be configure to a wireless device whether the 2-step and 4-step RA types can be used for SDT. When both can be used, the UE may select one of the RA types.

A wireless device may select RACH resource for SDT. The RACH resource may be different from RACH resource for an RRC connection. The RACH resource may comprise at least one of: an RA preamble and RACH occasion (RO). The wireless device may perform RACH procedure for SDT using the RACH resource. The wireless device may receive via a serving cell of a base station a random access response (RAR). The RAR may comprise/indicate uplink grant for the SDT. Based on the RAR, the wireless device in an RRC inactive state or an RRC idle state may transmit to the base station a first (uplink) message for the SDT.

SDT may comprise user plane (UP) small data transmission and control plane (CP) small data transmission. Based on the UP small data transmission, the UE in an RRC idle state or an RRC inactive may transmit/receive data via user plane (e.g., via DTCH). Based on the CP small data transmission, the UE in an RRC idle state or an RRC inactive may transmit/receive data via control plane (e.g., CCCH). Based on the UP small data transmission, a base station of the UE may receive downlink data via user plane from UPF of the UE. Based on the CP small data transmission, a base station of the UE may receive downlink data via control plane from AMF of the UE.

A base station may configure/indicate a first radio bearer to a wireless device. The first radio bearer may be configured to the SDT. For example, the base station may transmit an RRC release message configuring/indicating the first radio bearer to the wireless device. The base station may transmit to the wireless device a configuration of the SDT procedure (SDT configuration). The SDT configuration may comprise parameters of the first radio bearer. The RRC release message may comprise the SDT configuration. The wireless device may transmit SDT data of the first radio bearer during the SDT procedure.

SDT data may be data of a first logical channel of the first radio bearer. The data may comprise user data and a signal. The first radio bearer may comprise a data radio bearer (DRB) and a signalling radio bearer (SRB). The SRB may comprise SRB1 and SRB2. The base station may allow the wireless device to transmit the SDT data during the SDT procedure.

User data may be user data of the DRB. The signal may be a signal of the SRB. The wireless device may transmit the user data via the DRB. The wireless device may transmit the signal via the SRB. For example, the signal may be an RRC message or a NAS message.

A second radio bearer may be not configured to the SDT procedure. The second radio bearer may not be the first radio bearer. The base station may not allow the wireless device to transmit data of the second radio bearer during the SDT procedure. non-SDT data may be data of a second logical channel of the second radio bearer. For example, the non-SDT data may be data mapped to radio bearers which are not configured for the SDT (or the SDT procedure). The data may comprise user data and a signal. The second radio bearer may comprise a data radio bearer (DRB) and a signalling radio bearer (SRB). The SRB may comprise SRB1 and SRB2. The user data may be user data of the DRB. The base station may not allow the wireless device to transmit non-SDT data during the SDT procedure. The wireless device may not transmit the non-SDT data during the SDT procedure.

A wireless device may determine to initiate an SDT procedure. for example, the wireless device may determine to initiate an SDT procedure based on at least one of: less than a configured amount of uplink (UL) data awaits transmission across radio bearers for which SDT is enabled; and measured signal strength (e.g., RSRP) in the cell is above a configured threshold.

Based on initiating the SDT procedure, a wireless device may (re)activate AS security. For example, the wireless device may have a sored value of a next hop chaining count (NCC) provided in an RRC release message during preceding RRC connection release procedure. For example, the RRC release message may comprise suspend configuration parameters. Based on initiating the SDT procedure, the wireless device may derive a key of a base station (e.g., KgNB/KeNB) using the NCC. Based on the key to a base station, the wireless device may derive a key for integrity protection and a key for ciphering. The key for integrity protection may comprise a key for integrity protection of an RRC message, KRRCint; and a key for integrity protection of user plane (data), KUPint. The key for ciphering may comprise a key for ciphering of an RRC message, KRRCenc; and a key for ciphering of user plane (data), KUPenc. The wireless device may configure to resume integrity protection using the key for integrity protection to data/signal received and sent by the wireless device during the SDT procedure. The wireless device may configure to resume ciphering using the key for ciphering to data/signal received and sent by the wireless device during the SDT procedure.

Once initiated, an SDT procedure may last as long as the wireless device is not explicitly directed to an RRC idle or an RRC inactive (via an RRC release) or to an RRC connected (via an RRC resume).

SDT (procedure) may comprise at least one of: an initial SDT transmission and subsequent transmissions. Based on initiating the SDT procedure, a wireless device may transmit a first (uplink) message for the SDT procedure. The wireless device may transmit the first message via SDT resource. The SDT resource may be CG resource or uplink grant of a response to an RACH preamble for SDT procedure.

The first message may be Msg 3 or Msg A. The first message may comprise at least one of: an RRC request message; first uplink data; assistance parameters for the SDT procedure (or assistance information for the SDT procedure); a request for uplink grant of second uplink data. The RRC request message may be transmitted via a common control channel (CCCH). A CCCH message may comprise the RRC request message. The first uplink data may comprises user data and signal (e.g., an RRC message). The user data of the first uplink data may be transmitted via a dedicated traffic channel (DTCH). The signal of the first uplink data may be transmitted via a dedicated control channel (DCCH). A DTCH message may comprise the user data of the first uplink data. A DCCH message may comprise the signal of the first uplink data. The CCCH message and the DTCH/DCCH message may be multiplexed into the first message. The first message may comprise at least one of: the CCCH message, the DTCH message and the DCCH message. The assistance parameters (or the assistance information); may comprise (expected) traffic information of the wireless device. The traffic information may indicate at least one of: whether subsequent transmissions for uplink and/or downlink is expected; and amount of data of the subsequent transmissions. For example, the assistance parameters may comprise release assistance information (RAI). The request for uplink grant of second uplink data may be a buffer status report (BSR).

The wireless device may receive a response to the first message from a base station. The response may comprise an RRC response message to the RRC request message of the first uplink message. Based on the response comprising an RRC response message, the wireless device may complete a SDT procedure. The RRC response message may be an RRC release message; or an RRC resume message; or an RRC setup message. Based on the RRC response message being an RRC release message, the wireless device may transition back to an RRC idle state or an RRC inactive state. Based on the RRC message being an RRC resume/setup message, the wireless device may transition to an RRC connected state.

The wireless device may receive a response to the first message from a base station. The response may not comprise the RRC response message. The base station may determine to allow the wireless device subsequent transmissions in an RRC inactive or an RRC idle state. The response may indicate uplink grant for the subsequent transmissions. The response may indicate the subsequent transmissions. Based on the response, the wireless device may perform the subsequent transmission while staying in the RRC inactive state or the RRC idle state. For example, the response may be Msg 4 or Msg B.

After the initial SDT transmission, subsequent transmissions may be handled differently depending on the type of resources configured: when using CG resources, the network may schedule subsequent UL transmission using dynamic grants or they may take place on the next CG resource occasions; when using RACH resources, the network may schedule subsequent UL and downlink DL transmissions using dynamic grants and assignments after the completion of the RA procedure.

During subsequent transmissions, a wireless device may receive an RRC response message to the RRC request message of the first uplink message. Based on the RRC response message, the wireless device may complete a SDT procedure. The RRC response message may be an RRC release message; or an RRC resume message; or an RRC setup message. Based on the RRC response message being an RRC release message, the wireless device may transition back to an RRC idle state or an RRC inactive state. Based on the RRC response message being an RRC resume/setup message, the wireless device may transition to an RRC connected state.

Based on receiving a paging message indicating the SDT (procedure), a wireless device may determine to initiate the SDT procedure. The wireless device may transmit a first uplink message for a SDT procedure wherein the first uplink message may comprise an RRC request message. The RRC request message may indicate a SDT (procedure).

A UE may determine to perform initiating SDT using configured uplink grant (CG based SDT) based on configured uplink grant conditions being met. The configured uplink grant conditions may comprise at least one of: the UE has a valid configured uplink grant configuration parameters; the UE has a valid timing alignment (TA) value; system information of a serving cell indicates configured uplink grant support; establishment or resumption request is for mobile originating calls and the establishment cause is mo data or mo exception data or delay tolerant access; the UE supports configured uplink grant; the size of the resulting MAC PDU including the total uplink data is expected to be smaller than or equal to the TBS configured for configured uplink grant; and the UE has a stored NCC value provided in the RRC release message comprising suspend configuration parameters during the preceding suspend procedure.

The UE may determine the timing alignment value for small data transmission for configured uplink grant to being valid based on TA validation conditions for configured uplink grant being met. The TA validation conditions for configured uplink grant may comprise at least one of: the time alignment timer for configured uplink grant is running; or serving cell RSRP has not increased by more than the RSRP increase threshold and has not decreased by more than the RSRP increase threshold.

For CG based SDT (or uplink transmission using PUR), a UE in an RRC connected state may transmit CG (or PUR) configuration request message (or assistance information message) to a base station where the CG configuration request message may comprise at least one of: requested number of CG occasions where the number may be one or infinite; requested periodicity of CG; requested transport block size (TBS) for CG; and/or requested time offset for a first CG occasion.

The base station may transmit configured uplink grant configuration (parameters) comprising the (pre)configured uplink grant (resource) to the wireless device. For example, in response to the configured uplink grant configuration request message, the base station may transmit configured uplink grant configuration parameters comprising the preconfigured uplink resource to the UE. For example, the base station may send an RRC release message comprising the configured uplink grant configuration parameters.

The configured uplink grant configuration parameters may comprise at least one of: an indication to setup or release configured uplink grant configuration parameters; number of configured uplink grant occasions; configured uplink grant resource identifier (configured uplink grant RNTI); configured uplink grant configuration identity (configured uplink grant configID); value of the time offset for a first configured uplink grant occasion (configured uplink grant start time); periodicity of configured uplink grant resource (configured uplink grant periodicity); duration of configured uplink grant response window (configured uplink grant response window time); threshold(s) of change in serving cell RSRP in dB for TA validation (configured uplink grant change threshold(s)) where the thresholds comprise RSRP increase threshold and RSRP decrease threshold; value of time alignment timer for configured uplink grant; and/or physical configuration parameters for configured uplink grant. The physical configuration parameters for configured uplink grant may comprises at least one of: PUSCH configuration parameters for configured uplink grant; PDCCH configuration parameters for configured uplink grant; PUCCH configuration parameters for configured uplink grant; downlink carrier configuration parameters used for configured uplink grant; and/or uplink carrier frequency of the uplink carrier used for configured uplink grant. The configured uplink grant RNTI may be assigned to more than one wireless device. The configured uplink grant configID may be unique in one base station.

Based on the configured uplink grant configuration parameters, the UE may store or replace configured uplink grant configuration parameters provided by the configured uplink grant configuration parameters based on the indication requesting to setup configured uplink grant configuration parameters. In response to receiving the configured uplink grant configuration parameters, the UE may start a time alignment timer for configured uplink grant with the value of time alignment timer for configured uplink grant and configure the configured uplink grant configuration parameters. For example, based on the indication requesting to setup configured uplink grant configuration parameters, the UE may start a time alignment timer for configured uplink grant with the value of time alignment timer for configured uplink grant and configure the configured uplink grant configuration parameters. In response to receiving the configured uplink grant configuration parameters, the UE may discard configured uplink grant configuration parameters based on the indication requesting to release configured uplink grant configuration parameters. In response to the configuring the configured uplink grant configuration parameters, the UE may generate the configured uplink grant based on the configured uplink grant configuration parameters. For example, based on the configured uplink grant configuration parameters, the UE may determine when generating the configured uplink grant. For example, based on the configured uplink grant start time and the configured uplink grant periodicity, the UE may determine when generating the configured uplink grant. For example, based on the PUSCH configuration parameters, the UE may determine (transport blocks for) the configured uplink grant. For example, based on the PUSCH configuration parameters, the UE may determine (transport blocks for) the configured uplink grant.

Based on CG configuration parameters, a UE in an RRC idle state or an RRC inactive state may start a time alignment timer for CG with the value of time alignment timer for CG and configure the CG configuration parameters. In response to the configuring the CG configuration parameters, the UE in the RRC idle state or the RRC inactive state may generate preconfigured uplink resource/grant for CG based on the CG configuration parameters. Based on the first RRC release message, the UE may perform a cell (re)selection procedure. Based on the cell (re)selection procedure, the UE in an RRC idle state or an RRC inactive state may select a cell 2 of a second base station (a target base station). The UE in the RRC idle state or the RRC inactive state may have a first uplink data in uplink buffer. The UE in the RRC idle state or the RRC inactive state may determine to initiate CG based SDT based on one or more conditions being met.

A wireless device may transmit a message (e.g., a first uplink message for a SDT procedure) using the CG (or the uplink resource/grant for CG), the UE (UE-MAC entity) may start CG response window timer with the CG response window time. Based on the starting, the UE may monitor PDCCH identified by CG RNTI until the CG response window timer is expired. The UE (UE-MAC entity) may receive a downlink message (e.g., DCI) identified by the CG RNTI on the PDCCH. Based on receiving the downlink message indicating an uplink grant for retransmission, the UE may restart the CG response window timer at last subframe of a PUSCH transmission indicating the uplink grant, puls time gap (e.g., 4 subframes). Based on the restarting, the UE in the RRC idle state or the RRC inactive state may monitor PDCCH identified by CG RNTI until the CG response window timer is expired. Based on receiving the downlink message indicating L1 (layer 1) ack for CG, the UE in the RRC idle state or the RRC inactive state may stop the CG response window timer and consider CG based SDT successful. Based on receiving the downlink message indicating fallback for PUR, the UE in the RRC idle state or the RRC inactive state may stop the CG response window timer and consider the CG based SDT being failed. Based on receiving the downlink message indicating PDCCH transmission (downlink grant or downlink assignment) addressed to the CG RNTI and/or MAC PDU comprising the uplink data being successfully decoded, the UE in the RRC idle state or the RRC inactive state may stop the CG response window timer and consider the CG based SDT successful. Based on the PDCCH transmission, the UE in the RRC idle state or the RRC inactive state may receive at least one of an RRC response message and downlink data. The RRC response message may comprise at least one of an RRC release message or an RRC early data complete message.

Based on not receiving any downlink message until the CG response window timer being expired, the UE in the RRC idle state or the RRC inactive state may consider the CG based SDT being failed. Based on considering the CG based SDT being failed, the UE may perform random access procedure. For example, the random access procedure may comprise RACH procedure for RACH based SDT.

CG resources for a SDT procedure may be configured on NUL and/or SUL. A wireless device may start a (response) window after CG transmission or dynamic grant (DG) transmission for CG based SDT. The wireless device may start a timer for the window based on the starting the window.

A wireless device may start a timer alignment timer (TAT) associated with the CG-SDT resources (TAT-SDT) upon receiving the TAT-SDT configuration from a base station (e.g., via an RRC release message). A wireless device may restart the TAT-SDT upon receiving TA command. A wireless device may determine that CG resource for a SDT procedure is valid based on a TA validation mechanism. For example, A wireless device may determine that CG resource for a SDT procedure is valid based on a RSRP associated with the CG resource and a RSRP threshold associated with the CG resource.

for CG based SDT, subsequent data transmission may use CG resource or DG (e.g., dynamic grant addressed to UE's C-RNTI). The C-RNTI may be a C-RNTI previously assigned or configured explicitly by a base station. A base station may transmit multiple CG-SDT configurations per carrier in an RRC idle state or an RRC inactive state. CG-SDT resources may be valid in one cell. A wireless device may release CG-SDT resources when a TAT-SDT expires in an RRC idle state or an RRC inactive state.

A base station may transmit to a wireless device a configuration of a SDT procedure via an RRC release message. The configuration may indicate a radio bearer configured to the SDT procedure (e.g., a SDT bearer). Based on receiving the RRC release message, the wireless device may suspend one or more radio bearers. The wireless device may suspend an RRC connection. The wireless device may resume the SDT bearer based on initiating the SDT procedure while keeping suspending an non-SDT bearer. During the SDT procedure, the wireless device may transmit/receive data/signal associated with the SDT bearer.

During a SDT procedure, a wireless device may receive an RRC message (e.g., an RRC resume message) transitioning to an RRC connected state. Based on receiving the RRC resume message, the wireless device may resume a non-SDT bearer. The wireless device may transition to the RRC connected state.

During a SDT procedure, a wireless device may transmit a message based on having the non-SDT data (e.g., data/signal associated with the non-SDT bearer). The message may indicate the non-SDT data. The message may indicate availability of the non-SDT data.

The message may request transitioning to an RRC connected state. The message may be a common control channel (CCCH) message; or a dedicated control channel (DCCH) message. For example, the CCCH message may comprise an RRC (resume) request message. The DCCH message may comprise an assistance information message.

Based on receiving the message, a base station may transmit an RRC message (e.g., an RRC resume message) transitioning to an RRC connected state.

A wireless device performing a SDT procedure may detect a failure of a SDT procedure. The failure may comprise at least one of: a SDT failure detection timer being expired; cell (re)selection/change; inability to comply an RRC message; a radio link failure (RLF); RLC (PDU) max retransmission failure; receiving a reject/fallback indication from a base station; CG response window timer is expired.

A wireless device may start a T319$a$ (e.g., a SDT failure detection timer or a SDT timer) based on initiating a SDT procedure (or initiating a RRC connection establish/resume procedure for the SDT procedure). The wireless device may start T319$a$ with a T319$a$ value received from a base station. The wireless device may initiate the SDT procedure based on one or more conditions for the SDT procedure being fulfilled.

A wireless device may start T319 or T300 based on initiating a RRC connection establish/resume procedure not for the SDT procedure as shown in FIG. 18. The RRC connection resume procedure is for resuming an RRC connection of the wireless device.

Based on detecting a failure of a SDT procedure, a wireless device may release an RRC connection. For example, the wireless device may transition to an RRC idle state by releasing the RRC connection. The wireless device may perform high layer (e.g., application layer) retransmission.

Based on detecting a failure of a SDT procedure, a wireless device may keep suspending an RRC connection. For example, the wireless device may stay in an RRC inactive state. The wireless device may stay in an RRC idle state with suspending an RRC connection. The wireless device may transmit an RRC resume request to a new cell. For example, the wireless device may select the new cell based on cell (re)selection procedure in response to the detecting the failure.

Figure 19:
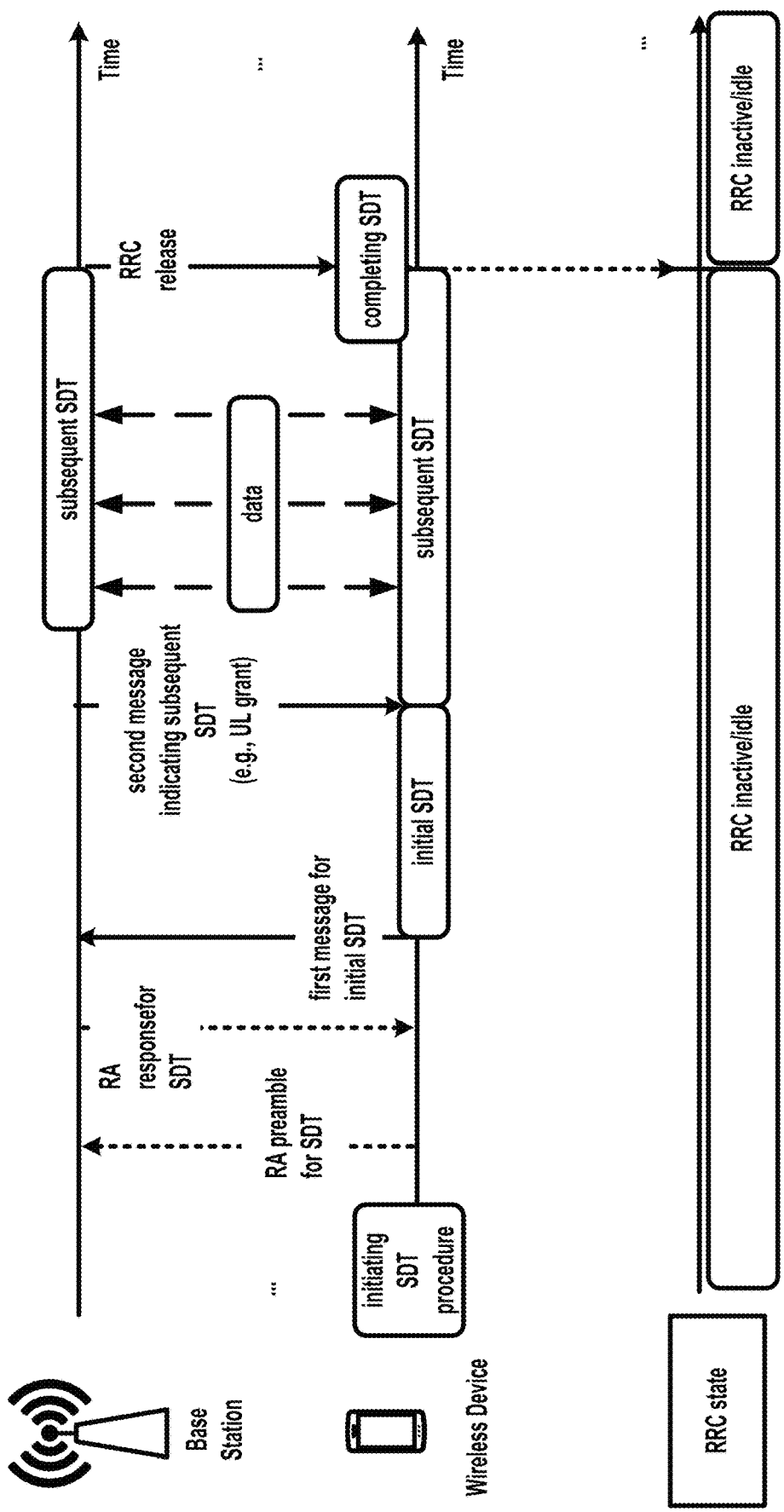
FIG. 19 illustrates an example of subsequent small data transmission (SDT).

FIG. 19 illustrates an example of small data transmission (SDT). A wireless device may be in a non-connected state (e.g., RRC idle state, RRC inactive state, etc.). For example, the wireless device may receive a release message. The release message may be an RRC release message. The wireless device may transition to the non-connected state based on the release message. The wireless device may determine to initiate SDT procedure. The determining may occur while the wireless device is in the non-connected state. The determining may be based on the wireless device being in the non-connected state.

In an example of FIG. 19, the wireless device may determine to initiate SDT procedure (e.g., based on one or more SDT conditions being met). The determining may occur while the UE is in the non-connected state. The determining may be based on the UE being in the non-connected state. The initiating the SDT may comprise at least one of: activating/deriving security keys for integrity protection and/or ciphering; configuring to resume the integrity protection; applying the security keys for the ciphering to data/signal; configuring to use the SDT; and generating an RRC request message.

In an example of FIG. 19, based on the initiating the SDT, the wireless device may transmit a first (uplink) message (for an initial SDT). The first message may be transmitted while in the non-connected state. The first message may be transmitted to a base station (via a serving cell of the base station). The first message may be a Msg 3 and/or a Msg A. The first message may comprise at least one of: an RRC request message for the SDT; first uplink data; and assistance parameters for SDT (or assistance information for the SDT procedure). The first message may indicate that subsequent transmission (and reception) is expected/required. For example, the assistance parameters may indicate (expected) traffic pattern/size for the subsequent transmission. Msg 3 and/or Msg A may be transmitted on an uplink shared channel (UL-SCH). Msg 3 and/or Msg A may contain a C-RNTI MAC CE and/or CCCH SDU and associated with an UE contention resolution identity, as part of a random access procedure. The wireless device may perform a RACH procedure for the SDT. For example, the wireless device may perform a RACH procedure using RACH resource configured to the SDT. The RACH resource may comprise at least one of: an RA preamble for the SDT and RACH occasion (RO).

In an example of FIG. 19, the SDT (procedure) may comprise an initial small data transmission (or an initial small data transmission phase) and a subsequent transmission (or subsequent transmission phase or subsequent SDT (phase)). For example, a wireless device may initiate a SDT procedure. A wireless device may determine to initiate the SDT procedure based on receiving a paging message indicating the SDT; or having a packet associated with the SDT. For example, the packet may be a packet of a radio bearer configured to the SDT. The wireless device may initiate the SDT based on a SDT condition being met where the SDT condition comprises at least one of: a first condition for a RA based SDT; or a second condition for a CG based SDT. Based on the initiating the SDT, the wireless device may transmit a first (uplink) message for an initial SDT. The initial SDT may comprise transmission of the first message and reception of a response to the first message. The initial SDT phase may be a time duration from transmission time of the first message to a time to determine whether the transmission is successfully completed. The time may be a reception time of a response to the first message. The wireless device may initiate the subsequent SDT (phase) after the initial (SDT) transmission being successfully completed. The wireless device may complete the (subsequent) SDT procedure based on receiving a message indicating completion of the SDT procedure; or detecting a failure of the SDT procedure. The message may be an RRC release message.

In an example of FIG. 19, based on the second condition being met, the wireless device may transmit the first message using CG configured to the SDT. The wireless device may start a CG (or PUR) response window timer and monitor PDCCH of a cell for a response to the first message. Based on receiving the response, the wireless device may determine that the initial SDT (or transmission of the first message) is successfully completed. Based on not receiving the response (e.g., until the CG response window timer being expired), the wireless device may determine that the initial SDT (or transmission of the first message) is not successfully completed.

In an example of FIG. 19, based on the first condition being met, the wireless device may transmit an RA preamble using an RA resource for the (initial) SDT. Based on receiving a RA response indicating uplink resource for the (initial) SDT, the wireless device may transmit the first message using the uplink resource. Based on receiving a response to the first message, the wireless device may determine that the initial SDT (or transmission of the first message) is successfully completed. Based on not receiving the response, the wireless device may determine that the initial SDT (or transmission of the first message) is not successfully completed.

In an example of FIG. 19, based on the first message, the base station may determine whether to allow/configure the subsequent transmission/reception using the SDT (subsequent SDT). The base station may transmit via the serving cell a second message to indicate a result of the determination whether to perform the subsequent SDT. The second message may be a Msg 4 and/or a Msg B. The second message may be the response to the first message.

In an example of FIG. 19, the base station may determine not to configure/allow the subsequent SDT. In an example, the base station may determine to complete the SDT. Based on determining to configure the subsequent SDT, the second message may indicate that subsequent SDT is not configured. Based on determining not to configure the subsequent SDT, the second message may indicate that SDT is complete. The second message may comprise an RRC release message. Based on the second message, the UE may complete the SDT. Based on the second message, the UE may remain in and/or transition (back) to the RRC inactive state or the RRC idle state. The second message may comprise an RRC setup/resume message. Based on the second message, the UE may transition to an RRC connected state.

In an example of FIG. 19, the base station may determine to configure/allow the subsequent SDT. Based on determining to configure the subsequent SDT, the base station may send a second message to the wireless device.

For example, the second message may indicate the subsequent SDT. The second message may indicate an uplink grant. For example, the uplink grant may indicate the subsequent SDT. The uplink grant may be for the subsequent SDT. Based on the second message, the UE may perform the subsequent SDT. The subsequent SDT may comprise transmitting and or receiving data and/or signals (e.g., control signals). The transmitting and/or receiving may be based on the uplink grant. The subsequent SDT may be performed without transitioning to an RRC connected state (e.g., while in the RRC idle state or the RRC inactive). The second message may not comprise an RRC setup/resume message (which would transition the UE to an RRC connected state). The second message may not comprise an RRC release message (which would complete the SDT).

In an example of FIG. 19, the second message may indicate that contention resolution of the wireless device is successful. For example, the second message may comprise UE contention resolution identity (MAC CE). The UE contention resolution identity medium access control element (MAC CE) may match predetermined first bits (e.g., 48 first bits) of common control channel (CCCH) service data unit (SDU) where the CCCH SDU comprises the RRC request message. Based on receiving the second message, the wireless device may determine that C-RNTI of a serving cell is assigned. The wireless device may (start to) monitor PDCCH of the serving cell. The wireless device may (start to) monitor PDCCH of a BWP configured to the SDT where the BWP is a BWP of the serving cell. The PDCCH may be PDCCH addressed by the C-RNTI.

In an example of FIG. 19, the second message may be a (physical) downlink message (e.g., DCI). The physical message may indicate the wireless device to start monitoring window for the subsequent SDT. For example, the wireless device may transmit to the base station the first message using CG configured to the SDT (or PUR). Based on the transmitting, the wireless device may (start to) monitor start CG response window timer with the CG response window time. Based on the starting, the UE may monitor PDCCH identified by RNTI of the CG (e.g., CS RNTI, or PUR RNTI, or C-RNTI) until the CG response window timer is expired. The UE (UE-MAC entity) may receive a downlink message (e.g., DCI) identified by the RNTI of the CG on the PDCCH. Based on the downlink message, the wireless device may start second CG response window timer or restart the CG response window timer. Based on the starting or the restarting, the wireless device may monitor PDCCH identified by RNTI of the CG. The base station may transmit downlink message to control the CG response window of the wireless device. The downlink message may indicate extend or restart the CG response window. For example, the downlink message may indicate subsequent SDT. The base station may control/modify a period of the (subsequent) SDT via the downlink message. Based on the downlink message, the wireless device determines to initiate subsequent SDT (or continue the SDT). The base station may communicate with the wireless device while the wireless device monitor the PDCCH on the CG response window.

In an example of FIG. 19, during the SDT procedure, the wireless device may transmit one or more data or signal to the base station. During the SDT procedure, the wireless device may receive one or more data or signal from the base station. During the SDT procedure, the wireless device may transmit to the base station a request of uplink resource/grant for subsequent data/signal. For example, the request may be BSR indicating information about the subsequent data/signal volume (e.g., uplink data/signal volume). Based on the request, the base station may provide the uplink resource to the wireless device. Based on the request, the base station may determine to transition the wireless device to an RRC connected state. Based on the determining, the base station may transmit to the wireless device an RRC response message transitioning the wireless device to the RRC connected state. For example, the RRC response message may be an RRC resume message.

In an example of FIG. 19, during the SDT procedure, the base station may determine to complete the SDT procedure. Based on the determining, the base station may transmit a message terminating the SDT procedure to the wireless device. Based on the message, the wireless device may complete the SDT procedure. Based on the message, the wireless device may remain in the non-connected state and/or transition back to the non-connected state (e.g., from an RRC inactive state to an RRC idle state). For example, the message may be an RRC release message. For example, the message may be an second RRC message. The second RRC message may be a RRC response message in response to the RRC request message (of the first message).

In an example of FIG. 19, the wireless device may configure SDT configuration. The SDT configuration may comprise configuration of one or more layers where the one or more layers comprises at least one of: an RRC layer; a PDCP layer, a RLC layer; a MAC layer; and a PHY layer. For example, the SDT configuration may comprise at least one of: BWP for SDT; search space; and an RACH configuration. The RACH configuration may indicate an RACH resource for a SDT procedure (or an initial SDT). The RACH resource may comprise at least one of: an RACH occasion (RO) and an RA preamble. The wireless device may perform an random access procedure using the RACH configuration during the SDT procedure (or the initial SDT or the initial transmission). The wireless device may perform the SDT procedure using the SDT configuration. Based on completing or aborting of the SDT or the subsequent SDT, the wireless device may suspend or release the SDT configuration.

Figure 20A:
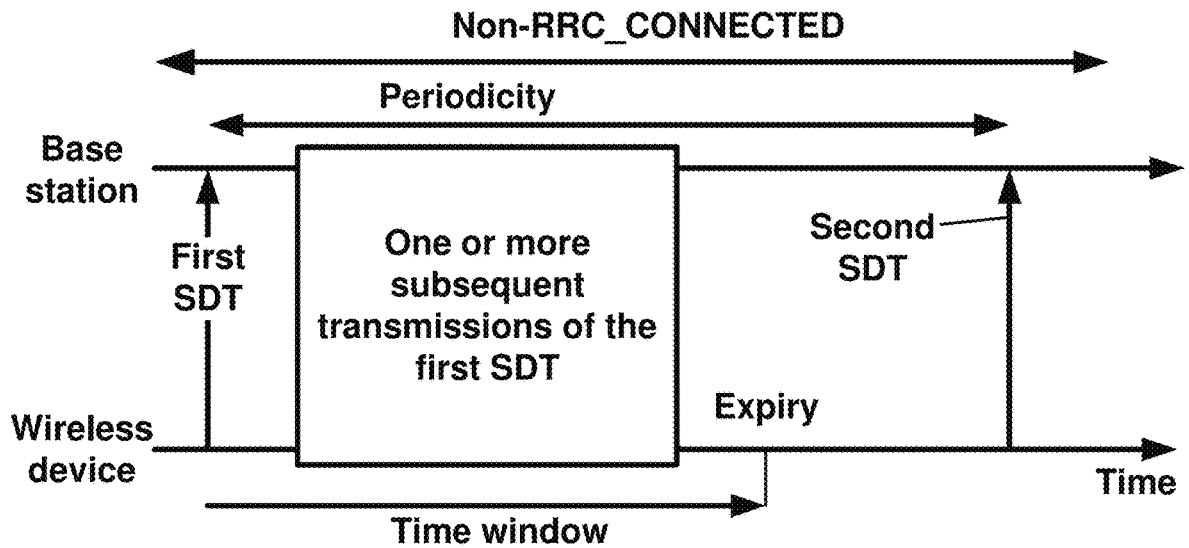
FIG. 20A illustrates an example of a time window management of one or more subsequent transmissions of an SDT.

FIG. 20A illustrates an example of a time window management of one or more subsequent transmissions of an SDT as per an aspect of an embodiment of the present disclosure. A wireless device may receive a message (e.g., an RRC release message) comprising and/or indicating configuration parameters of an SDT. The configuration parameters may indicate uplink grant(s) and/or one or more uplink radio resource(s) of the uplink grant(s) for the SDT. In FIG. 20A, a first SDT and a second SDT are the transmissions via the uplink grant(s) and/or the one or more uplink radio resource(s) with a periodicity. The wireless device may (re-)start a time window in response to transmitting, via the uplink grant(s) and/or the one or more uplink radio resource(s), uplink data. For example, the wireless device may (re-)start a time window in response to performing the first SDT in FIG. 20A. The message may comprise a value of the time window. The wireless device may monitor a PDCCH during the time window with one or more RNTIs. The one or more RNTIs may be predefined and/or configured by a base station (e.g., indicated by one or more RRC message that may comprise the message) for the PDCCH monitoring for the SDT and/or for a non-RRC connected state (non-connected state). For example, the one or more RNTIs may comprise C-RNTI. The one or more RNTIs may comprise SDT-RNTI. The one or more RNTIs may comprise P-RNTI (e.g., RNTI for a paging message). During the time window, the wireless device may receive, via the PDCCH, one or more DCIs. The one or more DCIs may comprise UL grant(s) that schedule new UL transmission(s). The one or more DCIs may comprise UL grant(s) that schedule UL (re-)transmissions. The one or more DCIs may comprise DL grant(s) that schedule new DL transmissions. The one or more DCIs may comprise DL grant(s) that schedule DL (re-)transmissions. The wireless device may keep running the time window, independent of receiving the one or more DCIs and/or independent of performing UL and/or DL new transmission(s) and/or (re-)transmissions. For example, the wireless device may not stop or may not (re-)start the time window in response to receiving the one or more DCIs and/or in response to performing UL and/or DL new transmission(s) and/or (re-)transmissions. The wireless device may continue to monitor (and/or keep monitoring) the PDCCH until the time window expires. The wireless device may stop to monitor the PDCCH in response to an expiry of the time window.

In an example, a wireless device may maintain a time window for an SDT and/or one or more subsequent transmissions of an SDT. The wireless device may receive, from a base station, a message (e.g., RRC release message) comprising a value (e.g., length) of the time window. The value may indicate a time period (or interval) that the wireless device performs (e.g., is allowed to perform) an SDT and/or one or more subsequent transmissions of an SDT. The value may indicate a time period (or interval) that the wireless device monitors (e.g., is allowed to monitor) a PDCCH to receive one or more UL and/or DL grants for a new UL and/or DL transmissions and/or retransmission of the SDT and/or the one or more subsequent transmissions of the SDT. The wireless device may receive one or more DCIs via the PDCCH. The one or more DCIs may comprise the one or more UL and/or DL grants. The wireless device may (re-)start the time window in response to receiving a grant (e.g., UL grant and/or DL grant) of the one or more DCIs. The wireless device may (re-)start the time window in response to performing a transmission scheduled by a grant (e.g., UL grant and/or DL grant) for the SDT and/or the one or more subsequent transmissions of the SDT. The wireless device may stop monitoring the PDCCH in response to an expiry of the time window. The wireless device may stop performing the SDT and/or the one or more subsequent transmissions of the SDT in response to an expiry of the time window.

Figure 20B:
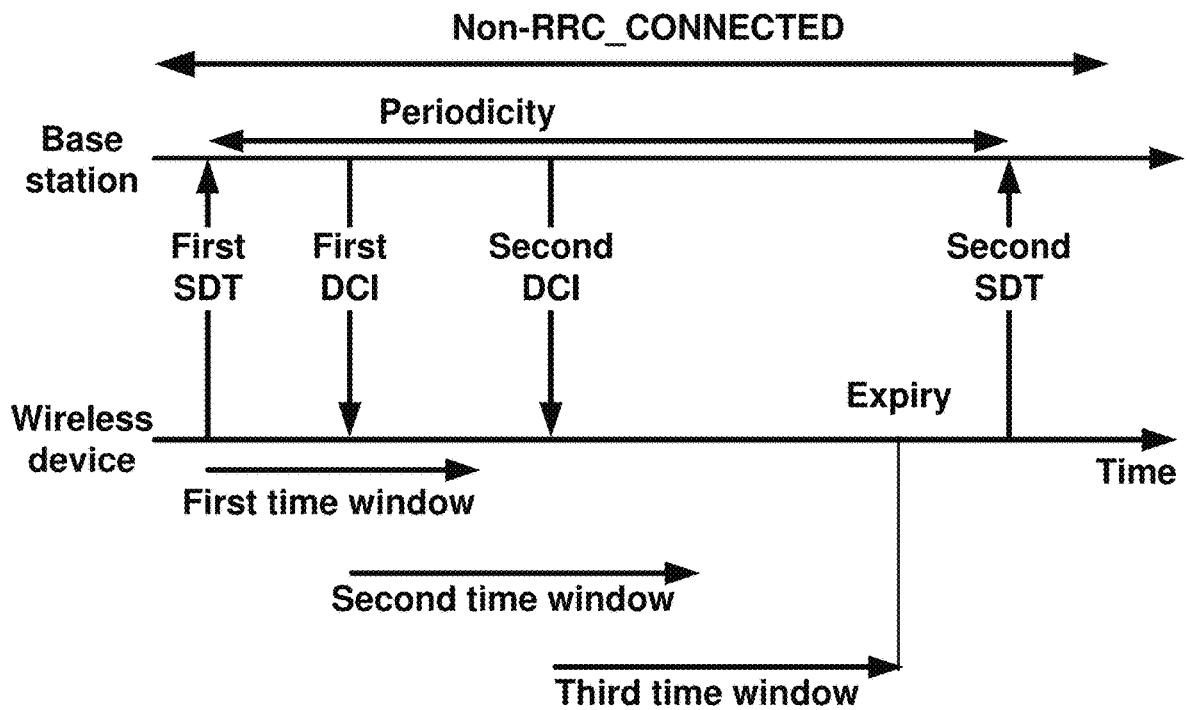
FIG. 20B illustrates an example of a time window management of one or more subsequent transmissions of an SDT.

FIG. 20B illustrates an example of a time window management of one or more subsequent transmissions of an SDT as per an aspect of an embodiment of the present disclosure. A wireless device may receive a message (e.g., an RRC release message) comprising and/or indicating configuration parameters of an SDT. The configuration parameters may indicate uplink grant(s) and/or one or more uplink radio resource(s) of the uplink grant(s) for the SDT. In FIG. 20B, a first SDT and a second SDT are the transmissions via the uplink grant(s) and/or the one or more uplink radio resource(s) with a periodicity. The wireless device may (re-)start a time window in response to transmitting, via the uplink grant(s) and/or the one or more uplink radio resource(s), uplink data. For example, the wireless device may (re-)start a first time window in response to performing the first SDT in FIG. 20B. The message may comprise a value of the first time window. The wireless device may monitor a PDCCH during the first time window with one or more RNTIs. The one or more RNTIs may be predefined and/or configured by a base station (e.g., indicated by one or more RRC message that may comprise the message) for the PDCCH monitoring for the SDT and/or for a non-RRC connected state. For example, the one or more RNTIs may comprise C-RNTI. The one or more RNTIs may comprise SDT-RNTI. The one or more RNTIs may comprise P-RNTI (e.g., RNTI for a paging message). During the first time window, the wireless device may receive, via the PDCCH, first DCI. The first DCI may comprise UL grant(s) that schedule new UL transmission(s). The first DCI may comprise UL grant(s) that schedule UL (re-)transmissions of the first SDT. The first DCI may comprise DL grant(s) that schedule new DL transmissions. The wireless device may (re-)start a second time window in response to receiving the first DCI and/or in response to performing a UL or DL transmission scheduled by the first DCI. The second time window may have a same length to the first time window. For example, the wireless device may (re-)start the first time window as the second time window in response to receiving the first DCI and/or in response to performing a UL or DL transmission scheduled by the first DCI. The wireless device may monitor, during the second time window, the PDCCH with the one or more RNTIs. The wireless device may (re-)start a new time window and/or (re-)start the first time window in response to receiving DCI and/or in response to performing a transmission scheduled by the DCI. In FIG. 20B, the wireless device may (re-)start a third time window in response to receiving second DCI during the second time window and/or in response to performing a UL or DL transmission scheduled by the second DCI. The third time window may be the first time window that the wireless device (re-)starts in response to receiving second DCI during the second time window and/or in response to performing a UL or DL transmission scheduled by the second DCI. The wireless device may keep monitoring the PDCCH while a time window (e.g., the first time window, the second time window, and/or the third time window) started for the SDT and/or its associated subsequent transmission(s) is running. If the time window expires, the wireless device may stop monitoring the PDCCH with the one or more RNTIs. For example, in FIG. 20B, the wireless device may stop monitoring the PDCCH if the wireless device has not received DCI (e.g., introduced based on the one or more RNTIs) and/or if the third time window expires.

For example, a response (e.g., the second message) to the RRC request message may be an RRC release message. The wireless device may keep an RRC state of the wireless device as the non-RRC connected state, e.g., after or in response to receiving the response (e.g., the RRC release message). For example, the wireless device may stop, e.g., after or in response to receiving the response (e.g., the RRC release message), monitoring PDCCH with one or more RNTI associated with the SDT and/or the one or more subsequent transmissions. The wireless device may stop the time window, if running, after or in response to receiving the response (e.g., the RRC release message). The wireless device may not (re-)start the time window (e.g., FIG. 20A and/or FIG. 20B), e.g., after or in response to receiving the response (e.g., the RRC release message).

For example, the response to the RRC request message may be an RRC connection setup message. For example, the RRC connection setup message may comprise an RRC resume message, an RRC (re)establishment message, an RRC setup message, and/or an RRC message comprising parameters that indicate a transition of the wireless device from an non-RRC connected state to an RRC connected state. The wireless device may transition the RRC state of the wireless device from the non RRC connected state to the RRC connected state, e.g., after or in response to receiving the response (e.g., the RRC connection setup message). The wireless device may determine to, e.g., successfully, complete and/or terminate the group of transmission(s), e.g., after or in response to receiving the response (e.g., the RRC connection setup message). For example, the wireless device may stop, e.g., after or in response to receiving the response (e.g., the RRC connection setup message), monitoring PDCCH with one or more RNTI associated with the SDT and/or the one or more subsequent transmissions. The wireless device may stop the time window (e.g., FIG. 20A and/or FIG. 20B), e.g., in response to the time window running and/or after or in response to receiving the response (e.g., the RRC connection setup message). The wireless device may not (re-)start the time window (e.g., FIG. 20A and/or FIG. 20B), e.g., after or in response to receiving the response (e.g., the RRC connection setup message).

For example, the wireless device may start (and/or restart one or more times) a time window, e.g., after or in response to the initial transmission. The wireless device may receive, via a PDCCH and/or during the SDT procedure, one or more DCIs that schedule the one or more subsequent transmissions. The wireless device may receive the one or more DCIs during the time window. The wireless device may receive the one or more DCIs during the time window and/or the (re-)started time window one or more times based on the present disclosure (e.g., FIG. 20A and/or FIG. 20B).

In an example, a data being associated with a logical channel may be the data being configured to be transmitted on the logical channel. A base station may associate/configure the data to the logical channel and vice versa. Based on associating/configuring, a wireless device associate/configure the data to the logical channel and vice versa. The data may comprise user data and a signal. The signal may be an RRC message.

In an example, small data transmission (SDT) is a procedure allowing data and/or signalling transmission while remaining in RRC inactive state (e.g., without transitioning to RRC connected state). the SDT may be enabled on a radio bearer basis and be initiated by the UE only if less than a configured amount of UL data awaits transmission across all radio bearers for which SDT is enabled, the downlink RSRP (DL RSRP) is above a configured threshold, and a valid SDT resource is available.

In an example, SDT procedure may be initiated with either a transmission over RACH (configured via system information) or over Type 1 CG resources (configured via dedicated signaling in RRC release). The SDT resources may be configured on initial BWP for both RACH and CG. RACH and CG resources for SDT can be configured on either or both of normal uplink (NUL) and supplementary uplink (SUL) carriers. The CG resources for SDT may be valid only within the cell the wireless device received RRC release and transitioned to RRC inactive state. For RACH, the network (e.g., base station) may configure 2-step and/or 4-step RA resources for SDT. When both 2-step and 4-step RA resources for SDT are configured, the wireless device may select the RA type according to subclause 9.2.6. CFRA is not supported for SDT over RACH.

In an example, once initiated, the SDT procedure may be either: successfully completed after the wireless device is directed to RRC idle state (via RRC release) or RRC inactive (via RRC release or RRC reject) or to RRC connected state (via RRC resume or RRC setup); or—unsuccessfully completed upon cell re-selection, expiry of the SDT failure detection timer, a MAC entity reaching a configured maximum PRACH preamble transmission threshold, an RLC entity reaching a configured maximum retransmission threshold, or expiry of SDT-specific timing alignment timer while SDT procedure is ongoing over CG and the wireless device has not received a response from the network after the initial PUSCH transmission. Upon unsuccessful completion of the SDT procedure, the wireless device may transition to RRC idle.

In an example, the initial PUSCH transmission during the SDT procedure may include at least the CCCH message. When using CG resources for initial SDT transmission, the wireless device may perform autonomous retransmission of the initial transmission if the wireless device does not receive confirmation from the network (dynamic UL grant or DL assignment) before a configured timer expires. After the initial PUSCH transmission, subsequent transmissions may be handled differently depending on the type of resource used to initiate the SDT procedure:

In an example, when using CG resources, the network may schedule subsequent UL transmissions using dynamic grants or they may take place on the following CG resource occasions. The DL transmissions may be scheduled using dynamic assignments. The UE can initiate subsequent UL transmission only after reception of confirmation (dynamic UL grant or DL assignment) for the initial PUSCH transmission from the network. For subsequent UL transmission, the UE may not initiate re-transmission over a CG resource.

In an example, when using RACH resources, the network may schedule subsequent UL and DL transmissions using dynamic UL grants and DL assignments, respectively, after the completion of the RA procedure.

In an example, while the SDT procedure is ongoing, if data appears in a buffer of any radio bearer not enabled for SDT, the UE may initiate a transmission of a non-SDT data arrival indication using UE assistance information message to the network and, if available, includes the resume cause.

In an example, SDT procedure over CG resources may be initiated with valid UL timing alignment. The UL timing alignment may be maintained by the UE based on a SDT-specific timing alignment timer configured by the network via dedicated signalling and, for initial CG-SDT transmission, also by DL RSRP of configured number of highest ranked SSBs which are above a configured RSRP threshold. Upon expiry of the SDT-specific timing alignment timer, the CG resources may be released while maintaining the CG resource configuration.

In an example, logical channel restrictions configured by the network while in RRC connected state and/or in RRC release message for radio bearers enabled for SDT, if any, are applied by the UE during SDT procedure.

In an example, the network may configure UE to apply ROHC continuity for SDT either when the UE initiates SDT in the cell where the UE received RRC release and transitioned to RRC inactive state or when the UE initiates SDT in a cell of its RNA.

In an example, a base station may transmit to a wireless device an RRC release message. The RRC release message may comprise a configuration for a SDT procedure (e.g., a SDT configuration). The configuration may indicate one or more bearers configured to a SDT procedure. The RRC release message may comprise suspend configuration. Based on the suspend configuration, the wireless device may transition to an RRC inactive state and suspend an RRC connection. The suspend configuration may comprise the SDT configuration. The one or more bearers may comprise at least one of DRB and SRB. The SRB may comprise at least one of: SRB1 and SRB2. The SDT configuration may comprise configured grant (CG) configuration for CG SDT procedure. The CG configuration may be referred to as SDT-MAC-PHY-CG configuration.

In an example, based on the RRC release message, the wireless device may suspend all bearers including the one or more bearers and transition to an RRC inactive state (or an RRC idle state). The base station may store a context of the wireless device. The context may comprise the configuration for the SDT procedure. The wireless device in the RRC inactive may initiate the SDT procedure. For example, based on the one or more conditions for the SDT procedure, the wireless device may initiate the SDT procedure. Based on the initiating the SDT procedure, the wireless device may transmit a first message for the SDT procedure where the first message may be Msg3 or MsgA. Based on initiating the SDT procedure, the wireless device may start a timer T319*a* (e.g., a SDT failure detection timer or a SDT timer). Based on initiating the SDT procedure, the wireless device may resume the one or more bearers configured for the SDT procedure while keeping suspending other bearers.

In an example, based on one or more conditions for a SDT procedure being fulfilled, a wireless device in the RRC inactive state may initiate the SDT procedure. The one or more conditions may comprise at least one of: that the upper layers (e.g., NAS layer) of the wireless device requests resumption of RRC connection; that system information block (SIB) includes SDT common configuration (e.g., sdt-ConfigCommon); a SDT configuration is configured; all the pending data in UL is mapped to the radio bearers configured for SDT; and lower layer conditions for initiating SDT are fulfilled. lower layers (e.g., MAC layer) of the wireless device indicate to upper layers (e.g., an RRC layer) whether the lower layer conditions for initiating SDT are fulfilled. The SIB is a SIB of a cell the wireless device camped on (e.g., the cell the wireless device initiates the SDT).

In an example, based on one or more conditions for the lower layer being fulfilled, the wireless device may determine that the lower condition for initiating SDT are fulfilled. The one or more condition for the lower layer may comprise at least one of: that the RSRP of the downlink pathloss reference is higher than sdt-RSRP-Threshold; and that a radio resource for SDT is available. The radio resource for SDT may be a configured grant (CG) configured for SDT or a random access resource configured for SDT. The radio resource may be a radio resource associated with a carrier selected, by the wireless device, for the SDT. The configured grant for SDT may be a configured grant type 1 resource In an example, the wireless device may select a supplementary uplink (SUL) carrier based on a SUL condition being met where the condition comprises: that the serving cell for SDT is configured with supplementary uplink; and that the RSRP of the downlink pathloss reference is less than RSRP threshold of SUL carrier (e.g., rsrp-ThresholdSSB-SUL). Based on the SUL condition not being met, the wireless device may select a normal uplink (NUL) carrier.

In an example, based on the selected uplink carrier, the wireless device may determine whether the radio resource for SDT is available. Based on determining that the radio resource for SDT being available, the wireless device may determine that the lower condition for initiating SDT are fulfilled. For example, the radio resource for SDT may be a configured grant (CG) configured for SDT or a random access resource configured for SDT. The wireless device may determine that the configured grant (CG) configured for SDT (e.g., CG SDT) is available, based on a CG condition being met where the CG condition comprises: that a configured grant (CG) configured for SDT (e.g., CG SDT) is configured on the selected uplink carrier; that timing advance (TA) of the configured grant (e.g., configured grant type 1 resource) is valid; and that at least one SSB configured for CG-SDT with SS-RSRP above a RSRP threshold for CG SDT (e.g., cg-SDT-RSRP-ThresholdSSB) is available. Based on the determining that the CG configured for SDT being available, the wireless device may perform a CG SDT procedure. For example, the wireless device may skip transmission of a RA preamble and reception of a RA response. The wireless device may transmit the first message for the SDT procedure, using the CG configured for the SDT procedure.

In an example, the TA may be a TA of initial CG-SDT transmission with CCCH message. the configured grant configured for the SDT may be a configured grant for an initial transmission of the SDT procedure. The initial transmission may comprise a transmission of CCCH message. The CCH message may comprise an RRC request message (e.g., an RRC resume request message).

In an example, the wireless device may determine/consider the TA of the configured grant configured for the SDT procedure to be valid when following conditions is fulfilled: compared to the stored downlink pathloss reference RSRP value, the current RSRP value of the downlink pathloss reference calculated has not increased/decreased by more than RSRP threshold for CG SDT (e.g., cg-SDT-RSRP-ChangeThreshold), (if configured); a TA timer for CG SDT (e.g., cg-SDT-TimeAlignmentTimer) is running. The wireless device may be configured (e.g., by the base station) with parameters for validation for CG SDT. The parameter may be RSRP threshold for CG SDT indicating a RSRP threshold for the increase/decrease of RSRP for time alignment validation. The wireless device may be configured with measurement object (e.g., measObject) for the serving cell where the UE receives configuration for CG SDT. Based on the measurement object, the wireless device may store the RSRP of the downlink pathloss reference derived based on the measObject configured for the serving cell.

In an example, the wireless device may determine that a set of random access resources to indicate RA SDT are available on the selected carrier. For example, the wireless device may check the availability of the set of random access resources if the configured grant (CG) configured for SDT (e.g., CG SDT) is not available. Based on determining that the set of random access resources being available, the wireless device may perform, using the set of the random access resource, a RA SDT procedure. For example, the wireless device may transmit a RA preamble configured for the SDT procedure. Based on receiving a RA response for the SDT procedure, the wireless device may transmit, using uplink grant/resource indicated by the RA response, the first message for the SDT procedure.

In an example, if the wireless device performs the RA SDT (e.g., RA SDT is selected) and after the Random Access procedure is successfully completed, the wireless device may monitor PDCCH addressed to C-RNTI until the RA SDT procedure is terminated. If the wireless device performs CG SDT (e.g., CG SDT is selected) and after the initial transmission for CG-SDT (e.g., transmission of the first message using the CG configured for SDT) is performed, the wireless device may monitor PDCCH addressed to C-RNTI and CS-RNTI until the CG-SDT procedure is terminated.

In an example, based on receiving the first message (e.g., Msg 3 or Msg A) for the SDT procedure, the base station may transmit a response (e.g., Msg 4 or Msg B). The response may comprise an RRC response message or may not comprise the RRC response message. Based on receiving the first message, the base station may determine whether the response comprises the RRC response message. The RRC response message may be a response to the RRC request message of the first message. The RRC response message may be an RRC resume message or an RRC setup message or an RRC release message or an RRC reject message. The RRC resume message or the RRC setup message may indicate to transition to an RRC connected state. The RRC release message may indicate to transition (back) to an RRC inactive state or an RRC idle state. The RRC reject message may indicate a reject of the RRC request message.

In an example, the first message for the SDT procedure may comprise assistance information for the SDT procedure. The assistance information may indicate whether the wireless device has data for subsequent transmission of the SDT procedure. The assistance information may be buffer status report (BSR) indicating amount of data in uplink buffer of the wireless device; or the release assistance information (RAI); and traffic information of the SDT data. For example, the assistance information may indicate at least one of: whether subsequent transmission of the SDT procedure is expected; whether single data/packet is expected; and whether multiple data/packet is expected.

In an example, based on the assistance information, the base station may determine whether a response comprises the RRC response message in response to receiving the first message. For example, based on the assistance information, the base station may determine to complete the SDT procedure. Based on the determining to complete the SDT procedure, the wireless device may transmit the response comprising the RRC response message in response to receiving the first message. For example, in response to receiving the first message, the base station may transmit to the wireless device a response (e.g., Msg 4 or Msg B) comprising an RRC release message in response to receiving the first message (e.g., Msg 3 or Msg A) comprising the RRC request message. The RRC release message may be a response to the RRC request message. Based on receiving the first message, the base station may determine to transition the wireless device to an RRC connected state. Based on the determining, the base station may transmit to the wireless device a response (e.g., Msg 4 or Msg B) comprising the RRC resume message or the RRC setup message in response to receiving the first message (e.g., Msg 3 or Msg A) comprising the RRC request message. Based on the determining, the base station may transmit to the wireless device an RRC release message in response to receiving the RRC request message of the first message.

In an example, based on the assistance information, the base station may determine to continue the SDT procedure (e.g., determines subsequent transmission of the SDT procedure of the wireless device or determine to allow the wireless device to perform the subsequent transmission). Based on the determining to continue the SDT procedure, the base station may transmit a response not comprising the RRC response message in response to receiving the first message. The response may indicate uplink grant for the subsequent transmission. The response may indicate the subsequent transmission (or allowance of the subsequent transmission). Based on receiving the response, the wireless device may continue to perform the SDT procedure (e.g., continue to monitor PDCCH). For example, based on receiving the first message (e.g., Msg 3 or Msg A) for the SDT procedure, the base station may transmit a response (e.g., Msg 4 or Msg B) not comprising an RRC response message. For example, based on receiving the first message (e.g., based receiving the assistance information of the first message), the base station may determine subsequent transmission of the SDT procedure of the wireless device (e.g., the base station may determine to allow the wireless device to perform subsequent transmission of the SDT procedure). Based on the determining, the base station may transmit to the wireless device the response not comprising the RRC response message in response to receiving the first message. For example, based on determining that there is subsequent transmission (e.g., multiple uplink/downlink transmission), the base station may determine the subsequent transmission of the SDT procedure of the wireless device. The wireless device may transmit to the base station, via the first message, assistance information of the SDT procedure. The subsequent transmission may comprise a subsequent reception.

In an example, based on the initiating the SDT procedure, the wireless device may start a timer T319*a* (e.g., a SDT timer SDT failure detection timer). For example, the wireless device may start the timer T319*a* with a T319*a* value (e.g., SDT failure detection timer value or SDT timer value). The wireless device may receive the T319*a* value from a base station. For example, the base station may transmit to the wireless device the T319*a* value via a dedicated message (e.g., an RRC release message) or a broadcast message (e.g., SIB). The base station may transmit via the SIB, the SDT common configuration (e.g., sdt-ConfigCommon) indicating the T319*a* value. While the T319*a* (e.g., the timer T319*a*) is running, the wireless device may perform the SDT procedure (e.g., transmit/receive SDT data in the RRC inactive state or the RRC idle state). During the SDT procedure, the T319*a* is running. Based on the T319*a* being expired, the wireless device may determine a failure of the SDT procedure. Based on the determining the failure, the wireless device may perform at least one of: completing the SDT procedure; releasing the SDT configuration; resetting MAC; flushing a uplink buffer; discarding data in the uplink buffer; and transition to an RRC idle state.

In an example, the SDT data may indicate data allowed to transmit/receive via/during the SDT procedure. The SDT procedure may comprise an initial transmission of the SDT procedure and the subsequent transmission of the SDT procedure. The wireless device in an RRC inactive state or an RRC idle state may transmit a base station the SDT data via/during the SDT procedure. The base station may transmit to the wireless device in an RRC inactive state or an RRC idle state the SDT data via/during the SDT procedure. The wireless device in an RRC connected state may transmit to a base station non-SDT data. The base station may transmit the non-SDT data to the wireless device in the RRC connected state.

In an example, the SDT data may be data of the radio bearer configured to the SDT procedure. The radio bearer may be a data radio bearer (DRB) or a signalling radio bearer (SRB). For example, the SDT data may comprise least one of: user plane data; and a signaling (or a signaling message). The user plane data may be a user plane data of the DRB configured to the SDT procedure. The signaling may be a signaling of the SRB configured to the SDT procedure (e.g., SRB2). For example, The SDT data may be a signaling of a SRB allowed to the SDT procedure (e.g., SRB). The SDT data may be a signaling allowed to be transmitted via/during the SDT procedure. For example, the signaling of the SDT data (or the signalling allowed to be transmitted via/during the SDT procedure) may be an RRC message. For example, the RRC message may be an uplink information transfer message (UL information transfer message) to transfer NAS dedicated information (e.g., an NAS message or a NAS signaling or a NAS PDU); or an UE assistance information. The UE assistance information may indicate availability of non-SDT data (e.g., data mapped to radio bearers which are not configured for SDT). The signaling of the SDT data (or the signalling allowed to be transmitted via/during the SDT procedure) may be a NAS message (e.g., a NAS signaling or a NAS PDU). The NAS message may be associated with a NAS procedure. For example, the NAS procedure may comprise a NAS procedure for at least one of: sending mobile originated SMS over NAS; sending a mobile originated location request; and sending a mobile originated signaling transaction towards the PCF to request V2X policy.

In an example, the non-SDT data may be data of the radio bearer not configured to the SDT procedure. The non-SDT data may be a signaling (e.g., an RRC message or a NAS message) not allowed to be transmitted via/during the SDT procedure.

Figure 21:
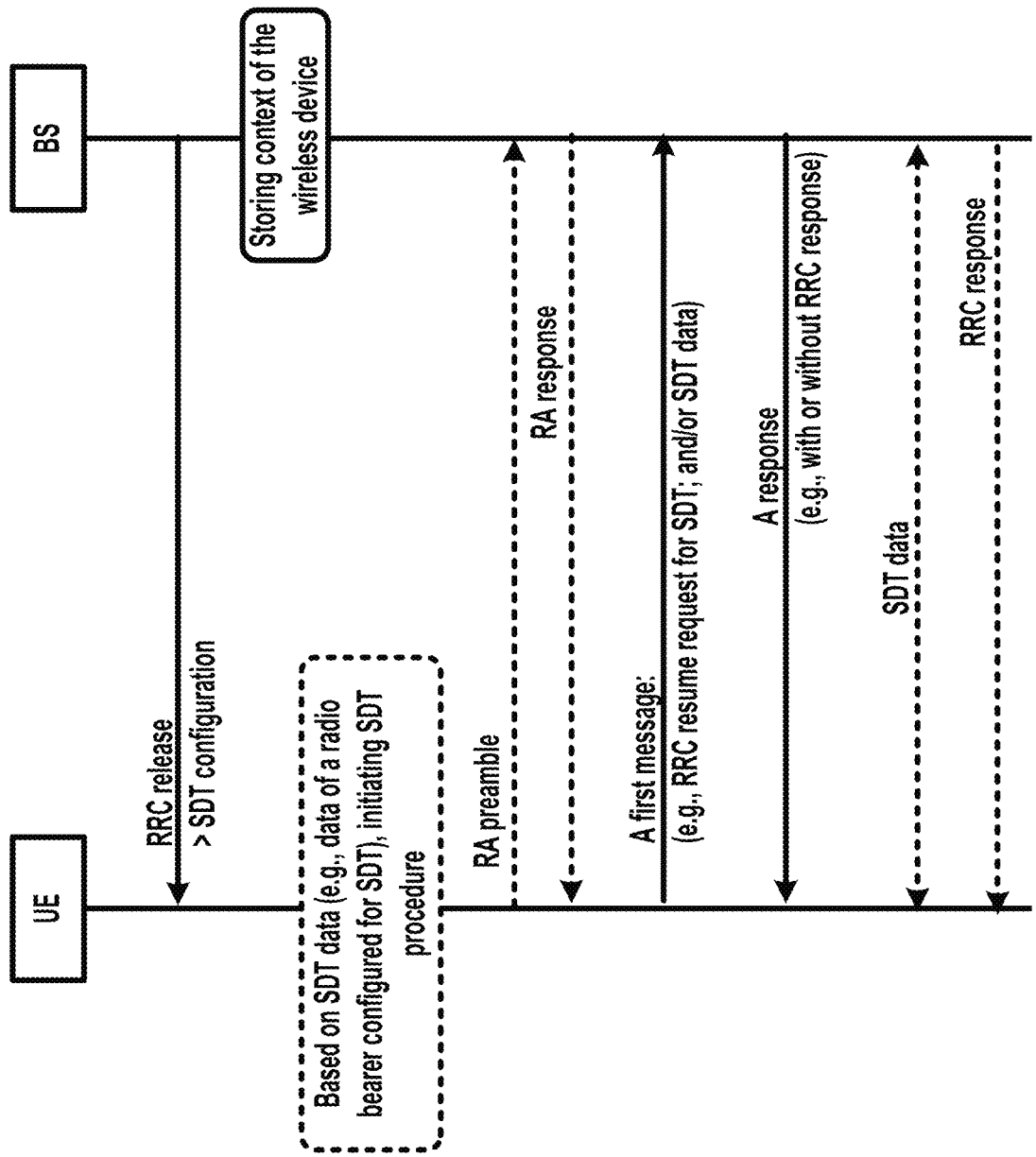
FIG. 21 illustrates an example of a SDT procedure in a base station.

FIG. 21 illustrates an example of a SDT procedure in a base station. A base station may transmit to a wireless device an RRC release message. The RRC release message may comprise a configuration for a SDT procedure (e.g., a SDT configuration). The configuration may indicate one or more bearers configured to a SDT procedure. The RRC release message may comprise a suspend configuration. For example, the suspend configuration may comprise the SDT configuration. The SDT configuration may comprise configured grant (CG) configuration for CG SDT procedure. The CG configuration may be referred to as SDT-MAC-PHY-CG configuration.

In an example of FIG. 21, based on receiving the RRC release message, the wireless device may suspend all bearers including the one or more bearers and transition to an RRC inactive state (or an RRC idle state). Based on transmitting the RRC release message, the base station may store a context of the wireless device. The context may comprise the SDT configuration. The wireless device in the RRC inactive may initiate the SDT procedure on/via a cell of the base station. Based on the one or more conditions for the SDT procedure being fulfilled, the wireless device may initiate the SDT procedure. Based on initiating the SDT procedure, the wireless device may resume the radio bearers configured for the SDT procedure while keeping suspending a radio bearer not configured for the SDT procedure. The wireless device may transmit the first message for the SDT procedure where the first message may be Msg3 or MsgA.

The wireless device may transmit the first message using configured grant (CG) for the SDT procedure or a uplink grant indicated by a random access (RA) response. The wireless device may transmit a RA preamble. Based on transmitting the RA preamble, the wireless device may receive the RA response indicating the uplink grant. The RA response is a response to the RA preamble.

In an example of FIG. 21, in response to receiving the first message, the base station may identify the wireless device and verify the wireless device based on the context stored in the base station. For example, the base station may identify, using the context of the wireless device, the wireless device based on a wireless device identity (e.g., I-RNTI or resume identity or UE identity) of the RRC request message. The base station may verify, using the context of the wireless device, the wireless device based on a security parameter (e.g., MAC-I or short MAC-I) of the RRC request message. Based on successfully identifying and verifying the wireless device, the base station may transmit a response (e.g., Msg 4 or Msg B). The response is a response to the first message.

In an example of FIG. 21, based on receiving the first message, the base station may transmit to the wireless device the response (e.g., Msg 4 or Msg B). The response may comprise a RRC response message or may not comprise the RRC response message. For example, the base station may transmit the RRC response message (e.g., via the response) based on determining to complete the SDT procedure. The RRC response message may be an RRC resume message or an RRC setup message or an RRC release message or an RRC reject message. The RRC resume message or the RRC setup message may indicate to transition to an RRC connected state. The RRC release message may indicate to transition (back) to an RRC inactive state or an RRC idle state. The RRC reject message may indicate a reject of the RRC request message.

In an example of FIG. 21, based on receiving the first message, the base station may transmit to the wireless device the response not comprising the RRC response message. The response may indicate uplink grant for the subsequent transmission of the SDT procedure. For example, based on determine to continue the SDT procedure (e.g., determine subsequent transmission of the SDT procedure or allow the wireless device to perform subsequent transmission of the SDT procedure), the base station may transmit the wireless device the response not comprising the RRC response message. The subsequent transmission may comprise a subsequent reception. Based on receiving the response, the wireless device may transmit, using the uplink grant, subsequent uplink data associated with the SDT procedure. During the subsequent transmission of the SDT procedure, the base station may determine to complete the SDT procedure. The base station may transmit an RRC response message (e.g., an RRC release message) to the wireless device.

In an example, for SDT procedure over RACH, if the wireless device accesses a base station (e.g., gNB) other than the last serving base station (e.g., anchor base station), the UL SDT data/signalling may be buffered at the receiving base station (e.g., target base station or new base station or current serving base station), and then the receiving base station may trigger the retrieve UE context procedure. The receiving base station may indicate SDT to the last serving base station and the last serving base station may decides whether to relocate the context of the wireless device (e.g., UE context) or not. Other SDT assistance information (i.e., single packet, multiple packets) may also be provided by the receiving base station to help the decision.

In an example, if the last serving base station decides not to relocate the UE context, it may transfer at least a partial UE context containing SDT RLC context information necessary for the receiving base station to handle SDT. Then, UL/DL tunnels may be established for DRBs configured for SDT between the receiving base station and the last serving base station and PDCP PDU of UL/DL data may be transferred over the tunnels, until the last serving base station decides to terminate the SDT session and move the UE back to RRC inactive by sending RRC release message. During the SDT session, the receiving base station may also request to terminate the SDT session to the last serving base station.

In an example, if the last serving base station decides not to relocate the UE context, in case SDT is used for signalling, SRB PDCP PDUs may be transferred between the receiving base station and the last serving base station via the RRC transfer procedure.

In an example, when the receiving base station receives DL data or DL signalling over radio bearer(s) not enabled for SDT from the core network and the UE context has been relocated to the receiving base station, the receiving base station may send the wireless device to RRC connected state by directly sending the RRC resume message.

In an example, when the last serving base station receives DL data or DL signalling over radio bearer(s) not enabled for SDT from the core network and it has decided to not relocate the UE context, it may send the wireless device back to RRC inactive by sending the RRC release message.

Figure 22:
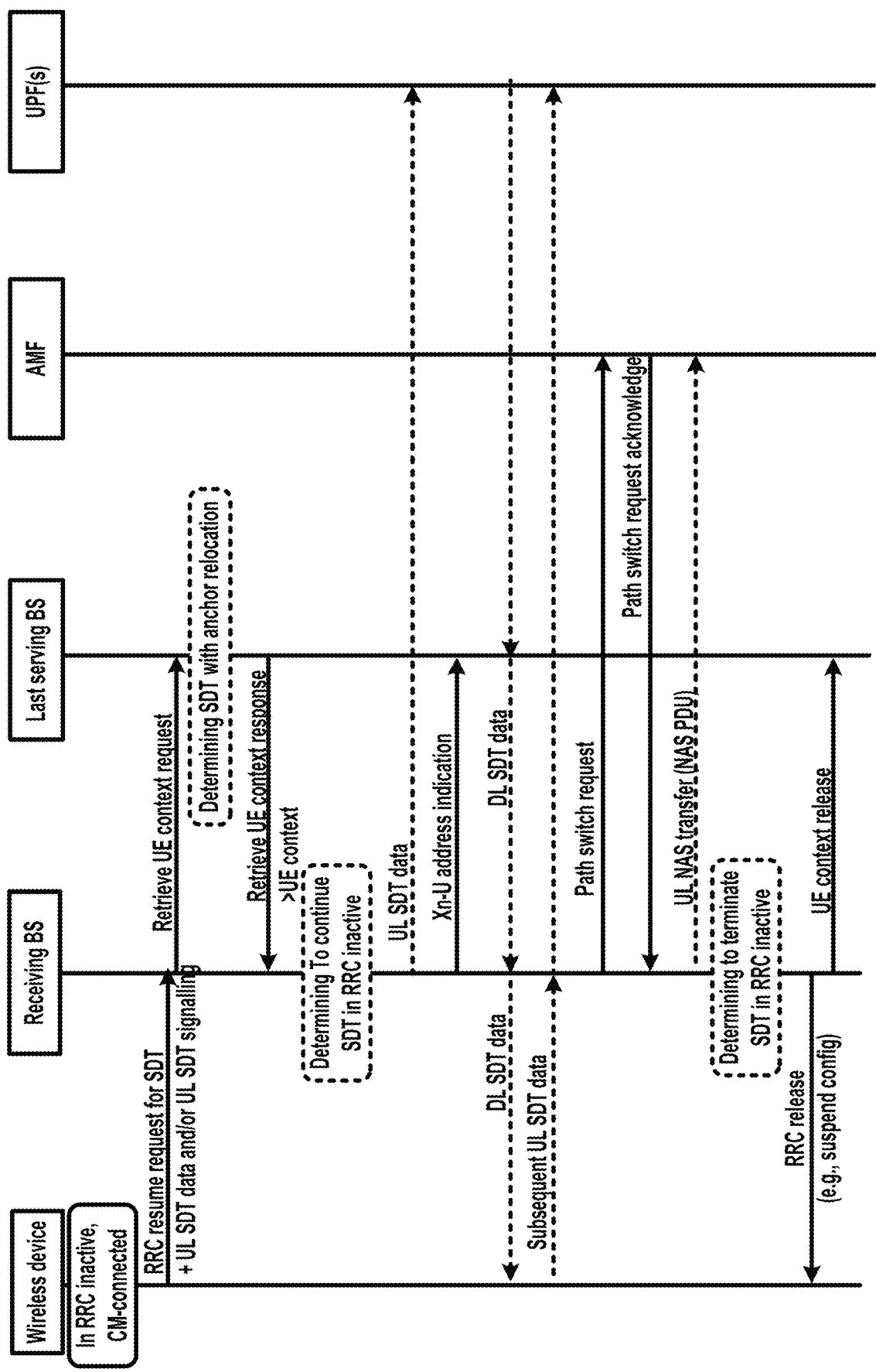
FIG. 22 illustrates an example of a SDT procedure in multiple base stations.

FIG. 22 illustrates an example of a SDT procedure with UE context relocation. A wireless device may send an RRC resume request as well as UL SDT data and/or UL SDT signalling to a receiving base station. The receiving base station may identify a last serving base station using the I-RNTI and may retrieve the UE context by means of the retrieve UE context procedure. The receiving base station may indicate that the wireless device request is for an SDT transaction and may also provide SDT assistance information (e.g., single packet, multiple packets).

In an example of FIG. 22, the last serving base station may decide to relocate UE context for SDT and respond with the retrieve UE context response message. The UL SDT data, if any, may be delivered to the UPF.

In an example of FIG. 22, the receiving base station may decide to keep the wireless device in RRC inactive state for SDT. If loss of DL user data buffered in the last serving base station may be prevented, the receiving base station may provide forwarding addresses. The receiving base station may initiate a path switch procedure to establish a NG UE associated signalling connection to a serving AMF. After path switch, the UL NAS PDU may be delivered to AMF.

In an example of FIG. 22, after the SDT transmission is completed, the receiving base station may generate and send a RRC release message including the suspend indication to the wireless device to send the wireless device back to RRC inactive state. For example, in case DL non-SDT data or DL non-SDT signalling arrives, the receiving base station may decide to directly send the wireless device to RRC connected state by sending RRC resume message.

In an example of FIG. 22, the receiving base station may indicate the last serving base station to remove the UE context by sending the UE context release message. The UE context release message may be sent after the path switch being completed (e.g., after the receiving base station receives a path switching request acknowledge from the serving AMF).

Figure 23:
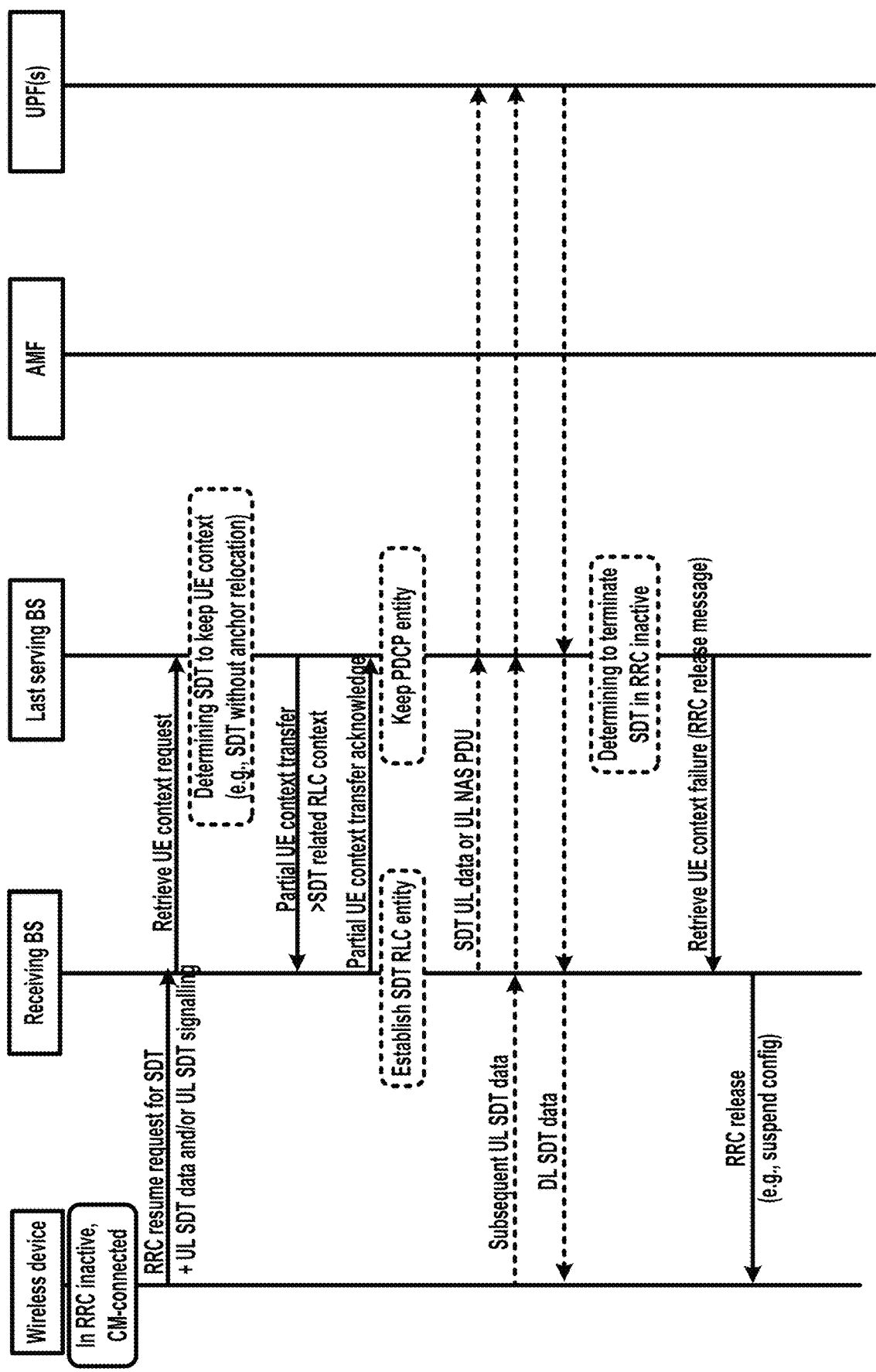
FIG. 23 illustrates an example of transmission of an RRC message during SDT procedure without anchor relocation.

FIG. 23 illustrates an example of a SDT procedure without UE context relocation. A wireless device may send an RRC resume request as well as UL SDT data and/or UL SDT signalling to a receiving base station. The receiving base station may identify a last serving base station using the I-RNTI and may retrieve the UE context by means of the retrieve UE context procedure. The receiving base station may indicate that the wireless device request is for an SDT transaction and may also provide SDT assistance information (e.g., single packet, multiple packets).

In an example of FIG. 23, the last serving base station may decide not to relocate the UE context for SDT. The last serving base station may transfer a partial UE context including the SDT related RLC context. The receiving base station may acknowledges receiving the partial UE context and provide associated DL TNL address. After the partial UE context retrieval procedure, the UE context may be kept at the last serving base station and the SDT related RLC context may be established at the receiving base station, then the UL SDT data may be delivered to the UPF, the UL NAS PDU may be delivered to AMF. The DL signalling from the last serving base station may be forwarded to the receiving base station via the RRC transfer message, for which the receiving base station delivers to the wireless device.

In an example of FIG. 23, after SDT transmission is completed, the last serving base station may respond to the receiving base station with the retrieve UE context failure message including an encapsulated RRC release message. The RRC release message may include suspend configuration. The receiving base station may send to the last serving base station the retrieve UE context confirm message to request the termination of SDT session. For example, in response to receiving the retrieve UE context confirm message, the last serving base station may respond to the receiving base station with the retrieve UE context failure message. For example, in case DL non-SDT data or DL non-SDT signalling arrives, the last serving base station may move the wireless device back to RRC inactive by sending RRC release message. In the case DL non-SDT data or DL non-SDT signalling arrives, the last serving base station may send to the receiving base station with the retrieve UE context failure message.

In an example of FIG. 23, based on receiving the retrieve UE context failure message, the receiving base station may send the RRC Release message to the wireless device. The wireless device may move to RRC inactive state.

In an example, a second base station (a last serving base station or an anchor base station) may transmit to a wireless device an RRC release message. The RRC release message may comprise a configuration for a SDT procedure (e.g., a SDT configuration). The configuration may indicate a radio bearer configured to the SDT procedure.

Based on the RRC release message, the wireless device may suspend the radio bearer configured for the SDT procedure and a radio bearer not configured for the SDT procedure and transition to an RRC inactive state (or an RRC idle state). The second base station may store a context of the wireless device. The context may comprise the configuration for the SDT procedure.

In an example, the wireless device in the RRC inactive state may (re)select a cell. The cell may be a cell of a first base station (a target base station or a current serving base station or a receiving base station). The wireless device in the RRC inactive state may has data where the data is associated with a bearer of the one or more bearers. Based on the data being associated with the bearer of the one or more bearers configured to the SDT procedure, the wireless device may determine to initiate the SDT procedure. Based on the initiating the SDT procedure, the wireless device may resume the one or more bearers configured to the SDT procedure while keeping suspending other bearers not configured to the SDT procedure. The wireless device may transmit to the first base station a first message for the SDT procedure where the first message may be Msg3 or MsgA.

In an example, the first base station doesn't have the context of the wireless device. Based on receiving the first message, the first base station may transmit a retrieve UE context request message to the second base station.

The retrieve UE context request message may comprise a content of the RRC request message. The content may comprise at least one of: a wireless device identity (UE identity or resume identity or I-RNTI), a security parameter (e.g., MAC-I or short MAC-I) and a cause value. Based on the retrieve UE context request message, the second base station may identify the wireless device based on the wireless device identity (UE identity). The second base station may verify the wireless device based on the security parameter (e.g., MAC-I or short MAC-I). Based on successfully identifying and verifying the wireless device, the second base station may transmit a response to the first base station.

In an example, the wireless device may transmit to a first base station (target base station or current serving base station) the first message for the SDT procedure. The first base station may determine to (re)locate a second base station (last serving base station or anchor base station) using a wireless device identity (UE identity or resume identity or I-RNTI). The first base station may retrieve a context of the wireless device via a first Xn (Xn-AP) procedure (retrieve UE context request procedure). (e.g., based on a SDT indicator), the first base station may indicate that the wireless device requested for a SDT procedure (or requested to initiate the SDT procedure). The first base station may provide assistance information for the SDT procedure (SDT assistance information) to the second base station. For example, the first base station may transmit to the second base station a retrieve UE context request message comprising a SDT support request information element (IE). The SDT support request IE may comprise a SDT indicator. The SDT support IE may further comprise the SDT assistance information. Based on the SDT support IE (or the SDT indicator), the second base station may consider that the wireless device requested for a SDT procedure.

In an example, based on the retrieve UE context request message, the second base station may determine whether to allocate the context of the wireless device to the first base station (e.g., whether performing anchor relocation). Based on determining anchor relocation shown in the case I of FIG. 22, the second base station may transmit to the first base station a retrieve UE context response message as the response. The retrieve UE context response message may comprise the context of the wireless device. The context is all context stored in the second base station. Based on receiving the retrieve UE context response message, the first base station may communicate with the wireless device (e.g., using the SDT procedure).

In an example, based on determining non-anchor relocation shown in the FIG. 23, the second base station may transmit to the first base station a partial UE context retrieve transfer message as the response. The partial UE context retrieve transfer may comprise a partial context of the wireless device. The partial context is for the SDT procedure. The partial context may be SDT related RLC context of the wireless device. For example, the partial context for the SDT procedure may comprise a lower layer configuration of the wireless device. The lower layer configuration may be a RLC configuration. Based on determining non-anchor relocation, the second base station may keep an upper layer configuration of the wireless device. The upper layer configuration may be an RRC configuration and/or a PDCP configuration. Based on receiving the partial UE context retrieve transfer message, the first base station may perform the SDT procedure (e.g., delivering data of the wireless device to the wireless device and the second base station).

In an example, as shown in FIG. 23, the lower layer/entity (e.g., RLC layer, MAC layer, physical layer) of the wireless device may be implemented/located in the first base station while the upper layer/entity (e.g., RRC layer, PDCP layer, SDAP layer) be implemented/located in the second base station. The first base station may perform a procedure for the lower layer while the second base station may perform a procedure for the upper layer. For example, based on receiving uplink data/signal from the wireless device or receiving downlink data/signal from the second base station, the first base station may process the uplink data/signal and/or the downlink data/signal with the lower layer configuration. Based on receiving uplink data/signal from the first base station or receiving downlink data/signal from a core network entity (e.g., AMF or UPF), the second base station may process the uplink data/signal and/or the downlink data/signal with the upper layer configuration. For example, based on uplink data from the wireless device, the first base station may submit a RLC PDU of the uplink data and transmit the RLC PDU to the second base station. The second base station may process the RLC PDU with the upper layer configuration. Based on the processing, the second base station may transmit a PDCP PDU of the uplink data or SDAP PDU of the uplink data to the core network entity. For example, based on downlink data from the core network entity, the second base station may submit a PDCP PDU of the downlink data and transmit the PDCP PDU to the first base station. The first base station may process the PDCP PDU with the lower layer configuration. Based on the processing, the first base station may transmit MAC PDU (via physical channel) to the wireless device.

In an example of FIG. 21, FIG. 22 and FIG. 23, the wireless device may transmit the first message for the SDT procedure to the base station (e.g., the second base station in FIG. 22). The base station may comprise a base station central unit (CU) and at least one base station distributed unit (DU). The base station central unit may further comprise a base station central unit control plane (CU-CP) and a base station central unit user plane (CU-UP). Based on receiving the first message, the base station distributed unit may transmit to the base station central unit (or base station central unit control plane) an initial uplink RRC transfer message comprising the RRC resume request message in the first message. The initial uplink RRC transfer message may further comprise information for the SDT procedure. The information may comprise at least one of: SDT indicator and SDT assistance information. The SDT assistance information may comprise at least one of: BSR, release assistance information (RAI) and traffic pattern of the SDT procedure. The base station distributed unit may receive the information via the first message from the wireless device. Based on receiving the information, the base station central unit may consider that the wireless device is accessing for the SDT procedure (or the wireless device requested the SDT procedure). The base station central unit may use the information for retrieving a context of the wireless device (e.g., via a retrieve UE context request procedure with the second base station in FIG. 22).

In an example of FIG. 21, FIG. 22 and FIG. 23, the base station central unit control plane (CU-CP) may transmit to the base station central unit user plane (CU-UP) a request to resume bearer configured to the SDT procedure. For example, the base station central unit control plane (CU-CP) may transmit a bearer context setup request message to the base station central unit user plane (CU-UP). The bearer context setup request message may comprise a bearer context status change information element (IE). The bearer context status change information element may indicate to resume bearer configured to the SDT procedure. Based on the request or the bearer context status change information, the base station central unit user plane (CU-UP) may resume the bearer configured to the SDT procedure while keeping other one or more bearers being suspended. The other one or more bearers are not configured to the SDT procedure. For example, based on receiving the initial uplink transfer message and determining to initiate the SDT procedure, the base station central unit control plane (CU-CP) may transmit to the base station central unit user plane (CU-UP) the request or the bearer context status change.

In an example, a base station central unit (e.g., gNB-CU) is a logical node hosting RRC, SDAP and PDCP protocols of gNB or RRC and PDCP protocols of the en-gNB that controls the operation of one or more a base station distributed units (e.g., gNB-DUs). The base station central unit terminates the F1 interface connected with the base station distributed unit. A base station distributed unit (e.g., gNB-DU): a logical node hosting RLC, MAC and PHY layers of the gNB or en-gNB, and its operation is partly controlled by a base station central unit (e.g., gNB-CU). One base station distributed unit supports one or multiple cells. One cell may be supported by one base station distributed unit. The base station distributed unit terminates the F1 interface connected with the base station central unit.

In an example, a base station central unit control plane (e.g., CU-CP or gNB-CU-CP) is a logical node hosting the RRC and the control plane part of the PDCP protocol of the base station central unit (e.g., for an en-gNB or a gNB). The base station central unit control plane terminates the E1 interface connected with the base station central unit control plane and the F1-C interface connected with the base station distributed unit. A base station central unit user plane (e.g., CU-UP or gNB-CU-UP): a logical node hosting the user plane part of the PDCP protocol of the base station central unit (e.g., for an en-gNB), and the user plane part of the PDCP protocol and the SDAP protocol of the base station central unit (e.g., for a gNB). The base station central unit user plane terminates the E1 interface connected with the base station central unit control plane and the F1-U interface connected with the base station distributed unit.

In an example, an PDCP layer/entity may is capable of performing integrity protection and ciphering of a PDCP SDU. The PDCP SDU may comprise an RRC message. The RRC message may need to be integrity protected and/or ciphered. Based on receiving the RRC message not integrity protected, a wireless device may determine an integrity protection failure. Based on the determining, the wireless device may not continue communication with a base station. Based on the determining, the wireless device may discard the RRC message and data which received from the base station and/or pending in uplink buffer. Based on the determining, the wireless device may not perform an action indicated by the RRC message. Based on the determining, the wireless device may transition to an RRC idle state.

In an example, a PDCP layer of a base station may perform integrity protection of a PDCP data SDU based security parameters (e.g., security keys and integrity protection algorithm) for a wireless device. Based on the integrity protection, the PDCP layer may generate integrity protected PDCP data PDU from the PDCP data SDU. (The PDCP layer of) the base station may transmit the PDCP data PDU to a wireless device. Based on the PDCP data PDU, the wireless device may perform integrity verification of the PDCP data PDU based the security parameters. Based on successful integrity verification of the PDCP data PDU, the wireless device may authenticate the base station. Based on the authenticating, the wireless device may continue to communicate with the base station.

Figure 24:
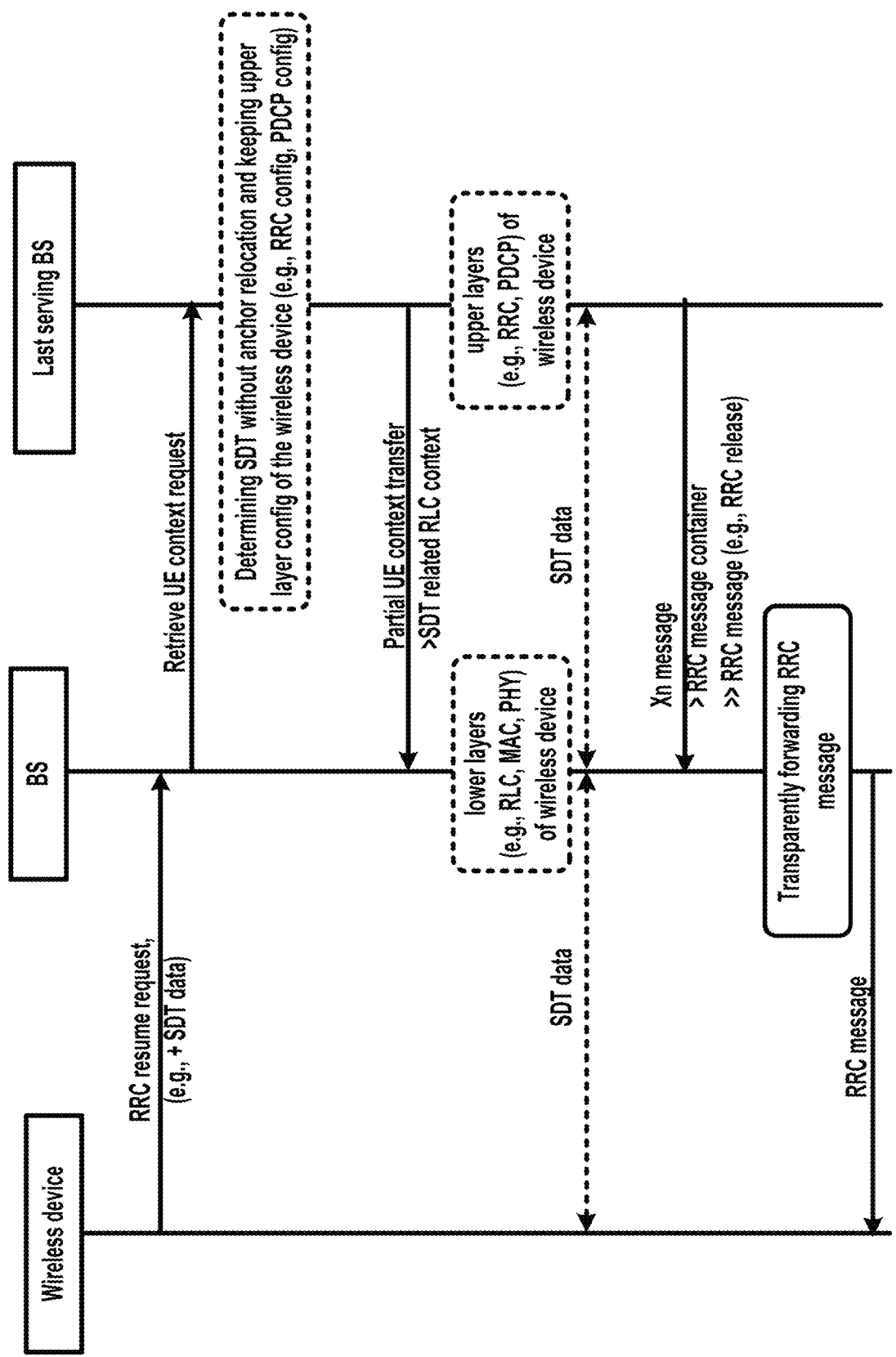
FIG. 24 illustrates an example of transmission of an RRC message during SDT procedure without anchor relocation.

FIG. 24 illustrates an example of transmission of an RRC message during SDT procedure without anchor relocation. A wireless device may initiate the SDT procedure. Based on the initiating, the wireless device may transmit to a base station (e.g., a first base station) a first message for the SDT procedure. The first message may comprise at least one of: an RRC resume request message and SDT data. As shown in FIG. 23, based on receiving the first message, the base station may transmit to a second base station a request to initiate the SDT procedure for the wireless device. The base station may transmit the request via a retrieve UE context request message. As shown in the FIG. 23, the second base station may transmit to the base station a response indicating SDT procedure without anchor relocation. The response may indicate that the second base station initiate the SDT procedure with the wireless device via the base station. The response may comprise a part of a context of the wireless device. The part may comprise a RLC configuration for the SDT procedure.

In an example of FIG. 24, in the case of the SDT procedure without anchor relocation, an RRC layer/entity and a PDCP layer/entity of the wireless device may be located/implemented/configured in the second base station (e.g., a last serving base station or an anchor base station) not in the base station. The RRC message of the wireless device may be transparent to the base station. The second base station transmitting the RRC message may transmit a Xn AP message comprising a RRC message container where the RRC message container comprises the RRC message. The RRC message container is transparent to the base station. Based on receiving the RRC message from the second base station, the base station may forward transparently the RRC message in the RRC message container to the wireless device as shown in FIG. 23. an RLC layer/entity, a MAC layer/entity and a physical layer/entity of the wireless device may be located/implemented/configured in the base station not in the second base station.

In an example of FIG. 24, the PDCP layer/entity of the wireless device may be located/implemented/configured in the second base station (e.g., a last serving base station or an anchor base station) not in the base station. An RRC message of the wireless device may be integrity protected and/or ciphered by the PDCP layer in the second base station. Based on receiving the RRC message integrity protected and/or ciphered, the wireless device may not discard the RRC message, perform action indicated by the RRC message and/or continue communicate with the base station. Based on receiving the RRC message not integrity protected, the wireless device may discard the RRC message, not perform action indicated by the RRC message and/or not continue communicate with the base station.

In an example of FIG. 24, the base station may not have the PDCP layer/configuration for the RRC message wherein the upper configuration may comprise security parameters (e.g., for integrity protecting of the RRC message or ciphering the RRC message). The second base station may transmit to the wireless device via the base station the RRC message integrity protected or ciphered based on the security parameters. Based on the base station may forward the RRC message to the wireless device without identifying a type/content of the RRC message.

In an example of FIG. 24, the base station may not identify a type of the RRC message and a content of the RRC message. The base station may not modify the RRC message and the content of the RRC message. The base station may not include a new content of the RRC message.

Figure 25:
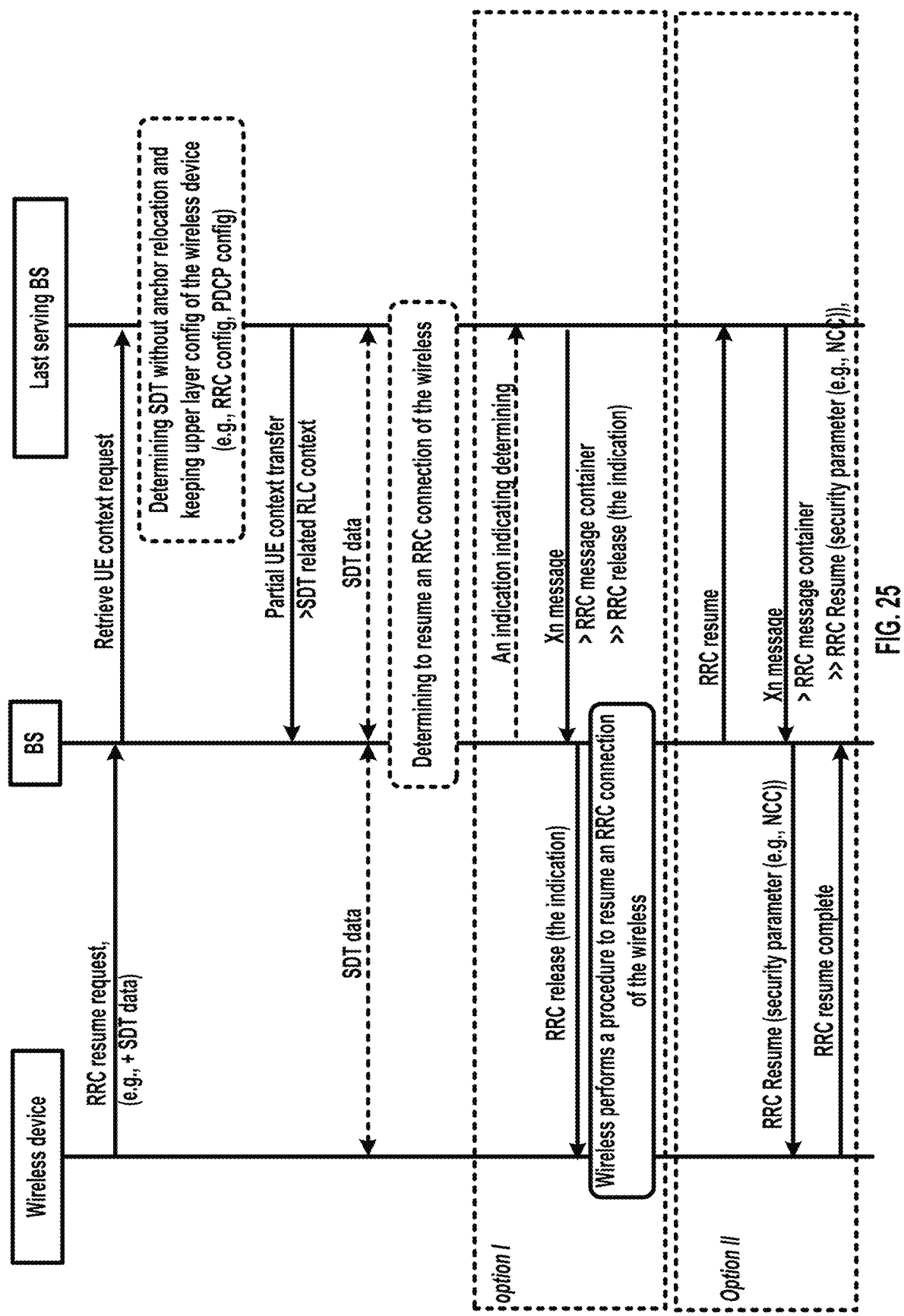
FIG. 25 illustrates an example of an RRC connection resume during SDT procedure without anchor relocation.

FIG. 25 illustrates an example of an RRC connection resume during SDT procedure without anchor relocation. During a SDT procedure without anchor relocation, a base station (a first base station or a current serving base station) or a second base station (e.g., a last serving base station or an anchor base station) may determine to establish/resume an RRC connection of the wireless device (determine to transition the wireless device to an RRC connected state). For example, based on the determining, the base station may transmit an indication indicating the determining. Based on the indication, the second base station may determine to transition the wireless device to an RRC connected state (or determine to establish/resume an RRC connection of the wireless device).

In an example of FIG. 25, in existing technologies, there are two options for establishing/resuming an RRC connection during a SDT procedure without anchor relocation (transitioning to an RRC connected state during a SDT procedure without anchor relocation). For a first option (option I), the second base station may transmit an RRC release message to the wireless device via the base station. The second base station may transmit to the base station a Xn AP message comprising an RRC message container where the RRC message container comprises the RRC release message. Based on receiving the Xn AP message, the base station may transparently forward the RRC release message to the wireless device. The base station may not identify a type of the RRC release message and a content of the RRC release message. The base station may not modify the RRC release message and the content of the RRC release message. The base station may not include a new content of the RRC release message. Based on receiving the RRC release message, the wireless device may transition to an RRC inactive state or an RRC idle state. For example, the RRC release message may comprise a suspend configuration. Based on the suspend configuration, the wireless device may transition to the RRC inactive. Based on the transitioning to the RRC inactive state or the RRC idle state, the wireless device may initiate a procedure to establish/resume an RRC connection. For example, the RRC release message may comprise an indication to resume/establish an RRC connection (or to transition to an RRC connected state). Based on the indication, the wireless device may initiate a procedure to resume/establish an RRC connection. The procedure may be an RRC connection resume/establishment procedure. Based on the initiating, the wireless device may perform a unified access control (UAC) procedure for access barring check of an access category associated with an access attempt triggered by the procedure. Based on the UAC procedure, the wireless device may determine that the access attempt is allowed. Based on the determining, the wireless device may perform a RACH procedure. The wireless device may transmit a RA preamble. The wireless device may receive a RA response indicating uplink resource/grant. The wireless device may transmit a RRC resume/setup request message for the procedure using the uplink resource/grant.

In an example of FIG. 25, for a second option (option II), the base station may determine to establish/resume an RRC connection of the wireless device (determine to transition the wireless device to an RRC connected state). For example, the base station may determine to establish/resume an RRC connection of the wireless device (determine to transition the wireless device to an RRC connected state) based on a message from the second base station or by itself (e.g., based on assistance information for the SDT procedure). Based on the determining, the base station may generate an RRC resume message. For example, the RRC resume message may generated based on default RRC configuration which is not a RRC configuration of the wireless device. The base station may not apply a PDCP function/operation to the RRC resume message. The base station may transmit to the second base station the RRC resume message as PDCP SDU. Based on receiving the RRC resume message, the second base station may include a parameter for the wireless device in the RRC resume message. The parameter may be a security parameter (e.g., NCC). Based on receiving the RRC resume message, the second base station may apply a PDCP function/operation to the RRC resume message. The PDCP function/operation may be integrity protection and/or ciphering. Based on the applying, the second base station may generate PDCP PDU of the RRC resume message and transmit to the base station a Xn message comprising an RRC message container where the RRC message container comprises the RRC resume message. Based on receiving the Xn message, the base station may transparently forward the RRC resume message to the wireless device. Based on receiving the RRC resume message, the wireless device may perform a reconfiguration for applying the security parameter (e.g., NCC). The reconfiguration may comprise PDCP reestablishment, release and add of a RLC bearer, and flushing buffer (e.g., L2 buffer). Based on the security parameter, the wireless device may derive new key for security. The wireless device may configure/apply the new key to transmission/reception. For example, the wireless device may transmit an RRC resume complete message as a response to the RRC resume message where the RRC resume complete message is integrity protected and/or ciphered using the new key. The base station may derive a new key based on the security parameter (e.g., NCC). Based on receiving the RRC resume complete message, the base station may perform integrity check and de-ciphering for the RRC resume complete message. The second option may require a lot of changes in the existing technologies which provides impacts on the wireless device, the base station and the second base station. The second option is not implemented on the existing system due to the complexity and the impacts. The method (e.g., shown in the option II of FIG. 25) to transmit an RRC resume message to the wireless device is not selected due to complexity and impacts on the base stations and the wireless device.

Figure 26:
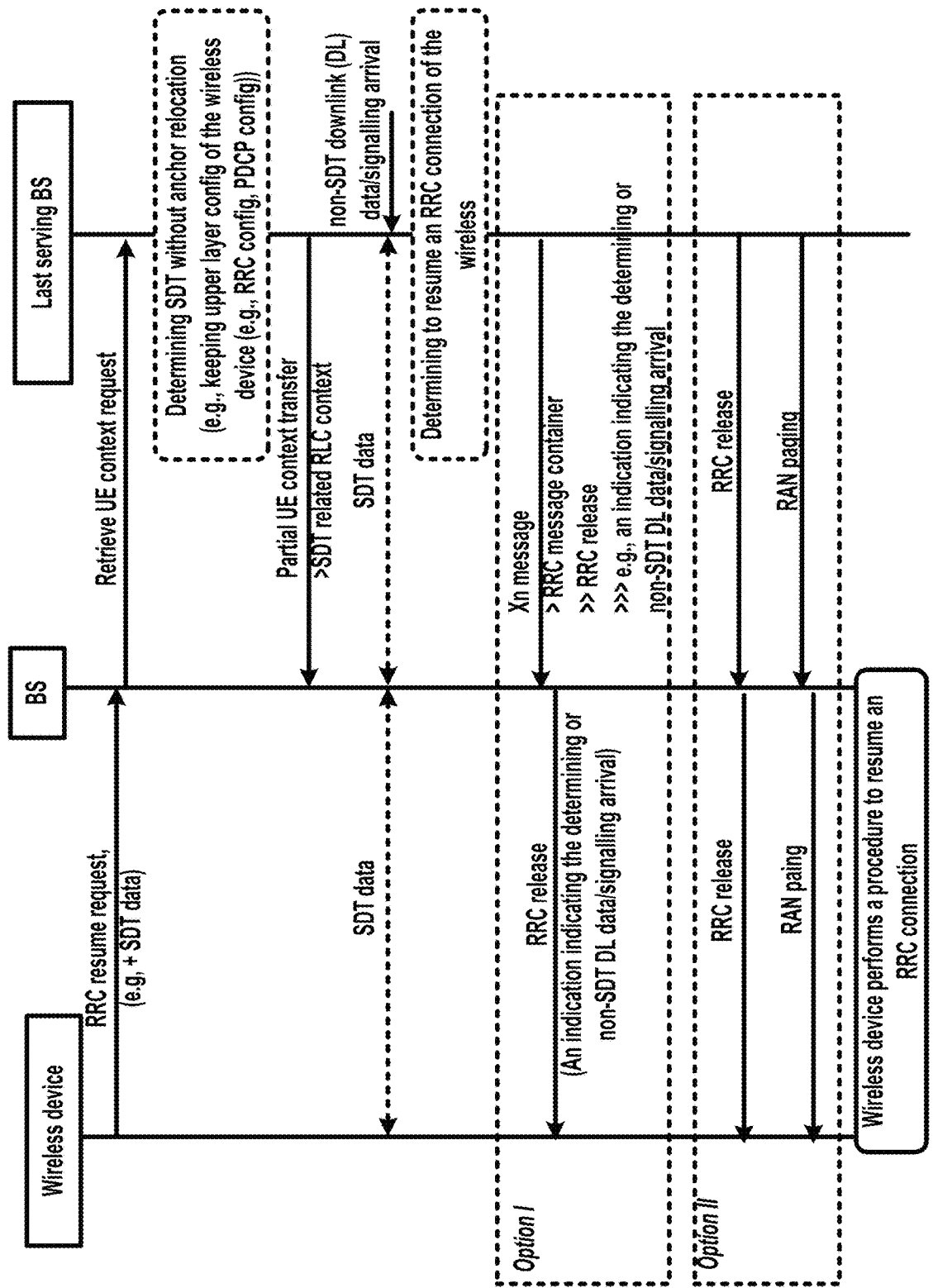
FIG. 26 illustrates an example of non-SDT downlink data during SDT procedure without anchor relocation.

FIG. 26 illustrates an example of non-SDT downlink data during SDT procedure without anchor relocation. A wireless device may perform a SDT procedure without anchor relocation. The SDT procedure without anchor relocation may be a SDT procedure with a second base station (e.g., a last serving base station or an anchor base station) via a base station (a first base station or a current serving base station). During the SDT procedure without anchor relocation, a second base station (e.g., a last serving base station or an anchor base station) may determine to establish/resume an RRC connection of the wireless device (determine to transition the wireless device to an RRC connected state) based on non-SDT downlink data arrival or signalling arrival. The non-SDT downlink data may be downlink data of a bearer not configured to the SDT procedure of the wireless device. The signalling may be a NAS message/signalling. The second base station may determine the NAS message as non-SDT data. For example, the second base station may determine the NAS message as non-SDT data based on that the NAS message is not associated with SRB configured to the SDT procedure of the wireless device. The SRB may be SRB 1 or SRB 2.

FIG. 26 also illustrates two options in existing technologies for establishing/resuming an RRC connection during a SDT procedure without anchor relocation (transitioning to an RRC connected state during a SDT procedure without anchor relocation) based on the non-SDT downlink data arrival.

In an example of the first option (option I) of FIG. 26, based on non-SDT downlink data arrival or signalling arrival, the second base station may transmit an RRC release message to the wireless device via the base station (a first base station or a current serving base station). The RRC release message may indicate at least one of: the determining to establish/resume an RRC connection of the wireless device; and non-SDT downlink data arrival. For example, the RRC release message may comprise an indication to resume an RRC connection or an indication of non-SDT data/signalling arrival. The second base station may transmit to the base station a Xn message comprising an RRC message container where the RRC message container comprises the RRC release message. Based on receiving the Xn message, the base station may transparently forward the RRC release message to the wireless device. Based on receiving the RRC release message, the wireless device may transition to an RRC idle state or an RRC idle state. Based on the RRC release message, the wireless device may initiate a procedure to resume/establish the RRC connection. For example, based on the indication of the RRC release message, the wireless device may initiate a procedure to resume/establish the RRC connection.

In an example of the second option (option II) of FIG. 26, based on non-SDT downlink data arrival or signalling arrival or determining to establish/resume an RRC connection of the wireless device during the SDT procedure (e.g., the determining to transition the wireless device to an RRC connected state during the SDT procedure), the second base station may transmit an RRC release message to the base station. The second base station may transmit an RRC release message via an RRC message container. Based on receiving the RRC release message, the base station may forward transparently an RRC release message to the wireless device. Based on transmitting the RRC release message, the second base station may transmit a RAN paging message to the base station.

In an example of the second option (option II) of FIG. 26, the transmission of an RAN paging message based on transmitting an RRC release message by the second base station may cause signal overheads between base stations and latency of establishing/resuming the RRC connection of the wireless device. The second base station may transmit to the base station a message comprising an RAN paging message and an RRC release message. For example, a message may be the RAN paging message comprising the RRC release message. The second base station may transmit to the base station an RAN paging message comprising an RRC release message. For example, based on non-SDT downlink data arrival or signalling arrival or determining to establish/resume an RRC connection of the wireless device during the SDT procedure (e.g., the determining to transition the wireless device to an RRC connected state during the SDT procedure), the second base station may transmit to the base station the message or an RAN paging message comprising the RRC release message. Based on receiving the message or the RAN paging message comprising the RRC release message, the base station may transmit to the wireless device the RRC release message. For example, the second base station may transmit an RRC release message via an RRC message container. Based on receiving the RRC release message, the base station may forward transparently an RRC release message to the wireless device. Based on forwarding/transmitting the RRC release message (or determining the RRC release message successfully being transmitted to the wireless device), the base station may transmit the RRC paging message. Based on acknowledgement from the wireless device, the base station may determine the RRC release message successfully being transmitted to the wireless device.

In an example of the second option (option II) of FIG. 26, based on receiving the RRC release message, the wireless device may transition to an RRC inactive state or an RRC idle state. Based on the transitioning, the wireless device may monitor a paging from the base station. Based on the RRC release message, the base station may transmit a RAN paging message (or the RAN paging message) to the wireless device. Based on receiving the RAN paging, the wireless device may initiate a procedure to resume/establish the RRC connection.

In an example, a wireless device may have non-SDT data. The non-SDT data is data of a radio bearer not configured to a SDT procedure. the wireless device may have non-SDT data before initiating a SDT procedure (e.g., initiating an RRC connection resume/request procedure for the SDT procedure; or transmitting an RRC request message for the SDT procedure). Based on having the non-SDT data before initiating the SDT procedure, the wireless device may determine not to initiate the SDT procedure. For example, based on having the non-SDT data before initiating the SDT procedure, the wireless device may determine that a condition for initiating SDT (procedure) is not met. Based on the determining, the wireless device may initiate an RRC connection resume/request procedure for resuming/establishing an RRC connection (e.g., transmit an RRC request message for resuming/establishing an RRC connection) as shown in FIG. 18.

In an example, a wireless device may have non-SDT uplink data (e.g., non-SDT data) during a SDT procedure. For example, the wireless device may has non-SDT data while a timer T319a for a SDT procedure (e.g., a SDT failure detection timer or a SDT timer) is running. For example, based on transmitting an RRC request message for a SDT procedure, the wireless device may start the timer T319a for a SDT procedure. The RRC request message may be transmitted via a first/initial message for the SDT procedure. The first/initial message may comprise a first/initial uplink SDT data. The wireless device may transmit to a base station a message indicating availability of data mapped to radio bearers which are not configured for SDT based on having non-SDT data during the SDT procedure (e.g., while the timer T319a for the SDT procedure is running). For example, the wireless device may have non-SDT data based receiving a response to a first/initial message for the SDT procedure. The response may be a response to the RRC request. The response may indicate a radio resource (e.g., uplink grant) for subsequent transmission of the SDT procedure (e.g., subsequent SDT procedure/phase).

In an example, the non-SDT data may be a NAS message/signalling. the non-SDT data may comprise a NAS message/signalling. The wireless device may determine the NAS message/signalling as the non-SDT data. For example, the wireless device may determine the NAS message as non-SDT data based on that the NAS message is not associated with SRB configured to the SDT procedure of the wireless device. The SRB may be SRB 1 or SRB 2.

In an example, based on having the non-SDT data after receiving the response, the wireless device may transmit to a base station a message (e.g., an RRC message) indicating availability of data mapped to radio bearers which are not configured for SDT. The message may be a UE assistance information message. The message may comprise and set a resume cause. a RRC layer of the wireless device may receive the resume cause from upper layers (e.g., a NAS layer) of the wireless device. The message may indicate a non-SDT data. The message may comprise the non-SDT indication indicating the non-SDT data. The message may comprise the resume cause as the non-SDT indication.

In an example, a wireless device may initiate a procedure to transmit the message based on non-SDT data being available during SDT procedure (e.g., while T319a is running). The wireless device is capable of SDT procedure. For example, non-SDT data becomes available during SDT (e.g., while T319a is running). Based on the non-SDT data, the wireless device may initiate transmission of the message to provide a non-SDT data indication.

In an example, based on receiving the message, a base station may transmit a RRC response message to the wireless device. For example, the RRC response message may transition the wireless device to an RRC connected state. The RRC response message may be an RRC resume message or an RRC setup message. For example, the RRC response message may transition back to an RRC inactive state or an RRC idle state. the RRC response message may be an RRC release message.

Figure 27:
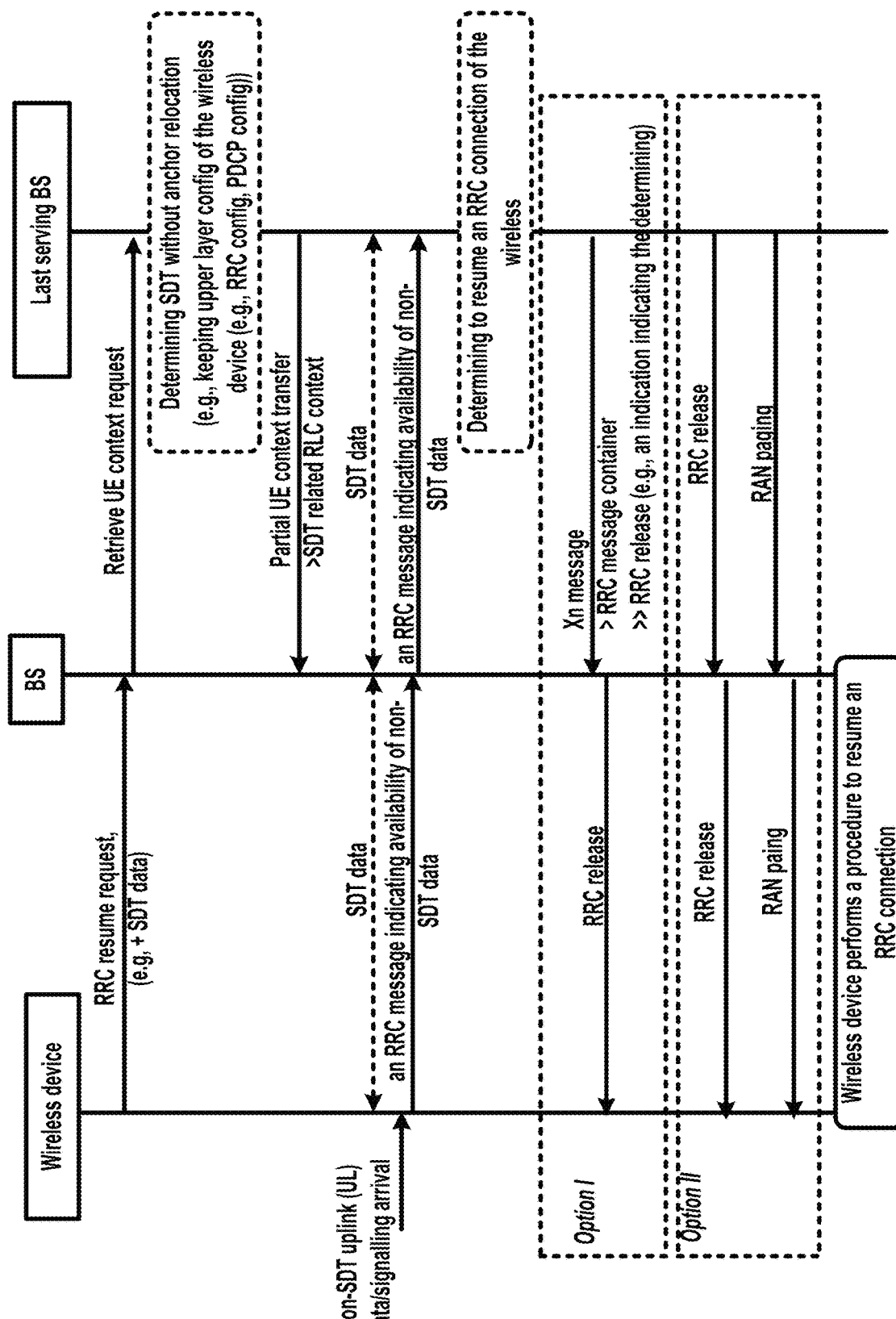
FIG. 27 illustrates an example of non-SDT uplink data during a SDT procedure without anchor relocation.

FIG. 27 illustrates an example of non-SDT uplink data during a SDT procedure without anchor relocation. A wireless device may perform a SDT procedure without anchor relocation. The SDT procedure without anchor relocation may be a SDT procedure with a second base station (e.g., a last serving base station or an anchor base station) via a base station (a first base station or a current serving base station). During the SDT procedure without anchor relocation, a wireless device may have non-SDT data (e.g., non-SDT uplink data). Based on the non-SDT data, the wireless device may transmit to the base station an RRC message (e.g., an UE assistance information message) indicating availability of data mapped to radio bearers which are not configured for SDT. Based on receiving the RRC message, the base station may transmit/forward the RRC message to the second base station. Based on receiving the RRC message (e.g., based on the non-SDT indication of the RRC message), the second base station may determine to establish/resume an RRC connection of the wireless device (determine to transition the wireless device to an RRC connected state).

FIG. 27 also illustrates two options in existing technologies for establishing/resuming an RRC connection during a SDT procedure without anchor relocation (transitioning to an RRC connected state during a SDT procedure without anchor relocation) based on the non-SDT uplink data arrival.

In an example of the first option (option I) of FIG. 27, based on receiving the RRC message or determining to establish/resume an RRC connection of the wireless device during the SDT procedure (e.g., the determining to transition the wireless device to an RRC connected state during the SDT procedure), the second base station may transmit an RRC release message to the wireless device via the base station (a first base station or a current serving base station). The RRC release message may indicate the determining to establish/resume an RRC connection of the wireless device. For example, the RRC release message may comprise an indication to resume an RRC connection. The second base station may transmit to the base station a Xn message comprising an RRC message container where the RRC message container comprises the RRC release message. Based on receiving the Xn message, the base station may transparently forward the RRC release message to the wireless device. Based on receiving the RRC release message, the wireless device may transition to an RRC idle state or an RRC idle state. Based on the RRC release message, the wireless device may initiate a procedure to resume/establish the RRC connection. For example, based on the indication of the RRC release message, the wireless device may initiate a procedure to resume/establish the RRC connection.

In an example of the second option (option II) of FIG. 27, based on receiving the RRC message or determining to establish/resume an RRC connection of the wireless device during the SDT procedure (e.g., the determining to transition the wireless device to an RRC connected state during the SDT procedure), the second base station may transmit an RRC release message to the base station. The second base station may transmit an RRC release message via an RRC message container. Based on receiving the RRC release message, the base station may forward transparently an RRC release message to the wireless device. Based on transmitting the RRC release message, the second base station may transmit a RAN paging message to the base station.

In an example of the second option (option II) of FIG. 27, the transmission of an RAN paging message based on transmitting an RRC release message by the second base station may cause signal overheads between base stations and latency of establishing/resuming the RRC connection of the wireless device. The second base station may transmit to the base station a message comprising an RAN paging message and an RRC release message. For example, a message may be the RAN paging message comprising the RRC release message. The second base station may transmit to the base station an RAN paging message comprising an RRC release message. For example, based on non-SDT downlink data arrival or signalling arrival or determining to establish/resume an RRC connection of the wireless device during the SDT procedure (e.g., the determining to transition the wireless device to an RRC connected state during the SDT procedure), the second base station may transmit to the base station the message or an RAN paging message comprising the RRC release message. Based on receiving the message or the RAN paging message comprising the RRC release message, the base station may transmit to the wireless device the RRC release message. For example, the second base station may transmit an RRC release message via an RRC message container. Based on receiving the RRC release message, the base station may forward transparently an RRC release message to the wireless device. Based on forwarding/transmitting the RRC release message (or determining the RRC release message successfully being transmitted to the wireless device), the base station may transmit the RRC paging message. Based on acknowledgement from the wireless device, the base station may determine the RRC release message successfully being transmitted to the wireless device.

In an example of the second option (option II) of FIG. 27, based on receiving the RRC release message, the wireless device may transition to an RRC inactive state or an RRC idle state. Based on the transitioning, the wireless device may monitor a paging from the base station. Based on the RRC release message, the base station may transmit a RAN paging message (or the RAN paging message) to the wireless device. Based on receiving the RAN paging, the wireless device may initiate a procedure to resume/establish the RRC connection.

The CM state of the UE, as tracked by the AMF, may be in CM idle (e.g., CM-IDLE) or CM connected (e.g., CM-CONNECTED). When the UE transitions from CM idle to CM connected, the AMF many establish an N2 context of the UE (N2 context establishment). When the UE transitions from CM connected to CM idle, the AMF many release the N2 context of the UE (N2 context release).

When a UE is in an RRC inactive state, the UE is in CM connected state (with an RRC inactive indication). When a UE is in CM connected, the UE may be in an RRC connected state or an RRC inactive state. When a U E is in an RRC inactive state, an AMF may not identity whether the UE is in an RRC connected state or an RRC inactive state. A base station may indicate an RRC inactive state to an AMF. Based on the indication, the AMF may identify the RRC inactive state. When a UE is in an RRC inactive state, an N2 connection (an N2 context) of the UE is established. When a UE is in CM idle with suspend indication, the UE is in an RRC idle state and suspends an RRC connection. When a UE is in CM idle with suspend indication, a base station and an AMF suspends an N2 connection (an N2 context) of the UE.

Figure 28:
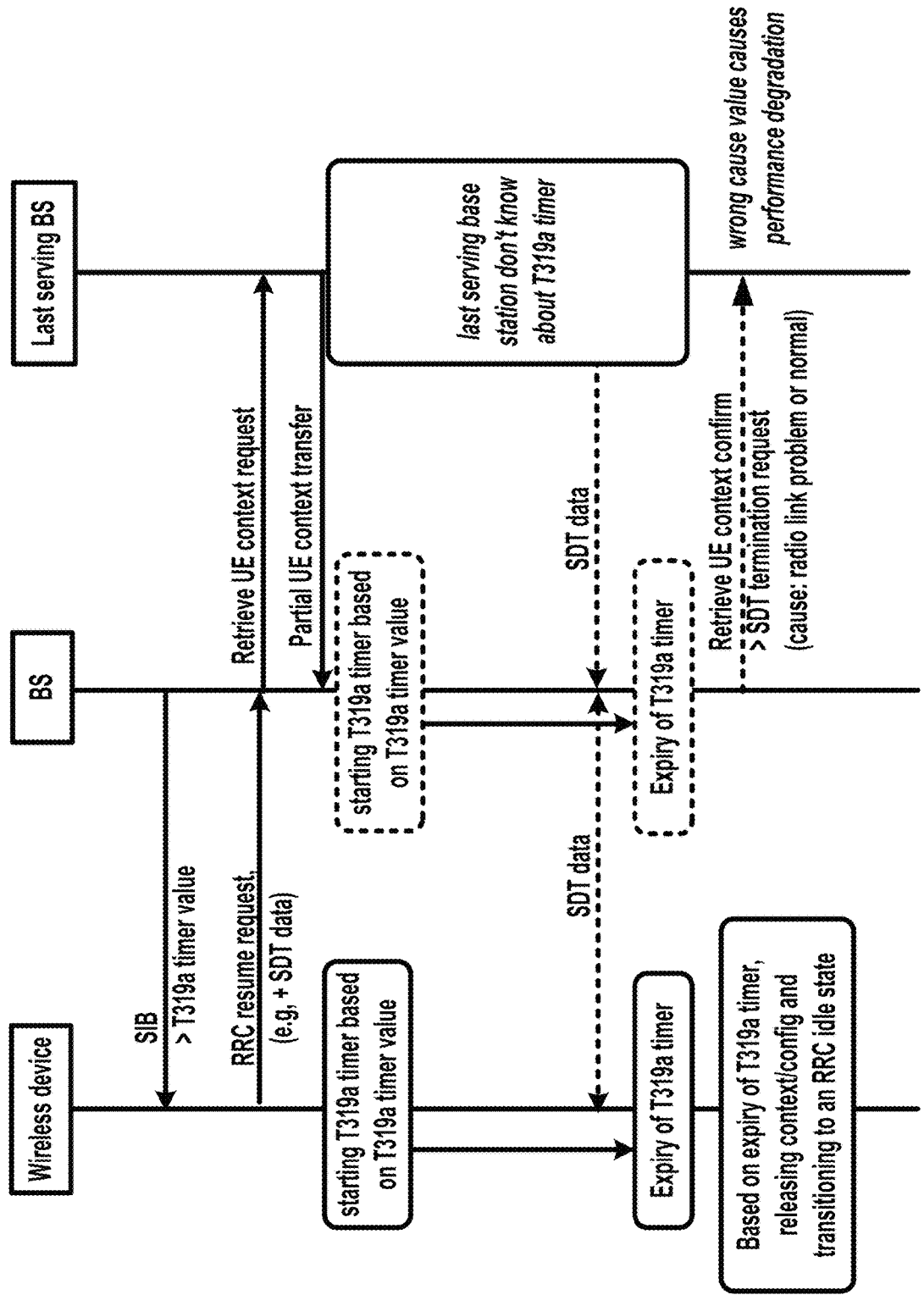
FIG. 28 illustrates an example of a T319$a$ timer for SDT during SDT procedure without anchor relocation.

FIG. 28 illustrates an example of a T319a timer for SDT during SDT procedure without anchor relocation. A base station (e.g., a current serving base station) may transmit to a wireless device a value of T319a timer (e.g., T319a timer value). For example, the base station may transmit the value via a broadcast message (e.g., a system information) the base station may transmit the value via a system information (e.g., SIB1). The wireless device may receive the value from the base station. The wireless device may is in an RRC inactive state. The wireless device in the RRC inactive state may determine to initiate a SDT procedure (e.g., an RRC connection resume procedure to indicate the SDT procedure). Based on the initiating the SDT procedure, the wireless device may transmit a first message for the SDT procedure. The first message may comprise at least one of: an RRC resume request message; and a data of the SDT procedure (e.g., SDT data). The data/SDT data may be data of a radio bearer configured to the SDT procedure. Based on transmitting the RRC resume request message (e.g., the first message), the wireless device may start a T319 timer with the value of the T319a timer.

In an example of FIG. 28, the base station may not have a context of the wireless device. Based on receiving the RRC resume request message (or the first message), the base station may transmit to a last serving base station (e.g., a second base station) a first message requesting to retrieve the context of the wireless device. the second base station may keep/store the context of the wireless device. For example, the first message may be a retrieve UE context request message. For example, the first message may indicate the SDT procedure; and/or that the wireless device requests the SDT procedure. The first message may comprise a SDT indicator indicating the SDT procedure; and/or that the wireless device requests the SDT procedure. The first message may further comprise SDT assistant information indicating either single packet; or multiple packets. The single packet may indicate no subsequent SDT transmission of/from the wireless is expected. The multiple packets may indicate subsequent SDT transmission of/from the wireless device is expected.

In an example of FIG. 28, based on receiving the first message, the second base station may determine at least one of: to keep the context of the wireless device; not to provide the context of the wireless device; not to relocate the context of the wireless device; and to perform the SDT procedure, for the wireless device, without anchor relocation. Based on the determining, the last serving base station may transmit a second message comprising a partial context information, of the wireless device, for the wireless device. The partial context information may comprise a radio link control (RLC) context related to the SDT procedure. The partial context information may comprise a RLC bearer configuration of the wireless device. The RLC context may be the RLC bearer configuration.

In an example of FIG. 28, based on receiving the second message, the base station may transmit a third message. the third message may indicate acknowledgement of the second message. For example, the base station may transmit the third message further based on determining to accept the SDT procedure without anchor relocation (e.g., that the second base station keeps the context of the wireless device). the third message may be a partial UE context transfer acknowledge message. The third message may comprise data forwarding related information for the SDT procedure. The data forwarding related information may comprise downlink transport network layer (TNL) information. The downlink TNL information may be used for transmitting, by the second base station, downlink data to the base station. The downlink TNL information may comprise at least one of: a IP address and; and a GTP tunnel endpoint identifier. The second base station may transmit downlink data of the wireless device via the downlink TNL information.

In an example of FIG. 28, the base station may communicate data of the wireless device with the second base station while the wireless device is in the RRC inactive state. For example, based on receiving the second message (or transmitting the third message), the base station may communicate data of the wireless device with the second base station while the wireless device is in the RRC inactive state.

In an example of FIG. 28, the wireless device may determine that the T319a timer is expired. Based on the T319a timer expiry, the wireless device may transition to an RRC idle state. Based on the T319a timer expiry, the wireless device may release the context/configuration being used for the SDT procedure (e.g., the communicating).

In an example of FIG. 28, the base station may determine that the T319a timer is expired. The last serving base station may not identify that that the T319a timer is expired. Based on lack of knowledge about the T319a timer, the last serving station may miss a chance to continue communicating with the wireless device (e.g., without delay or loss of data). For example, the last serving base station may have downlink data to transmit to the wireless device via the base station while the base station and the wireless device may determine that T319a timer is expired. The base station may release an connection (e.g., logical connection or tunnel) for communicating data of the wireless device with the last serving base station and/or the context of the wireless device. The wireless device may release a configuration/context being used for communicating with the last serving base station and the base station; and transition to an RRC idle state. The last serving base station may not continue communicating with the base station releasing the connection and the context; and the wireless device releasing the configuration/context and transitioning to the RRC idle state. The last serving base station may buffer the downlink data. The last serving base station may transmit to the wireless device a paging message to continue communicating with the wireless device and wait until receiving from the wireless device and/or the base station, a message to recover/re-establish the connection and to continue the communication. For example, the message may be a retrieve UE context request message. it may cause signaling overheads and delay. during the waiting, the last serving base station may discard the downlink data due to the delay.

In an example of FIG. 28, based on T319a being expired, the base station may transmit to the last serving base station a message indicating termination/failure of the SDT procedure. the message may further indicate a cause value of the termination/failure. in existing technologies, the cause value may comprise a radio link problem and normal (e.g., normal termination). Based on receiving the cause value, the last serving base station may not identify accurate reason/cause of the termination. It may cause performance degradation.

In an example of FIG. 28, the last serving base station not identifying the accurate reason/cause may perform misbehavior. For example, based on the cause value of the radio link problem, the last serving base station may determine to wait a message from the wireless device or the base station. The last serving base station may determine/expect that the wireless device transmits the message based on resolving the radio link problem. it may cause delay to re-initiate communications and/or loss of data in the last base station (e.g., due to the delay). For example, the last serving base station may miss a change to update a configuration for the SDT procedure. based on the existing cause value, the last serving base station may determine that there is nothing to be improved by the last base station and/or the base station, it may cause performance degradation of the SDT procedure.

In an example, there are no existing technologies about a T319a timer in a base station central unit (CU) and base station distributed unit (DU) architecture. T319a timer may be running both or one of CU and DU.

Figure 29:
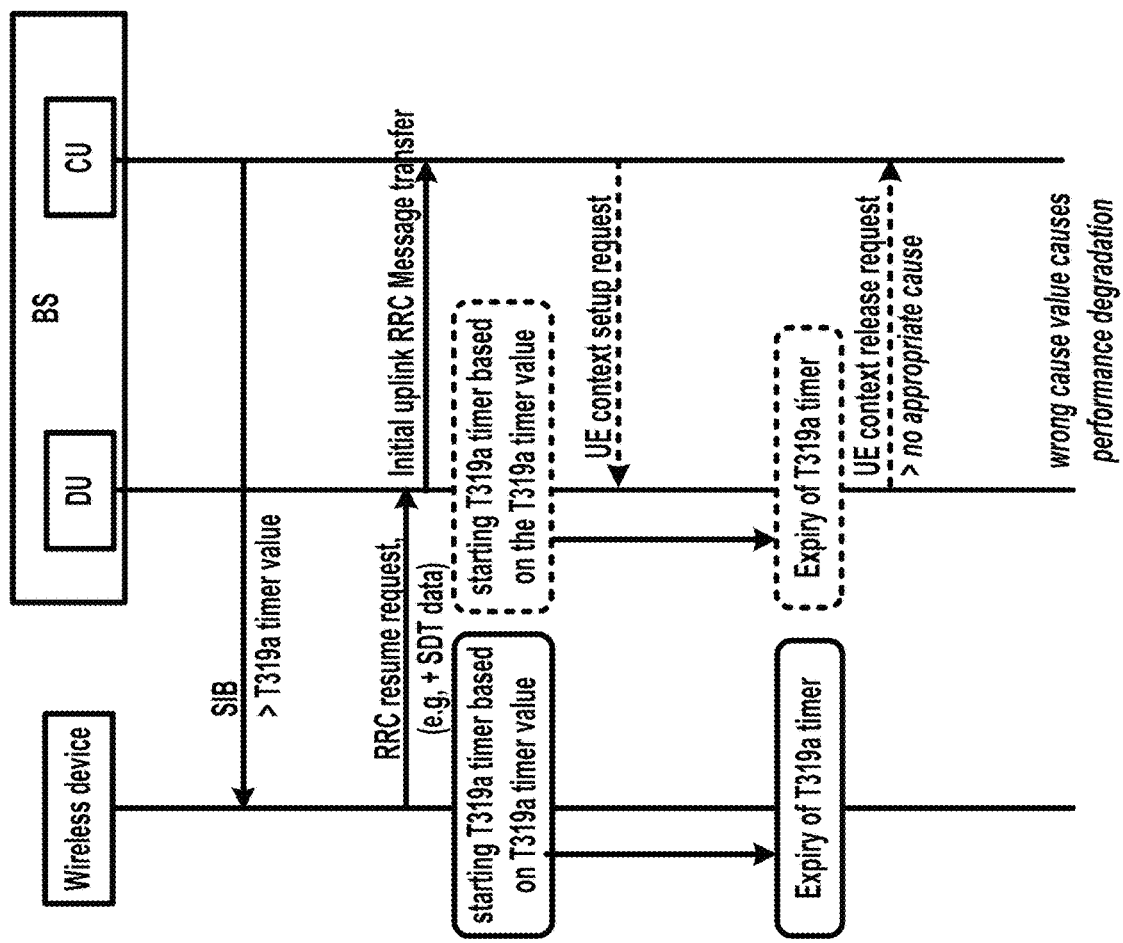
FIG. 29 illustrates an example of a T319$a$ timer for SDT in CU and DU architecture.

FIG. 29 illustrates an example of a T319a timer for SDT in CU and DU architecture. T319a timer may be running in a base station distributed unit. Based on an expiry of the T319a timer, the base station distributed unit may determine to release a context of a wireless device. Based on the determining, the base station distributed unit may transmit to a base station central unit a message to release the context of the wireless device. In existing technologies, the base station distributed unit may not indicate the expiry of the T319a timer. For example, the message may not indicate the expiry of the T319a timer. It may cause performance degradation of the SDT procedure. For example, the base station distributed unit may miss a chance to update a configuration parameter for a SDT procedure (e.g., next SDT procedure). The configuration parameter may be related to communication between the base station central unit and the base station distributed unit; and/or between the base station distributed unit and user plane function (UPF).

Figure 30:
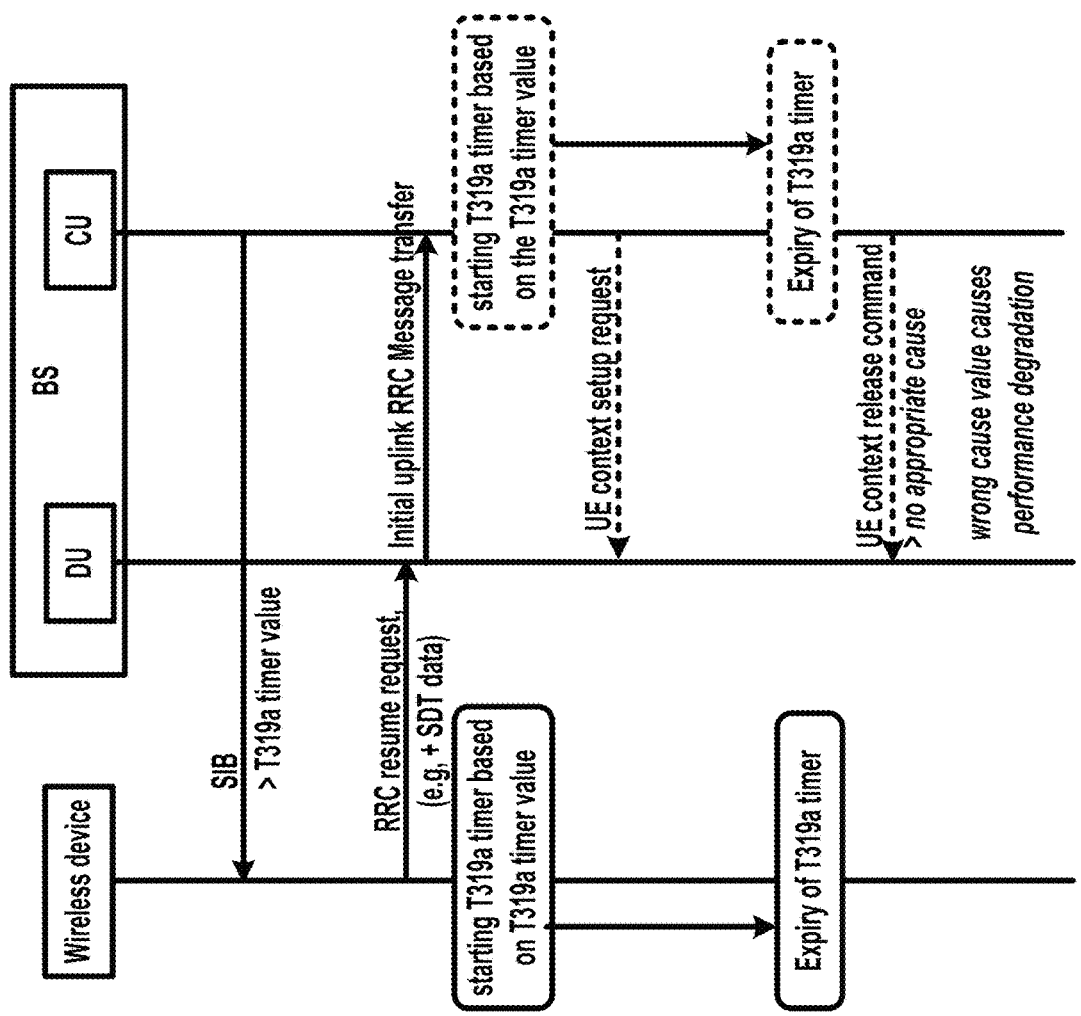
FIG. 30 illustrates an example of a T319$a$ timer for SDT in CU and DU architecture.

FIG. 30 illustrates an example of a T319a timer for SDT in CU and DU architecture. T319a timer may be running in a base station central unit. Based on an expiry of the T319a timer, the base station central unit may determine to release a context of a wireless device. Based on the determining, the base station central unit may transmit to a base station distributed unit a message to release the context of the wireless device. In existing technologies, the base station central unit may not indicate the expiry of the T319a timer. For example, the message may not indicate the expiry of the T319a timer. It may cause performance degradation of the SDT procedure. For example, the base station central unit may miss a chance to update a configuration parameter for a SDT procedure (e.g., next SDT procedure). The configuration parameter may be related to communication between the base station central unit and the base station distributed unit.

Figure 31:
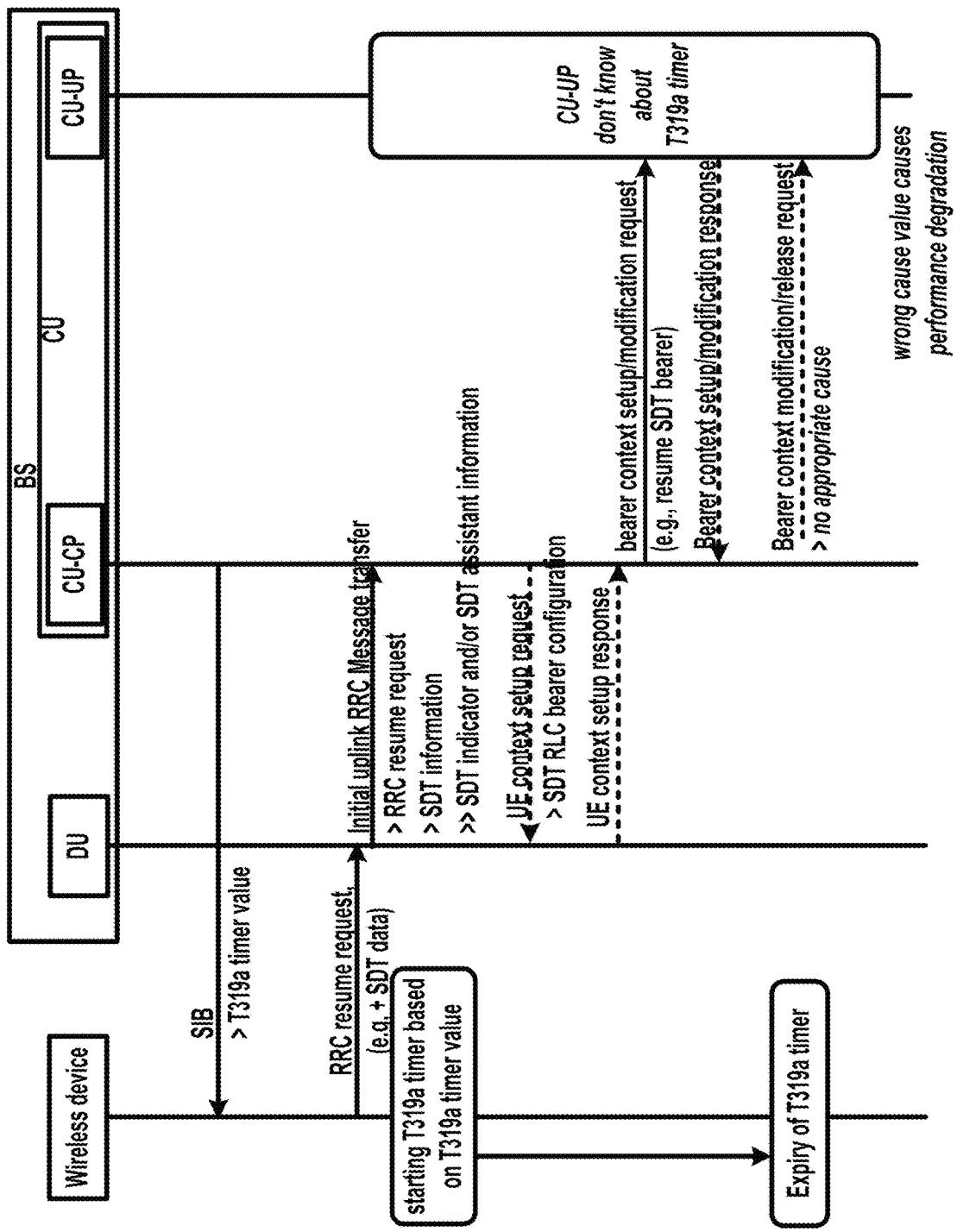
FIG. 31 illustrates an example of a T319$a$ timer for SDT in CU-CP and CU-UP architecture.

FIG. 31 illustrates an example of a T319a timer for SDT in CU-CP and CU-UP architecture. a base station central unit control plane may identify a value of T319a timer. For example, the base station central unit control plane may receive the value (e.g., SIB1 comprising the value) from the base station distributed unit transmitting the value via system information (e.g., SIB1). A base station central unit user plane (CU-UP) may not identify the value. It may cause performance degradation during a SDT procedure. For example, during the SDT procedure, a base station central unit user plane may not prepare/avoid an interruption result from an expiry of the T319a timer. For example, the base station central unit user plane may miss a chance to transmit a signal for continuing the communicating before termination of the SDT procedure due to the expiry of the T319a timer. It may cause signaling overheads and delay to re-initiate the communicating after the termination. It may cause discard of data in the base station central unit user plane.

In an example of FIG. 31, T319a timer may be running in a base station central unit control plane (CU-CP). Based on an expiry of the T319a timer, the base station central unit control plane may determine to release/modify a context of a bearer of a wireless device. Based on the determining, the base station central unit control plane may transmit to a base station central unit user plane a message to release/modify the context of the bearer of the wireless device. In existing technologies, the base station central unit control plane may not indicate the expiry of the T319a timer. For example, the message may not indicate the expiry of the T319a timer. It may cause performance degradation of the SDT procedure. For example, the base station central unit user plane may miss a chance to update a configuration parameter for a SDT procedure (e.g., next SDT procedure). The configuration parameter may be related to communication between the base station central unit control plane and the base station central unit user plane.

In this present disclosures, a base station or a first base station may be referred to as and/or interchangeable with a target base station or a current serving base station and/or the like. A second base station may be referred to as and/or interchangeable with an anchor base station or a last serving base station and/or the like.

In this present disclosures, a T319a timer may be referred to as and/or interchangeable with T319a or a SDT failure detection timer or a SDT timer and/or the like.

In this present disclosures, initiating/performing a SDT procedure may be referred to as and/or interchangeable with initiating/performing a resume procedure for a SDT procedure or initiating/performing a procedure to resume an RRC connection and/or the like. The resume procedure or the procedure may be a RRC connection resume procedure.

In this present disclosures, an RRC inactive state may be referred to as and/or interchangeable with non-RRC connected state or an RRC idle state. The RRC idle state may be referred to as and/or interchangeable with an RRC idle state with a suspended RRC connection.

In this present disclosures, determining to resume an RRC connection of a wireless device be referred to as and/or interchangeable with determining to trigger the wireless device to initiate/perform a procedure to resume the RRC connection and/or the like.

In this present disclosures, resuming an RRC connection may be referred to as and/or interchangeable with establishing the RRC connection and/or the like.

In this present disclosures, a SDT procedure without anchor relocation may be referred to as and/or interchangeable with communicating, via a first base station between a second base station and a wireless device in an RRC inactive state. The second base station may keep a context of the wireless device.

In existing technologies, a current serving base station may transmit a value of a T319a timer to one or more wireless devices. For example, the current base station may transmit the value via system information (e.g., SIB1). The wireless device and the base station may identify the value. The T319a timer may be running in the wireless device and the base station. A last serving base station keeping a context of the wireless device may not identify the value of the timer. It may cause performance degradation during a SDT procedure without anchor relocation. For example, during the SDT procedure without anchor relocation (e.g., communicating with a wireless device via the base station), a last serving base station may not continue the SDT procedure (e.g., the communicating with the wireless device) based on an expiry of the T319a timer in the wireless device and/or the base station. For example, the last base station may miss a chance to transmit a signal for continuing the communicating before termination of the SDT procedure due to the expiry of the T319a timer. It may cause signaling overheads and delay to re-initiate the communicating after the termination. It may cause discard/loss of data in the last serving base station.

In existing technologies, during a SDT procedure without anchor relocation, a current serving base station may transmit to a last serving base station a request to terminate the SDT procedure. For example, during the SDT procedure, the current base station may determine a radio link problem or normal termination. Based on the determining, the current base station transmit the request indicating the radio link problem or the normal termination as a cause value of the termination. In existing technologies, during the SDT procedure without anchor relocation, a current base station may determine that a T319 timer is expired. Based on the current base station may transmit to a last serving base station a request to terminate the SDT procedure. The request may indicate one of existing cause values between the radio link problem and the normal termination. It may cause performance degradation of the SDT procedure without anchor relocation. For example, the last serving base station may miss a chance to update a configuration parameter for a SDT procedure (e.g., next SDT procedure). The configuration parameter may be related to communication between the base station and the last serving base station.

In an example, a first base station may determine that a SDT procedure is terminated/failed (e.g., based on determining an expiry of T319a timer). Based on the determining, the first base station may transmit a message comprising a SDT termination request. In existing technologies, based on receiving the message, the last serving base station may terminate the SDT procedure of the wireless device. The last serving base station may continue to communicate with the wireless device. it may cause performance degradation of the SDT procedure which may comprise an interruption of the communication; delay of the communicating; and additional procedure for communication with the wireless device. For example, the last serving base station may transmit a paging message to the wireless device. based on receiving the paging message, the wireless device may perform a procedure to establish/resume an RRC connection with the last serving base station.

During a SDT procedure, a base station central unit or a base station distributed unit may determine to release a context of a wireless device. Based on the determining, the base station central unit may transmit a message to release a context of a wireless device to a base station distributed unit. Based on the determining, the base station distributed unit may transmit a message to release a context of a wireless device to a base station central unit. The message may indicate a cause value of the determining. In existing technologies, there is no cause value indicating an expiry of a T319a timer. It may cause performance degradation of the SDT procedure. For example, the base station central unit or the base station distributed unit may miss a chance to update a configuration parameter for a SDT procedure (e.g., next SDT procedure). The configuration parameter may be related to communication between the base station central unit and the base station distributed unit; and/or between the base station distributed unit and user plane function (UPF).

In existing technologies, a base station central unit control plane (CU-CP) may identify a value of a T319a timer. For example, the base station central unit control plane may receive the value (e.g., SIB1 comprising the value) from the base station distributed unit transmitting the value via system information (e.g., SIB1). A base station central unit user plane (CU-UP) may not identify the value. It may cause performance degradation during a SDT procedure. For example, during the SDT procedure, a base station central unit user plane may not continue the SDT procedure (e.g., the communicating with the wireless device) based on an expiry of the T319a timer in the base station distributed unit and a wireless device. For example, the base station central unit user plane may miss a chance to transmit a signal for continuing the communicating before termination of the SDT procedure due to the expiry of the T319a timer. It may cause signaling overheads and delay to re-initiate the communicating after the termination. It may cause discard of data in the base station central unit user plane.

During a SDT procedure, a base station central unit control plane may determine to release/modify a context of a bearer of a wireless device. Based on determining, the base station central unit control plane may transmit a message to release/modify the context of the bearer of the wireless device to the base station central unit user plane. The message may indicate a cause value of the determining. In existing technologies, there is no cause value indicating an expiry of a T319a timer. It may cause performance degradation of the SDT procedure. For example, the base station central unit user plane may miss a chance to update a configuration parameter for a SDT procedure (e.g., next SDT procedure). The configuration parameter may be related to communication between the base station central unit user plane and the base station central unit control plane; and/or between the base station central unit user plane and the base station distributed unit.

Example embodiments of the present disclosure are directed to an enhanced procedure for a timer associated with a SDT procedure. it may improve performance of/during a SDT procedure. It may reduce signaling and delay resulting from lack of knowledge about a value of T319a timer and accurate cause/reason of termination of the SDT procedure due to an expiry of T319a timer.

Example embodiments may enable a current serving base station to transmit a value of a T319a timer to a last serving base station (e.g., a base station keeping a context of a wireless device). based on the value, the last base station may enhance performance of a SDT procedure without anchor relocation. For example, the last serving base station may start a T319a timer based on the value. The last serving base station may identify when the T319a timer is expired. Based on the identifying, the last serving base station may transmit a message to continue the SDT procedure (e.g., before the expiry). The message may comprise a request to restart/extend the T319a timer or an RRC message for transitioning the wireless device to an RRC connected state. It may reduce signaling and delay to re-initiate communication with the wireless device after terminating the SDT procedure due to the expiry of T319a timer.

Example embodiments may enable a current serving base station determining to terminate a SDT procedure based on an expiry of T319a timer to transmit to a last serving base station a SDT termination request indicating an expiry of T319a timer as a cause value. It may improve performance of a SDT procedure without anchor relocation. For example, based on the cause value, the last serving base station may identify that the SDT procedure is terminated due to the expiry of T319a timer. The last serving base station may prepare communicating using the SDT procedure with the base station (e.g., based on updating a configuration for the communicating). The last serving base station may configure more resource for the communicating; or may determine anchor relocation; or may determine to transition the wireless device to an RRC connected sate. It may reduce termination of the SDT procedure due to the expiry of the T319a timer. it may reduce signaling and delay resulting from the termination due to expiry of the T319a timer.

Example embodiments may enable a last serving base station determining to terminate a SDT procedure based on receiving a SDT termination request from a current serving base station during the SDT procedure of a wireless device. based on the determining, the last serving base station may transmit a response indicating the determining. The determining may comprise an acceptance of the SDT termination request; rejection of the SDT termination request. (e.g., based on determining to reject the SDT termination request) the last serving base station may determine to continue the SDT procedure. (e.g., based on determining to reject the SDT termination request) the last serving base station may determine to transition the wireless device to an RRC connected state. Based on the determining, the last serving base station may transmit a response message to the current serving base station, the response message may indicate the determining. Based on receiving the response message indicating the determining to continue the SDT procedure, the current serving base station may continue to perform the SDT procedure. For example, based on the determining to transition the wireless device to the RRC connected state, the last serving base station may transmit an RRC release message for the wireless device. The response message may comprise the RRC release message. based on receiving the response message, the current serving base station may transmit the RRC release message to the wireless device. It may reduce signal overheads and delay which results from termination of the SDT procedure.

Example embodiments may enable a base station central unit determining to release a context of a wireless device, during a SDT procedure, based on an expiry of T319a timer to transmit to a base station distributed unit a message indicating an expiry of T319a timer as a cause value. Example embodiments may enable a base station distributed unit determining to release a context of a wireless device, during a SDT procedure, based on an expiry of T319a timer to transmit to a base station central unit a message indicating an expiry of T319a timer as a cause value. It may improve performance of a SDT procedure. For example, based on the cause value, the base station central unit and/or the base station distributed unit may identify that the SDT procedure is terminated due to the expiry of T319a timer. The base station central unit and/or the base station distributed unit may prepare communicating using the SDT procedure (e.g., based on updating a configuration for the communicating). The base station central unit and/or the base station distributed unit may configure more resource for the communicating; or may determine to transition the wireless device to an RRC connected sate. It may reduce termination of the SDT procedure due to the expiry of the T319a timer. it may reduce signaling and delay resulting from the termination due to expiry of the T319a timer.

Example embodiments may enable a base station central unit control plane to transmit a value of a T319a timer to a base station central unit user plane. based on the value, the base station central unit user plane may enhance performance of a SDT procedure without anchor relocation. For example, the base station central unit user plane may start a T319a timer based on the value. The base station central unit user plane may identify when the T319a timer is expired. Based on the identifying, the base station central unit user plane may transmit a message to continue the SDT procedure (e.g., before the expiry). The message may comprise a request to restart/extend the T319a timer or trigger to transition the wireless device to an RRC connected state. It may reduce signaling and delay to re-initiate communication with the wireless device after terminating the SDT procedure due to the expiry of T319a timer.

Example embodiments may enable a base station central unit control plane determining to release/modify a context of a bearer of a wireless device based on an expiry of T319a timer to transmit to a base station central unit user plane a message indicating an expiry of T319a timer as a cause value. For example, the message may request the releasing/modifying the context of the bearer of the wireless device. It may improve performance of a SDT procedure. For example, based on the cause value, the base station central unit user plane may identify that the SDT procedure is terminated due to the expiry of T319a timer. The base station central unit user plane may prepare communicating using the SDT procedure (e.g., based on updating a configuration for the communicating). The base station central unit user plane may configure more resource for the communicating; or may determine to trigger to transition the wireless device to an RRC connected sate. It may reduce termination of the SDT procedure due to the expiry of the T319a timer. it may reduce signaling and delay resulting from the termination due to expiry of the T319a timer.

In an example, a first base station may transmit, to a second base station, a message comprising a value of a timer associated with a SDT procedure.

Figure 32:
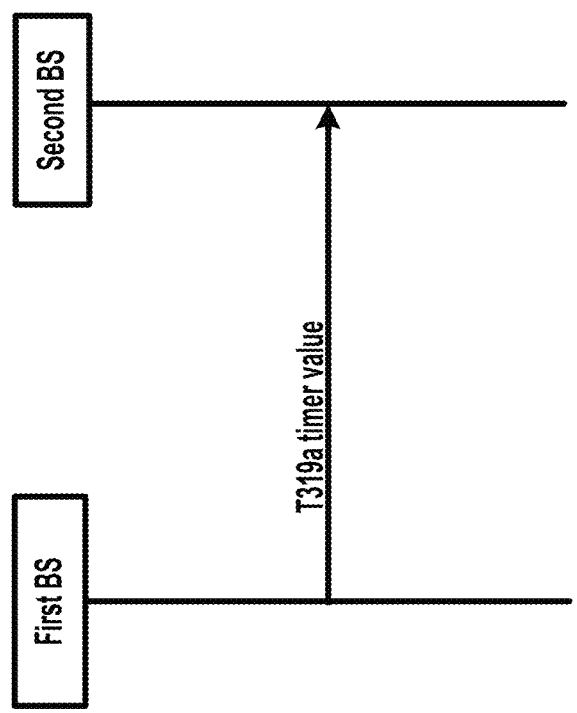
FIG. 32 illustrates an example of a timer value between base stations.

FIG. 32 illustrates an example of a timer value between base stations. A first base station may transmit to a second base station a value of a timer associated with a SDT procedure.

In an example of FIG. 32, the first base station may transmit to a second base station the value of the timer via a message. the message may be non-UE (wireless device) associated signaling/message. For example, the message may not be associated with a wireless device. For example, the message may be node (base station) associated signaling/message. the message may be for exchanging/updating a configuration needed for the first base station and the second base station (e.g., to interoperate correctly over an Xn control interface). For example, the message may be an Xn setup message; or a configuration update message. the message may comprise the value of the timer. For example, based on determining setup/establishing an Xn interface (e.g., Xn control interface) with other base station (e.g., the second base station); or exchanging configuration data need for the first base station and the second base station (e.g., to interoperate correctly over an Xn control interface), a base station (e.g., the first base station) may transmit the Xn setup message to the other base station. based on determining to update configuration data needed for an Xn interface (e.g., Xn control interface) with other base station, the base station may transmit the configuration update message to the other base station.

In an example of FIG. 32, the first base station may transmit to a second base station the value of the timer via a message. For example, the message may not be node (base station) associated signaling/message. the message may be UE (wireless device) associated signalling/message. the message may be associated with mobility of a wireless device. The message may be for handling mobility of a wireless device. For example, the message may be associated with a context of a wireless device. The message may be a message requesting to retrieve a context of a wireless device. the message may be a retrieve UE context request message.

In an example, the timer may be a T319a timer.

In an example, a wireless device may start the timer with the value of the timer based on initiating a SDT procedure. For example, a wireless device may determine to initiate a SDT procedure based on one or more conditions to initiate the SDT procedure being met. Based on the determining, the wireless device may initiate the SDT procedure. For example, based on the determining, the wireless device may initiate a RRC connection resume procedure. based on the initiating, the wireless device may transmit to a base station an RRC resume request message and/or data of the SDT procedure. For example, based on the initiating, the wireless device may transmit an initial message for the SDT procedure to a base station, the initial message may comprise the RRC resume request message and/or the data of the SDT procedure. the initial message may be Msg 3 or Msg A. based on the transmitting the RRC resume request message, the wireless device may start the timer based on the value of the timer.

In an example, the data of the SDT procedure may be SDT data. the data of the SDT procedure may be data of a radio bearer configured for the SDT procedure.

Figure 33:
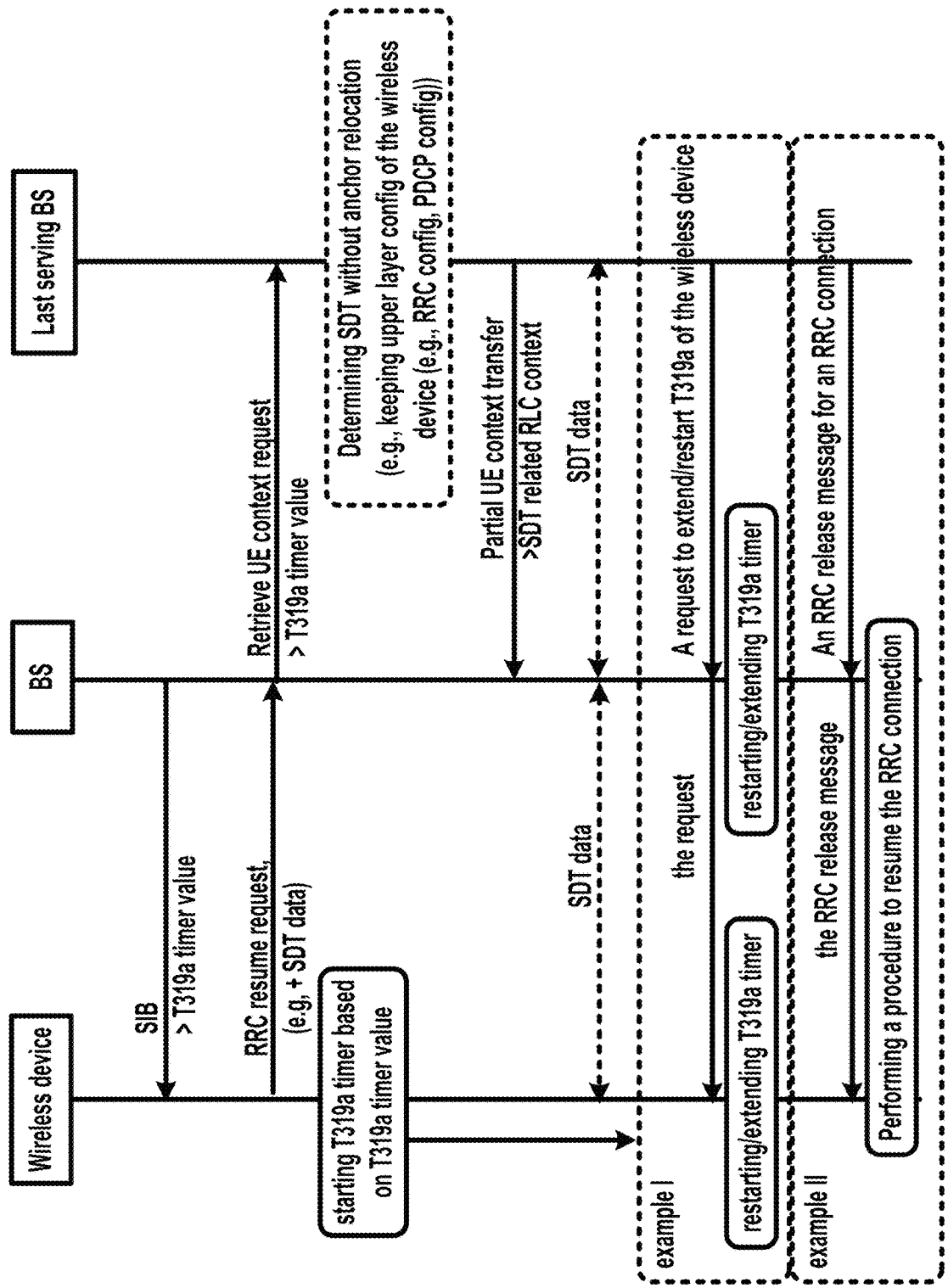
FIG. 33 illustrates an example of a timer value transmitted via UE associated signaling.

FIG. 33 illustrates an example of a timer value transmitted via UE associated signaling. A first base station may transmit system information comprising a value of a T319a timer. a wireless device may receive the value from the first base station, the wireless device may determine to initiate a SDT procedure. based on the determining, the wireless device may transmit an RRC resume request message and/or SDT data to the first base station. based on the transmitting the RRC resume request message, the wireless device may start the T319a timer based on the timer value.

In an example of FIG. 33, the first base station may transmit to a second base station a retrieve UE context request message based on receiving the RRC resume request message. the retrieve UE context request message comprising the value of the timer. the second base station may be a base station that keeps a context of the wireless device.

In an example of FIG. 33, based on receiving the retrieve UE context request message, the second base station may determine a SDT procedure without anchor relocation. For example, based on receiving the retrieve UE context request message, the second base station may determine to transfer a partial context/configuration of the wireless device to the first base station. The partial context/configuration may be a RLC bearer configuration. The partial context/configuration may be for the SDT procedure. The second base station may keep upper layer context/configuration (e.g., RRC configuration and/or PDCP configuration). For example, based on the determining, the second base station may transmit a message comprising the partial context/configuration to the first base station, the message may be a partial UE context transfer message.

In an example of FIG. 33, based on transmitting the partial context transfer message, the second base station may communicate data of the wireless device with the first base station. The communicating may comprise transmission/reception of the data based on the SDT procedure (e.g., while the wireless device is in an RRC inactive state). the communicating may be further based on receiving, from the first base station, an acknowledge message to the partial UE context transfer message. The acknowledge message may be a partial UE context transfer acknowledge message. the acknowledge message may comprise data forwarding related information for the SDT procedure.

In an example of FIG. 33, during the communicating, the second base station may transmit a request to restart/extend the 319a timer of the wireless device (e.g., before the T319a timer is expired). For example, during the communicating, the second base station may transmit a request to restart/extend the 319a timer of the wireless device based on determining that the 319a timer is expired after a timer offset. For example, the second base station may transmit the request to the first base station and/or the wireless device. Based on the transmitting the request, the second base station may avoid an expiry of the T319a timer. Based on the transmitting the request, the second base station may continue the communicating.

In an example of FIG. 33, during the communicating, the second base station may determine to transition the wireless device to an RRC connected state. based on the determining, the second base station may transmit an RRC release message to the wireless device via the first base station. based on the transmitting the RRC release message, the second base station may transmit an RAN paging message to the wireless device. Based on receiving the RRC release message, the wireless device may transition to an RRC inactive state or an RRC idle state. based on the RAN paging message, the wireless device may perform a procedure for an RRC connection (e.g., an RRC connection resume procedure). based on the transmitting the RRC release message and/or the RAN paging message, the second base station may continue the communicating with less delay/interruption.

In an example, a first base station may transmit, to a second base station, a message indicating an expiry of a timer associated with a SDT procedure.

In an example, the first base station may transmit, to the second base station, the message indicating the expiry of the timer based on determining that the timer is expired.

Figure 34:
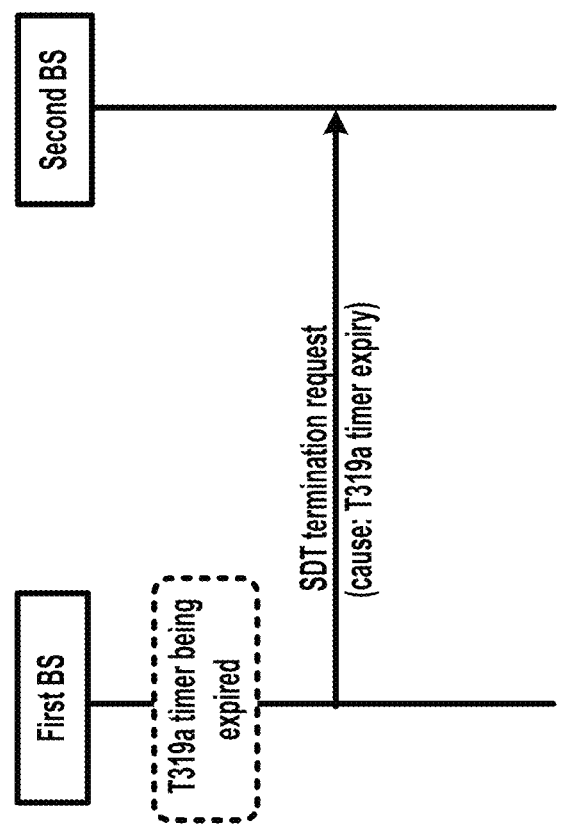
FIG. 34 illustrates an example of a cause value of an expiry of a timer between base stations.

FIG. 34 illustrates an example of a cause value of an expiry of a timer between base stations. A first base station may transmit to a second base station a request to terminate a SDT procedure of a wireless device. the request may indicate an expiry of a timer associated with the SDT procedure. For example, the first base station may determine the expiry of the timer. based on the determining, the first base station may transmit the request to the second base station, the request indicating the expiry of the timer may comprise a request comprising a cause value indicating the expiry of the timer.

In an example of FIG. 34, the second base station may be a base station that keeps a context of the wireless device. the first base station may determine the expiry of the timer during the SDT procedure. based on the determining, the first base station may determine to terminate the SDT procedure. based on the determining to terminate the SDT procedure, the first base station may transmit a request indicating the expiry of the timer. the request indicating the expiry of the timer may comprise a request comprising a cause value indicating the expiry of the timer.

In an example, the timer may be a T319a timer.

In an example, a wireless device may start the timer with the value of the timer based on initiating a SDT procedure. For example, a wireless device may determine to initiate a SDT procedure based on one or more conditions to initiate the SDT procedure being met. Based on the determining, the wireless device may initiate the SDT procedure. For example, based on the determining, the wireless device may initiate a RRC connection resume procedure. based on the initiating, the wireless device may transmit to a base station an RRC resume request message and/or data of the SDT procedure. For example, based on the initiating, the wireless device may transmit an initial message for the SDT procedure to a base station, the initial message may comprise the RRC resume request message and/or the data of the SDT procedure. the initial message may be Msg 3 or Msg A. based on the transmitting the RRC resume request message, the wireless device may start the timer based on the value of the timer.

In an example, the data of the SDT procedure may be SDT data. the data of the SDT procedure may be data of a radio bearer configured for the SDT procedure.

Figure 35:
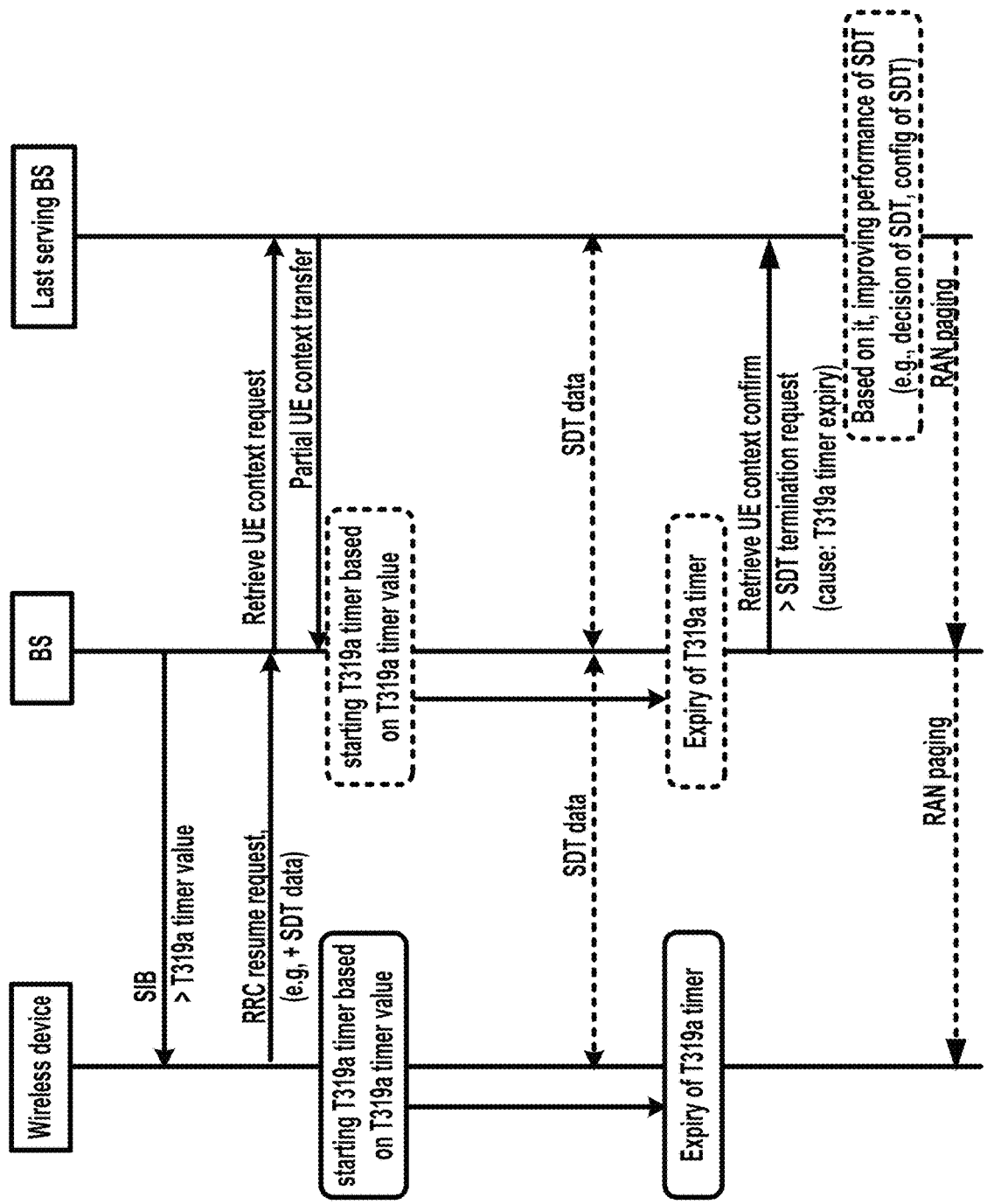
FIG. 35 illustrates an example of a cause value of an expiry of a timer between base stations.

FIG. 35 illustrates an example of a cause value of an expiry of a timer between base stations. A first base station may transmit system information comprising a value of a T319a timer. a wireless device may receive the value from the first base station, the wireless device may determine to initiate a SDT procedure. based on the determining, the wireless device may transmit an RRC resume request message and/or SDT data to the first base station. based on the transmitting the RRC resume request message, the wireless device may start the T319a timer based on the timer value.

In an example of FIG. 35, the first base station may transmit to a second base station a retrieve UE context request message based on receiving the RRC resume request message. the retrieve UE context request message comprising the value of the timer. the second base station may be a base station that keeps a context of the wireless device.

In an example of FIG. 35, based on receiving the retrieve UE context request message, the second base station may determine a SDT procedure without anchor relocation. For example, based on receiving the retrieve UE context request message, the second base station may determine to transfer a partial context/configuration of the wireless device to the first base station. The partial context/configuration may be a RLC bearer configuration. The partial context/configuration may be for the SDT procedure. The second base station may keep upper layer context/configuration (e.g., RRC configuration and/or PDCP configuration). For example, based on the determining, the second base station may transmit a message comprising the partial context/configuration to the first base station, the message may be a partial UE context transfer message.

In an example of FIG. 35, based on transmitting the partial context transfer message, the second base station may communicate data of the wireless device with the first base station. The communicating may comprise transmission/reception of the data based on the SDT procedure (e.g., while the wireless device is in an RRC inactive state). the communicating may be further based on receiving, from the first base station, an acknowledge message to the partial UE context transfer message. The acknowledge message may be a partial UE context transfer acknowledge message. the acknowledge message may comprise data forwarding related information for the SDT procedure.

In an example of FIG. 35, the first base station may start the T319a timer based on the value. For example, the first base station may start the T319a timer based on at least one of: the transmitting the retrieve UE context request message and receiving the partial UE context transfer message. the first base station may determine an expiry of the T319a timer during the communicating. Based on the expiry of the T319a timer, the first base station may determine that the SDT procedure is terminated/failed. For example, based on the expiry of the T319a timer, the first base station may determine that the SDT procedure is terminated/failed due to the expiry of the T319a timer. Based on the determining, the first base station may transmit to the second base station a SDT termination request comprising a cause value indicating the expiry of the T319a timer (e.g., T319a timer expiry or the timer expiry). For example, the first base station may transmit the SDT termination request via an retrieve UE context confirm message.

In an example of FIG. 35, based on the cause value, the second base station may improve performance of a SDT procedure. For example, based on the cause value, the second base station may update a configuration parameter being used for the communicating with the first base station during the SDT procedure. For example, the configuration parameter may be a resource parameter associated with the communicating. For example, the second base station may use the cause value for determination related to a SDT procedure. For example, based on the cause value, the second base station may determine whether to keep a context of a wireless device for a SDT procedure; whether to allow a wireless device to perform a SDT procedure; and whether to transition a wireless device to an RRC connected state. For example, based on the cause value, the second base station may determine next action for the wireless device. For example, based on the cause value indicating the expiry of the T319a timer, the second base station may transmit an RAN paging message to the wireless device. For example, based on the cause value indicating a radio link problem, the second base station may not transmit the RAN paging message to the wireless device. the second base station may wait a signal/message from the wireless device.

Figure 36:
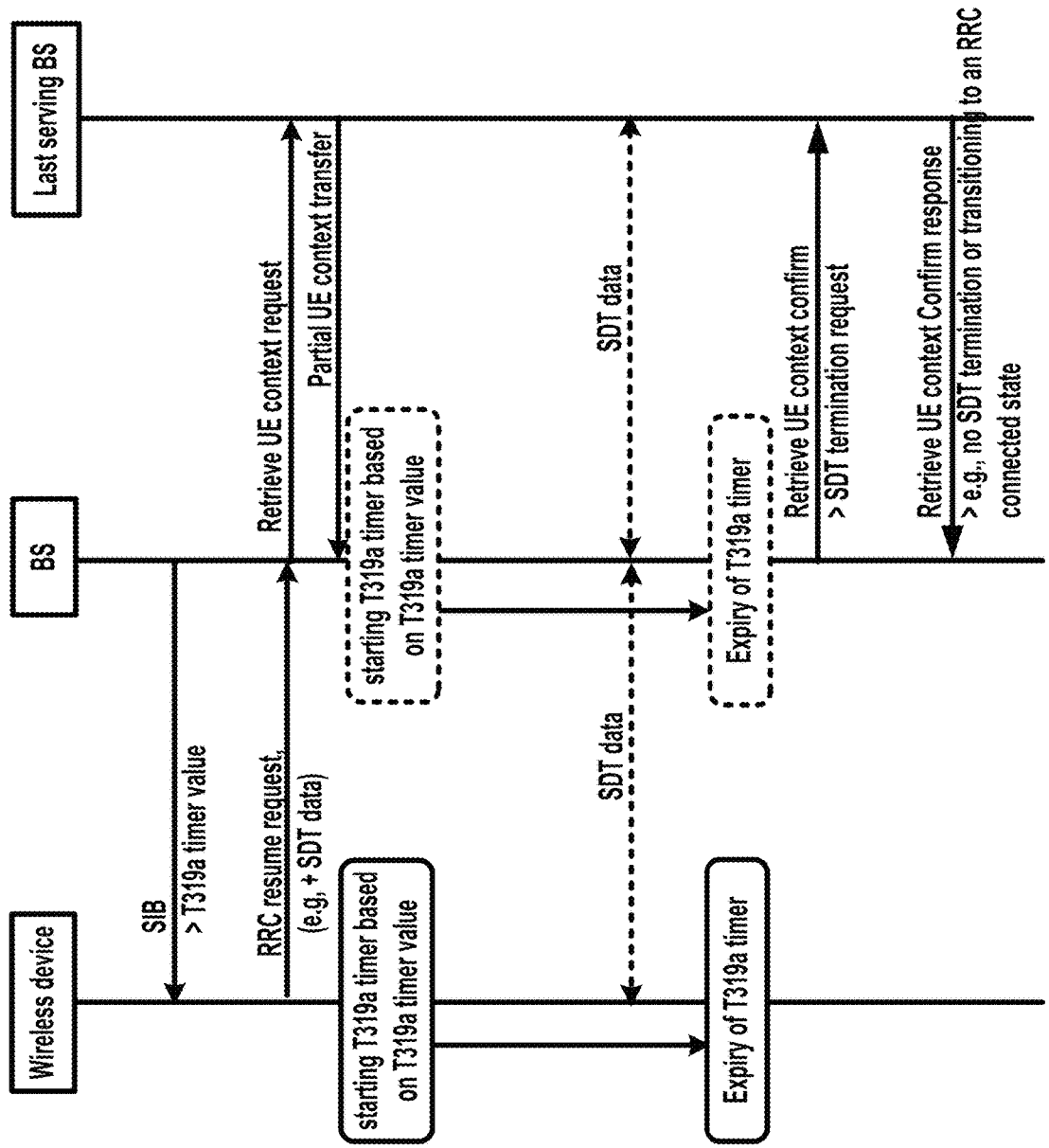
FIG. 36 illustrates an example of a response message to SDT termination request.

FIG. 36 illustrates an example of a response message to SDT termination request. A second base station may receive a SDT termination request from a first base station during a SDT procedure of a wireless device. Based on receiving the SDT termination request, the second base station may transmit a response message (e.g., an retrieve UE context confirm response message). the response message may indicate whether to accept the SDT termination request. The response message may indicate not to accept the SDT termination request (or no SDT termination). For example, based on receiving the SDT termination request indicating an expiry of T319a timer, the second base station may transmit a response message indicating to reject the SDT termination request. The second base station may transmit a response message comprise a request to restart/extend the T319a timer. Based on receiving the request, the first base station may start the T319a timer of the wireless device. For example, the first base station may transmit the request to the wireless device. based on at least one of: receiving a response from the wireless device; and the transmitting the request, the first base station may start the T319a timer. The first base station may transmit a second message confirming restarting/extending the T319a timer to the second base station (e.g., based on receiving the response). For example, the response may indicate that the second base station determine to transition the wireless device to an RRC connected state. the response message may comprise an RRC release message for the wireless device. Based on receiving the response message, the first base station may transmit the RRC release message.

Figure 37:
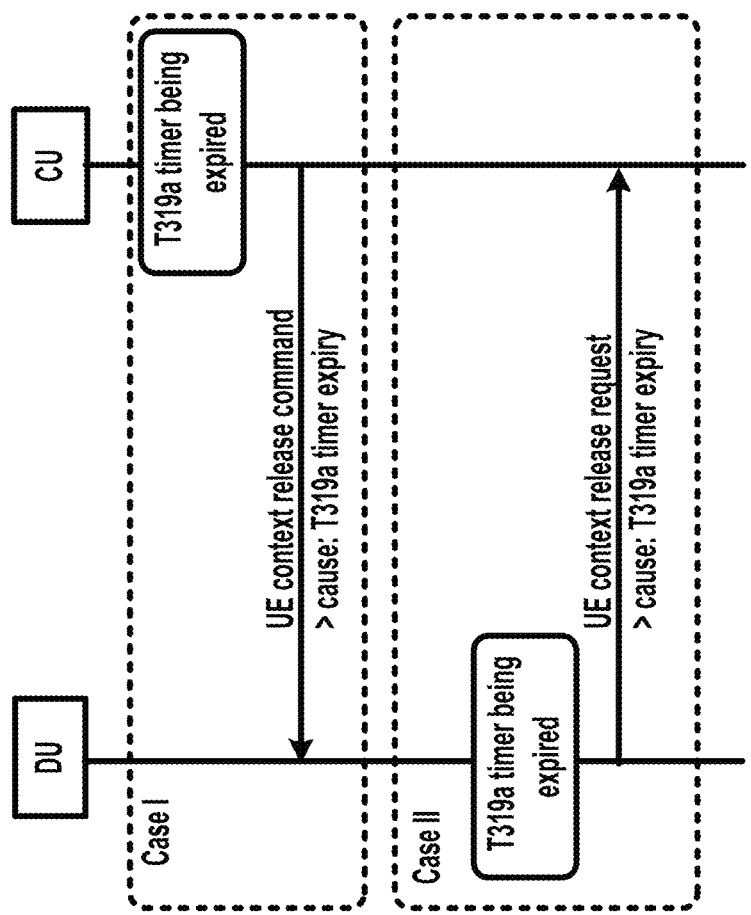
FIG. 37 illustrates an example of an example of a cause value of an expiry of a timer in CU DU architecture.

FIG. 37 illustrates an example of an example of a cause value of an expiry of a timer in CU DU architecture. A case I illustrates an example of T319a timer being running in a base station central unit. A base station central unit may transmit a message to release a context of a wireless device. The message may indicate an expiry of T319a timer. For example, the base station central unit may determine the expiry of T319a timer. For example, the base station central unit may determine the expiry of T319a timer during the SDT procedure of the wireless device. based on the determining, the base station central unit may transmit the message indicating the expiry of the T319a timer. The message may be an UE context release command message. The message may comprise a cause value indicating the expiry of T319a timer.

In an example of FIG. 37, a case II illustrates an example of T319a timer being running in a base station distributed unit. A base station distributed unit may transmit a message to release a context of a wireless device. The message may indicate an expiry of T319a timer. For example, the base station distributed unit may determine the expiry of T319a timer. For example, the base station distributed unit may determine the expiry of T319a timer during the SDT procedure of the wireless device. based on the determining, the base station distributed unit may transmit the message indicating the expiry of the T319a timer. The message may be an UE context release request message. The message may comprise a cause value indicating the expiry of T319a timer.

In an example, a base station central unit control plane may transmit a value of T319a timer to a base station central unit user plane. For example, a base station central unit control plane may transmit a message comprising a value of T319a timer to a base station central unit user plane.

Figure 38:
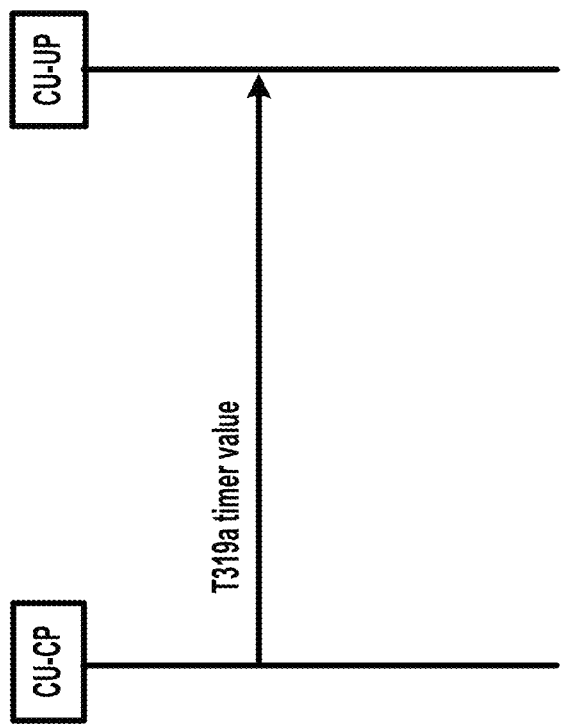
FIG. 38 illustrates an example of a timer value between a base station central unit control plane and a base station central unit user plane.

FIG. 38 illustrates an example of a timer value between a base station central unit control plane and a base station central unit user plane. A base station central unit control plane may transmit to a base station central unit user plane a value of a timer associated with a SDT procedure.

In an example of FIG. 38, the base station central unit control plane may transmit to a base station central unit user plane the value of the timer via a message. the message may be non-UE (wireless device) associated signalling/message. For example, the message may not be associated with a wireless device. For example, the message may be node (base station) associated signaling/message. the message may be for managing a interface between the base station central unit control plane and the base station central unit user plane. For example, the message may be an E1 setup request/response message; or a configuration update message or a configuration update acknowledge message. the message may comprise the value of the timer. For example, based on determining setup/establishing an E1 interface (e.g., Xn control interface) with the base station central unit user plane; or updating configuration need for the base station central unit control plane and the base station central unit user plane, the base station central unit control plane may transmit the E1 setup message to the base station central unit user plane. based on determining to update configuration needed for an E1 interface, the base station central unit control plane may transmit the configuration update message to the base station central unit user plane.

In an example of FIG. 38, the base station central unit control plane may transmit to a base station central unit user plane the value of the timer via a message. For example, the message may not be node (base station) associated signaling/message. the message may be UE (wireless device) associated signalling/message. the message may be associated with mobility of a wireless device. The message may be for managing a context of a bearer of a wireless device. For example, the message may be a message requesting to release/modify a context of a bearer of a wireless device. the message may be a bearer context release request message or a bearer context modification request message.

In an example, the timer may be a T319a timer.

Figure 39:
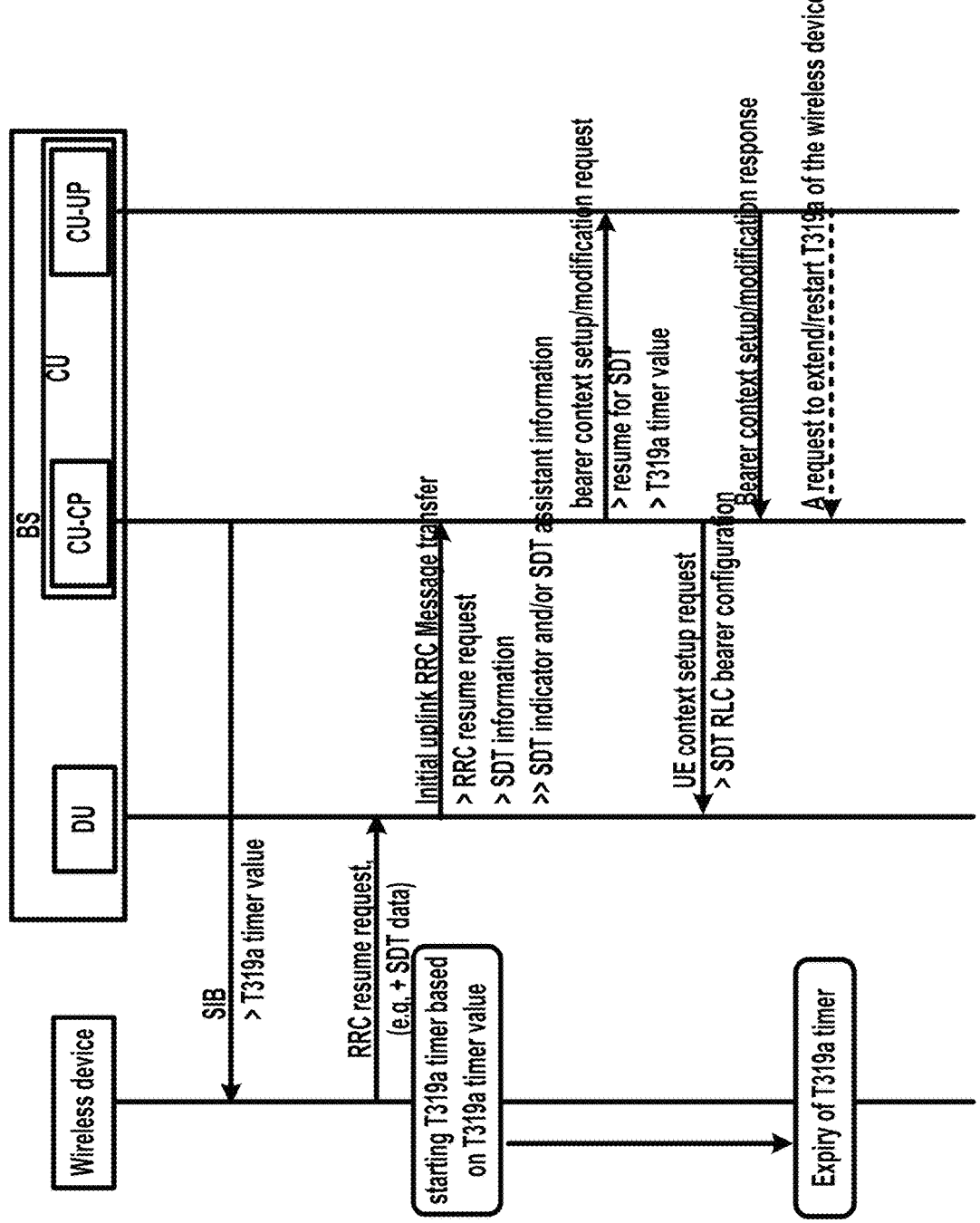
FIG. 39 illustrates an example of a timer value transmitted via UE associated signaling.

FIG. 39 illustrates an example of a timer value transmitted via UE associated signaling. A base station central unit control plane may transmit system information comprising a value of a T319a timer. a wireless device may receive the value from the base station central unit control plane. the wireless device may determine to initiate a SDT procedure. based on the determining, the wireless device may transmit an RRC resume request message and/or SDT data to the base station central unit control plane. based on the transmitting the RRC resume request message, the wireless device may start the T319a timer based on the timer value.

In an example of FIG. 39, the base station central unit control plane may transmit to a base station central unit user plane a bearer context modification request message based on receiving the RRC resume request message. the bearer context modification request message comprising the value of the timer.

In an example of FIG. 39, based on receiving the value of T319a timer, the base station central unit user plane may transmit a request to restart/extend the 319a timer of the wireless device (e.g., before the T319a timer is expired). For example, during the communicating, the base station central unit user plane may transmit a request to restart/extend the 319a timer of the wireless device based on determining that the 319a timer is expired after a timer offset. For example, the base station central unit user plane may transmit the request to the base station central unit control plane. For example, the base station central unit control plane may transmit the request to the wireless device. Based on the transmitting the request, the base station central unit user plane may avoid an expiry of the T319a timer. Based on the transmitting the request, the base station central unit user plane may continue the communicating.

In an example of FIG. 39, during the communicating, the base station central unit user plane may determine to transition the wireless device to an RRC connected state. based on the determining, the base station central unit user plane may transmit to the base station central unit control plane a second request to transition the wireless device to an RRC connected state. The base station central unit control plane may determine the transitioning based on the second request. Based on the determining, the base station central unit control plane may transmit to the wireless device an RRC message transitioning the wireless device to the RRC connected state. Based on receiving the RRC message, the wireless device may transition to the RRC connected state. based on the transitioning, the base station central unit user plane may continue to communicate with the base station central unit control plane; a base station distributed unit; and the wireless device. The base station central unit user plane may continue the communicating with less delay/interruption.

In an example, a base station central unit control plane may transmit, to a base station central unit user plane, a message indicating an expiry of a timer associated with a SDT procedure.

In an example, the base station central unit control plane may transmit, to the base station central unit user plane, the message indicating the expiry of the timer based on determining that the timer is expired.

Figure 40:
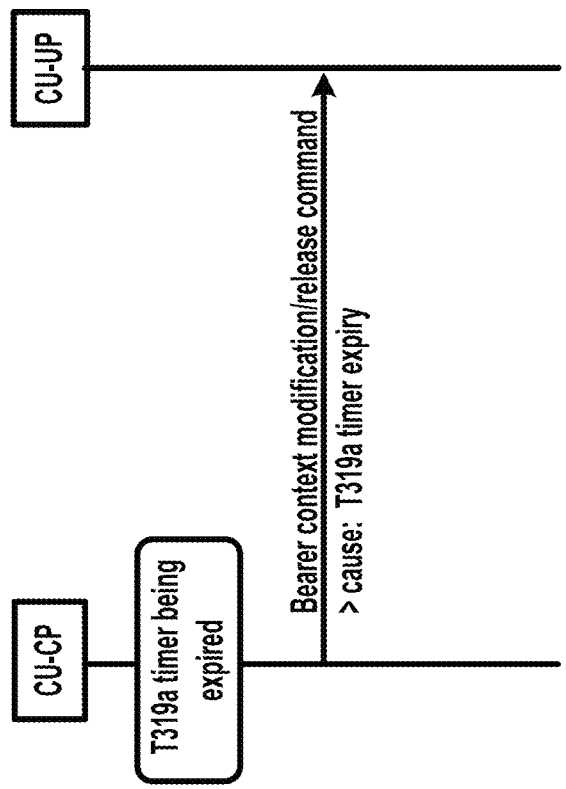
FIG. 40 illustrates an example of a cause value of an expiry of a timer between a base station central unit control plane and a base station central unit user plane.

FIG. 40 illustrates an example of a cause value of an expiry of a timer between a base station central unit control plane and a base station central unit user plane. A base station central unit control plane may transmit to a base station central unit user plane a message to release/modify a context of a bearer of the wireless device. the message may indicate an expiry of a timer associated with the SDT procedure. For example, the base station central unit control plane may determine the expiry of the timer. based on the determining, the base station central unit control plane may transmit the message to the base station central unit user plane. the message indicating the expiry of the timer may comprise a message comprising a cause value indicating the expiry of the timer.

In an example, the timer may be a T319a timer.

Figure 41:
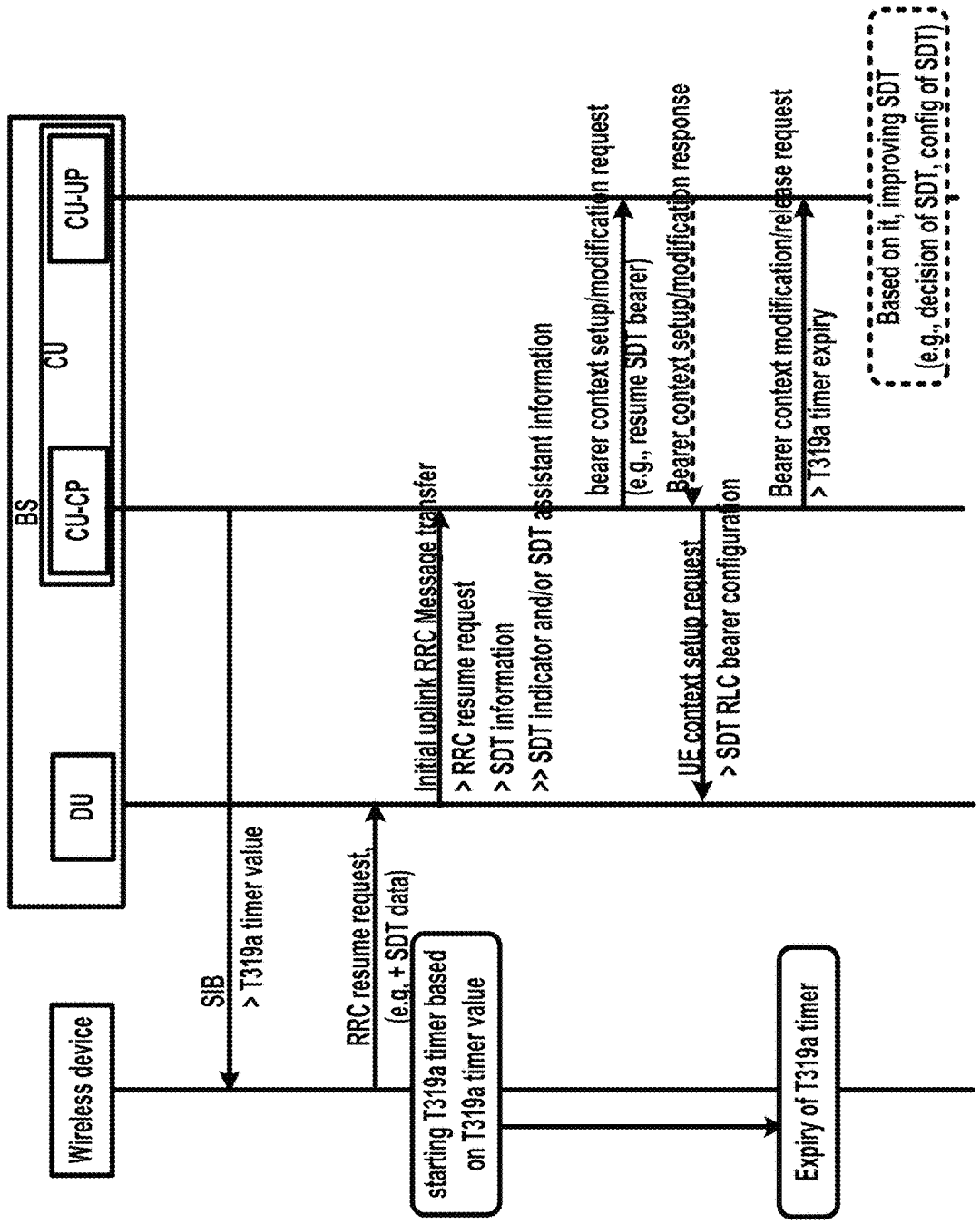
FIG. 41 illustrates an example of a cause value of an expiry of a timer between a base station central unit control plane and a base station central unit user plane.

FIG. 41 illustrates an example of a cause value of an expiry of a timer between a base station central unit control plane and a base station central unit user plane. a base station central unit control plane may start the T319a timer based on a value of T319a timer. For example, the base station central unit control plane may start the T319a timer based on at least one of: the transmitting a UE context setup request message to a base station distributed unit; and receiving an RRC resume request message from the base station distributed unit. the base station central unit control plane may determine an expiry of the T319a timer during communicating with the wireless device. Based on the expiry of the T319a timer, the base station central unit control plane may determine to release/modify a context of a bearer of the wireless device. Based on the determining, the base station central unit control plane may transmit to the base station central unit user plane a message comprising a cause value indicating the expiry of the T319a timer (e.g., T319a timer expiry or the timer expiry). For example, the message may be a bearer context release request message or a bearer context modification request message.

In an example of FIG. 41, based on the cause value, the base station central unit user plane may improve performance of a SDT procedure. For example, based on the cause value, the base station central unit user plane may update a configuration parameter being used for the communicating with the base station central unit control plane during the SDT procedure. For example, the configuration parameter may be a resource parameter associated with the communicating. For example, the base station central unit user plane may use the cause value for determination related to a SDT procedure. For example, based on the cause value, the base station central unit user plane may determine whether to transition a wireless device to an RRC connected state. For example, based on the cause value, the base station central unit user plane may determine next action for the wireless device. For example, based on the cause value indicating the expiry of the T319*a* timer, the base station central unit user plane may transmit a second request to trigger to transition the wireless device to an RRC connected state.

In an example, a first base station may communicate, based on a small data transmission (SDT) procedure, data of a wireless device with a second base station keeping a context of the wireless device while a timer associated with a small data transmission (SDT) procedure while the timer is running is running for the wireless device in a radio resource control (RRC) inactive state. the first base station may determine, during the SDT procedure, to terminate the SDT procedure (or a failure of the SDT procedure) in response to an expiry of the timer. the first base station may transmit to the second base station and based on the determining, a message indicating: termination/failure of the SDT procedure; and the expiry of the timer.

In an example, a first base station may transmit to one or more wireless devices, a system information comprising a value of a timer associated with a small data transmission (SDT) procedure wherein the SDT procedure is configured to a cell of the first base station, the first base station may receive, from a wireless device, of the one or more wireless devices, in a radio resource control (RRC) inactive state, an initial message indicating that the wireless device initiates the SDT procedure on the cell of the first base station, the first base station may determine, based on the receiving, to request retrieving a context of the wireless device from a second base station that keeps the context of the wireless device. the first base station may transmit, based on the determining and to the second base station, a message requesting to retrieve the context of the wireless device wherein the message comprises the value of the timer.

In an example, the first base station may receive from the second base station and based transmitting the message, a first message comprising: a request to restart/extend the timer; or an RRC release message for transitioning back to the RRC inactive state.

In an example, the first base station may transmit to the wireless device: the request based on the receiving the request; or the RRC release message based on the receiving the RRC release message.

In an example, the first base station may from the wireless device: receive, based on the transmitting the request, an acknowledgement/accept message for the request; or receive, based on the transmitting the RRC release message, an RRC message requesting to resume an RRC connection (e.g., an RRC resume request message).

In an example, the first base station may communicate with the wireless device based on: the receiving the acknowledgement/accept message; or the receiving the RRC message.

In an example, the receiving the RRC message may be based on: receiving, from the second base station, a paging message for the wireless device; and transmitting, to the wireless device, the paging message.

In an example, a first base station may transmit a value of a timer associated with a small data transmission (SDT) procedure. the first base station may receive, from the wireless device, an initial message for the SDT procedure. the first base station may transmit, based on the receiving and to a second base station keeping a context of the wireless device, a message indicating the value of the timer.

In an example, the transmitting the value of the timer may comprise transmitting, to one or more wireless devices, the value of the timer via system information.

In an example, the message may be to request retrieving the context of the wireless device (e.g., a retrieve UE context request message). The message may be to acknowledge transferring partial context of the wireless device (e.g., a partial UE context transfer acknowledge message).

In an example, the first base station may receive, from the second base station and based on the transmitting the message to request the retrieving the context, a response message transferring the partial context of the wireless device (e.g., a partial UE context transfer message).

In an example, the initial message indicates that the wireless device initiates the SDT procedure on a cell of the first base station.

In an example, a first base station may transmit to one or more wireless devices a value of a timer associated with a small data transmission (SDT) procedure. the first base station may transmit, to a second base station, a message comprising the value of the timer.

In an example, the first base station may receive from the second base station and based transmitting the message, a first message comprising: a request to restart/extend the timer; or an RRC release message for transitioning back to the RRC inactive state.

In an example, the first base station may transmit to the wireless device: the request based on the receiving the request; or the RRC release message based on the receiving the RRC release message.

In an example, the first base station may from the wireless device: receive, based on the transmitting the request, an acknowledgement/accept message for the request; or receive, based on the transmitting the RRC release message, an RRC message requesting to resume an RRC connection (e.g., an RRC resume request message).

In an example, the first base station may communicate with the wireless device based on: the receiving the acknowledgement/accept message; or the receiving the RRC message.

In an example, the receiving the RRC message may be based on: receiving, from the second base station, a paging message for the wireless device; and transmitting, to the wireless device, the paging message.

In an example, the transmitting the value of the timer may comprise transmitting, to one or more wireless devices, the value of the timer via system information.

In an example, the system information is a system information block 1 (SIB1).

In an example, the message may be a first message being associated with a context of the wireless device. the message may be a second message to exchange/update a configuration needed for the first base station and the second base station.

In an example, the first message may be to request retrieving the context of the wireless device (e.g., a retrieve UE context request message). the first message may be to acknowledge transferring partial context of the wireless device (e.g., a partial UE context transfer acknowledge message).

In an example, the first base station may receive, from the second base station and based on the transmitting the first message to request the retrieving the context, a response message transferring/comprising the partial context of the wireless device (e.g., a partial UE context transfer message).

In an example, the first message to request the retrieving the context may indicate that the wireless device requests the SDT procedure.

In an example, the second message may be an Xn setup message; or a configuration update message.

In an example, the second base station may keep a context of a wireless device of the one or more wireless devices.

In an example, the first base station may receive, from the wireless device, an initial message for a SDT procedure. The initial message may indicate indicating that the wireless device initiates the SDT procedure on a cell of the first base station. The initial message may comprise an RRC request message.

In an example, the first base station may transmit to the second base station and based on receiving the initial message, a message requesting to retrieve the context of the wireless device.

In an example, the first base station may receive, from the second base station and based on the transmitting, a response message transferring/comprising the partial context of the wireless device (e.g., a partial UE context transfer message).

In an example, the timer may be for determining a failure of the SDT procedure.

In an example, the determining the failure may be based on an expiry of the timer.

In an example, the first base station may communicate, based on the SDT procedure, data of a wireless device with the wireless device in an RRC inactive state. the first base station may communicate data of the wireless device with the second base station.

In an example, the communicating may comprise communicating while the timer is running.

In an example, a second base station may determine to transition a wireless device to a radio resource control (RRC) inactive state. based on the determining, the second base station may transmit, to a wireless device, an RRC release message requesting the transitioning; and keep a context of the wireless device. the second base station may receive, from a first base station, a message requesting to retrieve the context of the wireless device wherein the message comprises a value of the timer associated with a small data transmission (SDT) procedure. the second base station may transmit, based on the receiving, a response message comprising a partial context of the wireless device.

In an example, the second base station may transmit, based on the value of the timer: a first message comprising: a request to restart/extend the timer; or an RRC release message for transitioning back to the RRC inactive state.

In an example, based on the transmitting the request, the second base station may receive, from the first base station, an acknowledgement/accept message for the request; and/or restart/extend the timer in response to the acknowledgement/accept message.

In an example, the second base station may communicates, based on at least one of: the receiving the acknowledgement/accept message; and the restarting/extending the timer.

In an example, the transmitting the first message may be based on determining that the timer is expired after a timer offset.

In an example, the transmitting the RRC release message may be further based on determining to transition the wireless device to an RRC connected state.

In an example, the second base station may transmit, based on the determining and the transmitting the RRC release message, a paging message to the wireless device.

In an example, a second base station may receive, from a first base station, a message comprising a value of the timer associated with a small data transmission (SDT) procedure. the second base station may transmit, based on the receiving, a response message comprising a partial context of the wireless device.

In an example, the message may be a first message being associated with a context of the wireless device.

In an example, a second base station may receive, from a first base station, a message comprising a value of the timer associated with a small data transmission (SDT) procedure.

In an example, the second base station may transmit, based on the value of the timer: a first message comprising: a request to restart/extend the timer; or an RRC release message for transitioning back to the RRC inactive state.

In an example, based on the transmitting the request, the second base station may receive, from the first base station, an acknowledgement/accept message for the request; and/or restart/extend the timer in response to the receiving the acknowledgement/accept message.

In an example, the second base station may communicate, based on at least one of: the receiving the acknowledgement/accept message; and the restarting/extending the timer.

In an example, the transmitting the first message may be based on determining that the timer is expired after a timer offset.

In an example, the transmitting the RRC release message may be further based on determining to transition the wireless device to an RRC connected state.

In an example, the second base station may transmit, based on the determining and the transmitting the RRC release message, a paging message to the wireless device.

In an example, the message may be a first message being associated with a context of the wireless device. the message may be a second message to exchange/update a configuration needed for the first base station and the second base station.

In an example, a base station central unit control plane may receive, from a base station distributed unit, a first message indicating that a wireless device initiates a small data transmission (SDT) procedure on a cell of a base station of the base station central unit control plane. The base station central unit control plane may transmit, based on the receiving and to a base station central unit user plane, a message indicating: a request to setup/modify a context of a bearer of the wireless device; and a value of a timer associated with the SDT procedure.

In an example, the base station central unit control plane may receive from the base station central unit user plane and based transmitting the message, a request to restart/extend the timer.

In an example, the base station central unit control plane may transmit to the wireless device, the request based on the receiving the request.

In an example, the base station central unit control plane may receive from the wireless device and based on the transmitting the request, an acknowledgement/accept message for the request.

In an example, the base station central unit control plane may communicate with the wireless device based on; the receiving the acknowledgement/accept message; and/or restarting/extending the timer in response the receiving the acknowledgement/accept message.

In an example, the message may indicate status of the context of the bearer. The status may indicate resuming of a data radio bearer (DRB) configured to the SDT procedure.

In an example, a base station central unit control plane may transmit, to a base station central unit user plane, a message indicating a value of a timer associated with a small data transmission (SDT) procedure wherein the SDT procedure is configured to a cell of a base station of the base station central unit control plane.

In an example, the base station central unit control plane may receive from the base station central unit user plane and based transmitting the message, a request to restart/extend the timer.

In an example, the base station central unit control plane may transmit to the wireless device, the request based on the receiving the request.

In an example, the base station central unit control plane may receive from the wireless device and based on the transmitting the request, an acknowledgement/accept message for the request.

In an example, the base station central unit control plane may communicate with the wireless device based on; the receiving the acknowledgement/accept message; and/or restarting/extending the timer in response the receiving the acknowledgement/accept message.

In an example, the message may be a message for managing a interface between the base station central unit control plane and the base station central unit user plane.

In an example, the message for managing the interface may be a first message to setup the interface (e.g., a E1 setup request/response); or a second message to update a configuration of the base station distributed unit and/or the base station central unit (e.g., a configuration update message or a configuration update acknowledge message).

In an example, the message may be a message for managing a context of a bearer of a wireless device.

In an example, the message for managing the context of the bearer of the wireless device may be: a first message requesting to release the context of the bearer (e.g., a bearer context release request message); or a second message requesting to modify the context of the bearer (e.g., a bearer context release modification request message).

In an example, the message for managing the context of the bearer may indicate status of the context of the bearer. The status may indicate resuming of a data radio bearer (DRB) configured to the SDT procedure.

In an example, a first base station may transmit, to one or more wireless devices, a system information comprising a value of a timer associated with a small data transmission (SDT) procedure wherein the SDT procedure is configured to a cell of the first base station;

In an example, the first base station may receive, from a second base station that keeps a context of the wireless device, a message comprising a partial context, for the SDT procedure, of a wireless device of the one or more wireless devices. the first base station may communicate, based on the message and the SDT procedure, data of the wireless device with the second base station while the timer is running for the wireless device in a radio resource control (RRC) inactive state. the first base station may determine, during the SDT procedure, to terminate the SDT procedure (or a failure of the SDT procedure) in response to an expiry of the timer. the first base station may transmit to the second base station and based on the determining, a message indicating: termination/failure of the SDT procedure; and a cause value indicating that the SDT procedure is terminated/failed due to the expiry of the timer.

In an example, a first base station may communicate, based on a small data transmission (SDT) procedure, data of a wireless device with a second base station keeping a context of the wireless device while a timer associated with a small data transmission (SDT) procedure while the timer is running is running for the wireless device in a radio resource control (RRC) inactive state. the first base station may determine, during the SDT procedure, to terminate the SDT procedure (or a failure of the SDT procedure) in response to an expiry of the timer. the first base station may transmit to the second base station and based on the determining, a message indicating: termination/failure of the SDT procedure; and the expiry of the timer.

In an example, the communicating may be based on receiving a first message comprising a partial context, for the SDT procedure, of a wireless device.

In an example, the first base station may transmit to one or more wireless devices comprising the wireless device, a system information comprising a value of a timer associated with the SDT procedure wherein the SDT procedure is configured to a cell of the first base station.

In an example, the message indicating the expiry of the timer may comprise a message indicating/comprising a cause value indicating that the SDT procedure is terminated/failed due to the expiry of the timer.

In an example, the first base station may start the timer based on at least one of: the receiving the response message comprising the partial context; receiving, from the wireless device, an initial message for the SDT procedure.

In an example, the initial message may comprise at least one of: an RRC resume request message; and data of the SDT procedure.

In an example, the partial context may comprise a radio link context/configuration of the wireless device.

In an example, the message may be a retrieve UE context confirm message.

In an example, the timer being running may comprise at least one of: the timer being running in the first base station; and the timer being running in the wireless device.

In an example, a second base station may communicate, based on a small data transmission (SDT) procedure, data of a wireless device with a first base station while a timer associated with the SDT procedure is running for the wireless device in a radio resource control (RRC) inactive state. the second base station may receive, during the SDT procedure, a message indicating: termination/failure of the SDT procedure; and an expiry of the timer.

In an example, the communicating may be based on transmitting, to a first base station, a message comprising a partial context, for the SDT procedure, of a wireless device.

In an example, the second base station may determine, based on the cause value, at least one of: a configuration parameter for a SDT procedure of one or more wireless devices; whether to transfer a partial context of the one or more wireless device (or whether keep a context of a wireless device); whether to transition the one or more wireless devices to an RRC connected state; and whether to terminate the SDT procedure of the one or more wireless devices.

In an example, the one or more wireless devices may be a wireless device accessing, for the SDT procedure, to (a cell) of the first base station.

In an example, the determining may comprise determining based on receiving, from the first base station, a message requesting to retrieve a context of a wireless device of the one or more wireless devices.

In an example, the configuration parameter may comprise a radio bearer configured to the SDT procedure.

In an example, the timer being running may comprise at least one of: the timer being running in the first base station; and the timer being running in the wireless device.

In an example, a base station central unit may communicate, based on a small data transmission (SDT) procedure, data of a wireless device with a base station distributed unit while a timer associated with a small data transmission (SDT) procedure is running for the wireless device in a radio resource control (RRC) inactive state. the base station central unit may determine, during the SDT procedure, to terminate the SDT procedure (or a failure of the SDT procedure) in response to an expiry of the timer. the base station central unit may transmit, to the base station distributed unit and based on determining, a message indicating: a release of a context of the wireless device; and the expiry of the timer.

In an example, the communicating may be based on receiving from the base station distributed unit, a first message comprising an RRC message of the wireless device (e.g., an initial uplink RRC message transfer message).

In an example, the communicating may be further based on transmitting a response message comprising a radio link control (RLC) bearer configuration, for the SDT procedure, of a wireless device.

In an example, the transmitting the response message may be based on the receiving the first message.

In an example, the base station central unit may start the timer based on at least one of: the receiving the first message; and the transmitting the response message.

In an example, the starting the timer may be based on a value of the timer.

In an example, the value of the timer may be included in system information.

In an example, the first message may further comprise information of the SDT procedure.

In an example, the information may indicate that the wireless device accesses for the SDT procedure. the information may comprise a SDT indicator; and/or SDT assistance information.

In an example, the message indicating the expiry of the timer may comprise a message indicating/comprising a cause value indicating that the SDT procedure is terminated/failed due to the expiry of the timer.

In an example, the SDT procedure may be configured to a cell of a base station of the base station central unit.

In an example, the timer may be for determining termination/failure of the SDT procedure.

In an example, the determining the termination/failure may be based on the expiry of the timer.

In an example, the communicating may comprise communicating while the timer is running.

In an example, the timer being running may comprise at least one of: the timer being running in the base station central unit; and the timer being running in the wireless device.

In an example, a base station distributed unit may communicate, based on a small data transmission (SDT) procedure, data with a wireless device while a timer associated with the SDT procedure is running for the wireless device in a radio resource control (RRC) inactive state. the base station distributed unit may determine, during the SDT procedure, to terminate the SDT procedure (or a failure of the SDT procedure) in response to an expiry of the timer. the base station distributed unit may transmit to a base station central unit and based on determining, a message indicating: a release of a context of the wireless device; and the expiry of the timer.

In an example, the base station distributed unit may transmit to one or more wireless devices comprising the wireless device, a system information comprising a value of the timer wherein the SDT procedure is configured to a cell of a base station of the base station distributed unit.

In an example, the system information may be system information block 1 (SIB1).

In an example, the system information may further comprise cell access related information indicating an identity of a public land mobile network (PLMN) of a base station of the base station distributed unit.

In an example, the communicating may be based on at least one of: transmitting to the base station central unit, a first message comprising an RRC message of the wireless device (e.g., an initial uplink RRC message transfer message); and receiving a response message comprising a radio link control (RLC) bearer configuration, for the SDT procedure, of a wireless device.

In an example, the receiving the response message may be based on the transmitting the first message.

In an example, the base station distributed unit may start the timer based on at least one of: the transmitting the first message; and the receiving the response message.

In an example, the first message further comprise information of the SDT procedure. the information indicates that the wireless device accesses for the SDT procedure. the information comprise: a SDT indicator; and/or SDT assistance information.

In an example, the message indicating the expiry of the timer may comprise a message indicating/comprising a cause value indicating that the SDT procedure is terminated/failed due to the expiry of the timer.

In an example, the timer may be for determining termination/failure of the SDT procedure. the determining the termination/failure may be based on the expiry of the timer.

In an example, the communicating may comprise communicating while the timer is running. The timer being running may comprise at least one of: the timer being running in the base station distributed unit; and the timer being running in the wireless device.

In an example, a base station central unit control plane may communicate, based on a small data transmission (SDT) procedure, data of a wireless device with a base station central unit user plane while a timer associated with the SDT procedure is running for the wireless device in a radio resource control (RRC) inactive state. the base station central unit control plane may determine, during the SDT procedure, to terminate the SDT procedure (or a failure of the SDT procedure) in response to an expiry of the timer. the base station central unit control plane may transmit to the base station central unit user plane and based on determining, a message for a context of a bearer of the wireless device wherein the message indicates the expiry of the timer.

In an example, the message may be: a message requesting to modify the context of the bearer of the wireless device; and/or a message requesting to release the context of the bearer of the wireless device.

In an example, the communicating may be based on at least one of: transmitting, to the base station central unit user plane, a third message to modify the context of the bearer of the wireless device; receiving, from the base station central unit user plane, a response message to the third message; and transmitting, to a base station distributed unit, a response message comprising a radio link control (RLC) bearer configuration, for the SDT procedure, of a wireless device.

In an example, the transmitting the third message may be based on receiving, from a base station distributed unit, a first message comprising an RRC message of the wireless device (e.g., an initial uplink RRC message transfer message).

In an example, the transmitting the response message may be based on receiving the first message.

In an example, the third message may indicate status of the context of the bearer. the status may indicate resuming of a data radio bearer (DRB) configured to the SDT procedure.

In an example, the timer being running may comprise at least one of: the timer being running in the base station central unit control plane; and the timer being running in the wireless device.

In an example, a base station central unit user plane may communicate, based on a small data transmission (SDT) procedure, data of a wireless device with a base station central unit control plane while a timer associated with the SDT procedure is running for the wireless device in a radio resource control (RRC) inactive state. The base station central unit user plane may receive, from the base station central unit control plane, a message for a context of a bearer of the wireless device wherein the message indicates the expiry of the timer.

In an example, the timer being running may comprise at least one of: the timer being running in the base station central unit control plane; and the timer being running in the wireless device.

The invention claimed is:

1. A method comprising:
   receiving, by a wireless device from a first base station, a radio resource control (RRC) release message comprising a suspend configuration, wherein:
     the suspend configuration comprises a configuration of a small data transmission (SDT) procedure; and
     the configuration indicates a radio bearer configured for the SDT procedure;
   suspending, based on the suspend configuration, one or more radio bearers comprising the radio bearer configured for the SDT procedure;
   based on initiating the SDT procedure:
     resuming the radio bearer configured for the SDT procedure; and
     transmitting, to a second base station, a radio resource control (RRC) resume request message;
   communicating, with the second base station and during the SDT procedure, data associated with the SDT procedure;
   transmitting, by the wireless device to the second base station and during the SDT procedure, a user equipment (UE) assistance information message comprising:
     a non-SDT indication, wherein the non-SDT indication indicates availability of data mapped to a radio bearer which is not configured for the SDT procedure; and
     a resume cause associated with the data; and
   receiving, from the second base station and after transmitting the UE assistance information message, an RRC response message.

2. The method of claim 1, wherein the RRC response message comprises at least one of:
   an RRC resume message;
   an RRC release message; or
   an RRC setup message.

3. The method of claim 1, wherein the suspend configuration comprises at least one of:
   a resume identity;
   a radio access network (RAN) paging cycle;
   a RAN based notification area (RNA) configuration; or
   network hop chaining count (NCC) value.

4. The method of claim 3, wherein the RNA configuration comprises at least one of:
   RNA notification area information; or
   periodic RNA update timer value.

5. The method of claim 1, wherein the first base station receives, from the second base station, a partial context of the wireless device.

6. The method of claim 5, wherein the partial context is a context associated with a lower layer of the wireless device, a radio link control layer of the wireless device, a medium access control layer of the wireless device, and/or a physical layer of the wireless device.

7. The method of claim 1, wherein the second base station comprises a last serving base station or an anchor base station.

8. A wireless device comprising one or more processors and memory storing instructions that, when executed by the one or more processors, cause the wireless device to:
   receive, from a first base station, a radio resource control (RRC) release message comprising a suspend configuration, wherein:
     the suspend configuration comprises a configuration of a small data transmission (SDT) procedure; and
     the configuration indicates a radio bearer configured for the SDT procedure;
   suspend, based on the suspend configuration, one or more radio bearers comprising the radio bearer configured for the SDT procedure;
   based on initiating the SDT procedure:
     resume the radio bearer configured for the SDT procedure; and
     transmit, to a second base station, a radio resource control (RRC) resume request message;
   communicate, with the second base station and during the SDT procedure, data associated with the SDT procedure;
   transmit, by the wireless device to the second base station and during the SDT procedure, a user equipment (UE) assistance information message comprising:
     a non-SDT indication, wherein the non-SDT indication indicates availability of data mapped to a radio bearer which is not configured for the SDT procedure; and
     a resume cause associated with the data; and
   receive, from the second base station and after transmitting the UE assistance information message, an RRC response message.

9. The wireless device of claim 8, wherein the RRC response message comprises at least one of:
   an RRC resume message;
   an RRC release message; or
   an RRC setup message.

10. The wireless device of claim 8, wherein the suspend configuration comprises at least one of:
   a resume identity;
   a radio access network (RAN) paging cycle;
   a RAN based notification area (RNA) configuration; or
   network hop chaining count (NCC) value.

11. The wireless device of claim 10, wherein the RNA configuration comprises at least one of:
   RNA notification area information; or
   periodic RNA update timer value.

12. The wireless device of claim 8, wherein the first base station receives, from the second base station, a partial context of the wireless device.

13. The wireless device of claim 12, wherein the partial context is a context associated with a lower layer of the wireless device, a radio link control layer of the wireless device, a medium access control layer of the wireless device, and/or a physical layer of the wireless device.

14. The wireless device of claim 8, wherein the second base station comprises a last serving base station or an anchor base station.

15. A non-transitory computer-readable medium comprising instructions that, when executed by one or more processors of a wireless device, cause the wireless device to:
  receive, from a first base station, a radio resource control (RRC) release message comprising a suspend configuration, wherein:
    the suspend configuration comprises a configuration of a small data transmission (SDT) procedure; and
    the configuration indicates a radio bearer configured for the SDT procedure;
  suspend, based on the suspend configuration, one or more radio bearers comprising the radio bearer configured for the SDT procedure;
  based on initiating the SDT procedure:
    resume the radio bearer configured for the SDT procedure; and
    transmit, to a second base station, a radio resource control (RRC) resume request message;
  communicate, with the second base station and during the SDT procedure, data associated with the SDT procedure;
  transmit, by the wireless device to the second base station and during the SDT procedure, a user equipment (UE) assistance information message comprising:
    a non-SDT indication, wherein the non-SDT indication indicates availability of data mapped to a radio bearer which is not configured for the SDT procedure; and
    a resume cause associated with the data; and
  receive, from the second base station and after transmitting the UE assistance information message, an RRC response message.

16. The non-transitory computer-readable medium of claim 15, wherein the RRC response message comprises at least one of:
  an RRC resume message;
  an RRC release message; or
  an RRC setup message.

17. The non-transitory computer-readable medium of claim 15, wherein the suspend configuration comprises at least one of:
  a resume identity;
  a radio access network (RAN) paging cycle;
  a RAN based notification area (RNA) configuration; or
  network hop chaining count (NCC) value.

18. The non-transitory computer-readable medium of claim 17, wherein the RNA configuration comprises at least one of:
  RNA notification area information; or
  periodic RNA update timer value.

19. The non-transitory computer-readable medium of claim 15, wherein the first base station receives, from the second base station, a partial context of the wireless device.

20. The non-transitory computer-readable medium of claim 19, wherein the partial context is a context associated with a lower layer of the wireless device, a radio link control layer of the wireless device, a medium access control layer of the wireless device, and/or a physical layer of the wireless device.

* * * * *